(12) United States Patent
Keck

(10) Patent No.: US 10,377,291 B2
(45) Date of Patent: *Aug. 13, 2019

(54) CARRIER SYSTEM WITH RAMP AND BRIDGE DEVICE AT CARGO BED

(71) Applicant: Theodore J. Keck, Los Angeles, CA (US)

(72) Inventor: Theodore J. Keck, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/153,181

(22) Filed: Oct. 5, 2018

(65) Prior Publication Data

US 2019/0061595 A1 Feb. 28, 2019

Related U.S. Application Data

(63) Continuation of application No. 16/012,125, filed on Jun. 19, 2018, now Pat. No. 10,160,368, which is a
(Continued)

(51) Int. Cl.
*B60P 1/43* (2006.01)
*B60R 9/06* (2006.01)
(Continued)

(52) U.S. Cl.
CPC ............... *B60P 1/43* (2013.01); *A01K 1/035* (2013.01); *B60R 9/06* (2013.01); *B60R 9/065* (2013.01); *B65G 67/00* (2013.01); *B65G 69/30* (2013.01)

(58) Field of Classification Search
CPC .. B60P 1/43; A01K 1/035; B60R 9/06; B65G 67/00; B65G 69/30
(Continued)

(56) References Cited

U.S. PATENT DOCUMENTS

| 2,784,027 A | 3/1957 | Temp |
| 3,713,553 A * | 1/1973 | Curtis .................... B60P 1/435 296/61 |

(Continued)

OTHER PUBLICATIONS

Patent Cooperation Treaty—International Searching Authority, Search Report and the Written Opinion, dated Mar. 8, 2018, 9 pages, Alexandria, Virginia.

*Primary Examiner* — Nathan J Newhouse
*Assistant Examiner* — Lester L Vanterpool
(74) *Attorney, Agent, or Firm* — Stetina Brunda Garred and Brucker

(57) ABSTRACT

A carrier system and method for assisting in handling cargo of a vehicle. A carrier container includes an interior storage space surrounded by a front side facing the rear of the vehicle, rear, left, right, and bottom sides, and an open top that allows access to the interior storage space with a lid that closes and opens the top. A carrier support structure mounted to the carrier container is inserted into the hitch of the vehicle and holds the top surface of the container flush with the cargo bed of the vehicle. The lid is opened to deploy a ramp stored inside which is anchored to the container so that it is flush with the top surface of the container and reaches the ground. The lid is closed and a bridge plate commonly hinged with the lid is deployed over any gap between the cargo bed and the container top, providing a continuous surface between the cargo bed and the ground for use by pets for ingress and egress of the vehicle and for handling cargo.

12 Claims, 37 Drawing Sheets

Related U.S. Application Data continuation of application No. 15/391,503, filed on Dec. 27, 2016, now Pat. No. 10,029,598.

(51) Int. Cl.
- *B65G 67/00* (2006.01)
- *B65G 69/30* (2006.01)
- *A01K 1/035* (2006.01)

(58) Field of Classification Search
USPC ......... 224/521, 519, 524, 525; 414/537, 474
See application file for complete search history.

(56) References Cited

U.S. PATENT DOCUMENTS

| | | | |
|---|---|---|---|
| 4,087,876 A * | 5/1978 | Fillman | B65G 69/30 14/72.5 |
| 4,209,869 A * | 7/1980 | Trine | B65G 69/30 14/69.5 |
| 4,266,821 A | 5/1981 | Gillet | |
| 4,294,571 A * | 10/1981 | Tordella | B60P 1/003 414/537 |
| 4,443,905 A * | 4/1984 | Kopp | B65G 69/30 14/69.5 |
| 4,878,800 A * | 11/1989 | Dell | B65G 69/30 414/401 |
| 4,900,217 A * | 2/1990 | Nelson | B60P 1/431 14/71.1 |
| 4,915,437 A | 4/1990 | Cherry | |
| 5,026,243 A * | 6/1991 | Dell | B65G 69/30 14/71.1 |
| 5,033,662 A * | 7/1991 | Godin | B60R 9/065 224/506 |
| 5,125,710 A | 6/1992 | Gianelo | |
| 5,156,432 A * | 10/1992 | McCleary | B60P 1/435 296/57.1 |
| 5,199,842 A * | 4/1993 | Watt | A61G 3/0209 224/497 |
| 5,215,234 A * | 6/1993 | Pasley | B60R 9/06 224/508 |
| 5,342,105 A * | 8/1994 | Miles | B60P 1/435 296/57.1 |
| 5,395,020 A * | 3/1995 | King | B60R 9/065 224/521 |
| 5,439,151 A | 8/1995 | Clayton | |
| 5,467,855 A * | 11/1995 | Sorensen | B60P 1/431 193/5 |
| 5,553,762 A * | 9/1996 | Brown | B60P 1/435 224/310 |
| 5,586,702 A | 12/1996 | Sadler | |
| 5,649,732 A * | 7/1997 | Jordan | B60P 1/43 296/26.1 |
| 5,699,985 A * | 12/1997 | Vogel | B60R 9/06 224/521 |
| 6,237,823 B1 | 5/2001 | Stewart et al. | |
| 6,379,101 B1 * | 4/2002 | Breaux | B60P 1/43 224/521 |
| 6,502,730 B2 * | 1/2003 | Johnson | B60R 9/06 224/402 |
| 6,513,690 B1 | 2/2003 | Churchill et al. | |
| 6,533,337 B1 * | 3/2003 | Harshman | B60P 1/43 224/403 |
| 6,641,190 B2 | 11/2003 | Kirchhoff | |
| 6,725,487 B2 | 4/2004 | Myrick et al. | |
| 6,752,302 B2 | 6/2004 | Anton | |
| 6,783,315 B1 * | 8/2004 | Senechal | B60P 1/43 224/502 |
| 6,923,354 B2 | 8/2005 | Axelson | |
| 6,948,732 B2 * | 9/2005 | Amacker | B60R 9/06 280/415.1 |
| 7,083,219 B1 | 8/2006 | Gregory | |
| 7,083,373 B1 * | 8/2006 | Boudreau | A61G 3/0209 414/462 |
| 7,309,093 B2 | 12/2007 | Ward | |
| 7,500,706 B2 | 3/2009 | Anderson et al. | |
| 7,574,764 B1 * | 8/2009 | Irving | B60P 3/1033 14/69.5 |
| 7,628,439 B1 | 12/2009 | Strong | |
| 7,699,378 B2 | 4/2010 | Smith et al. | |
| 7,785,058 B2 * | 8/2010 | Ray | B60R 9/065 224/527 |
| 7,905,532 B2 | 3/2011 | Johnson | |
| 8,061,754 B1 * | 11/2011 | Webb | B60P 3/122 14/71.1 |
| 8,210,591 B2 | 7/2012 | Martin | |
| 8,292,565 B1 * | 10/2012 | Ruff | B60P 1/43 14/71.1 |
| 8,302,235 B1 * | 11/2012 | Bailie | B60P 1/43 14/69.5 |
| 8,348,325 B2 | 1/2013 | Hausler et al. | |
| RE44,454 E | 8/2013 | Aghajanian | |
| 8,561,238 B1 | 10/2013 | Inget | |
| 8,668,427 B1 * | 3/2014 | England | B60P 1/43 414/537 |
| 8,820,598 B2 | 9/2014 | Tennyson et al. | |
| 8,925,777 B1 | 1/2015 | Casucci et al. | |
| 8,979,157 B2 | 3/2015 | Nelson | |
| 9,016,750 B2 | 4/2015 | Izydorek | |
| 9,174,113 B2 * | 11/2015 | Thompson | A63C 19/10 |
| 9,308,947 B2 | 4/2016 | Kmita et al. | |
| 9,775,326 B1 * | 10/2017 | MacNeil | A01K 1/035 |
| 2005/0263555 A1 | 12/2005 | Hail | B60P 1/43 224/402 |
| 2006/0133915 A1 * | 6/2006 | Day | B60P 1/43 414/537 |
| 2007/0237615 A1 * | 10/2007 | Bailie | B60P 1/43 414/467 |
| 2008/0190977 A1 | 8/2008 | Estabrook | |
| 2009/0230642 A1 * | 9/2009 | Thomas | B62B 5/0003 280/33.992 |
| 2010/0206929 A1 | 8/2010 | Perry | |
| 2010/0224663 A1 | 9/2010 | Butler, III | |
| 2012/0325877 A1 | 12/2012 | Franks | |
| 2013/0019417 A1 * | 1/2013 | Kenny | B60P 1/435 14/69.5 |
| 2013/0045069 A1 * | 2/2013 | Day | B60P 1/43 414/537 |
| 2013/0175820 A1 | 7/2013 | Lepage | |
| 2013/0343847 A1 | 12/2013 | Freeman | |
| 2014/0119863 A1 | 5/2014 | Hill et al. | |

* cited by examiner

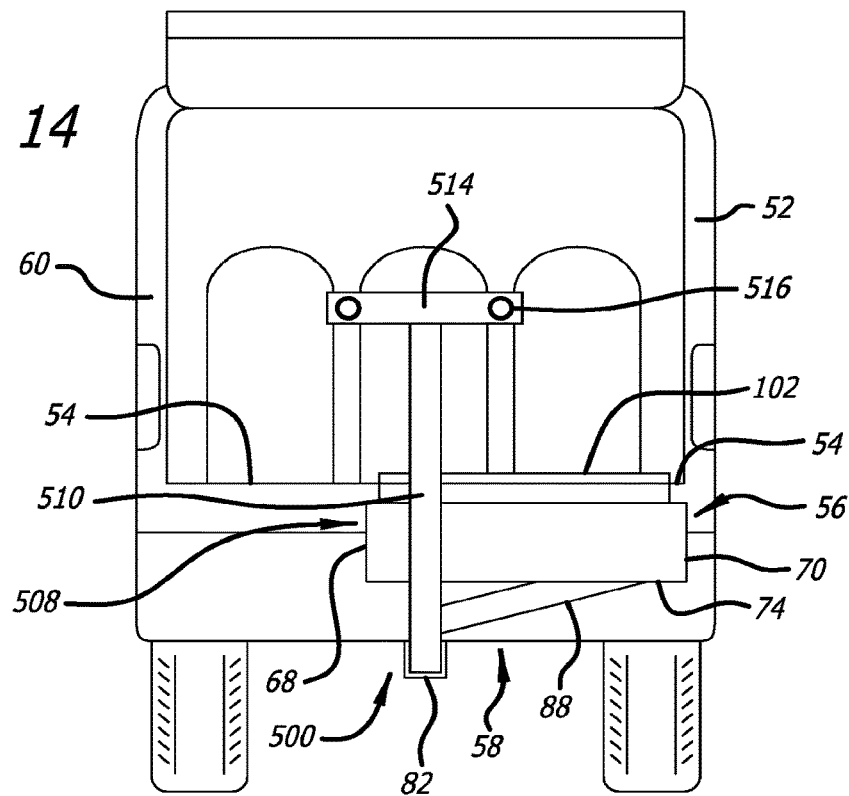
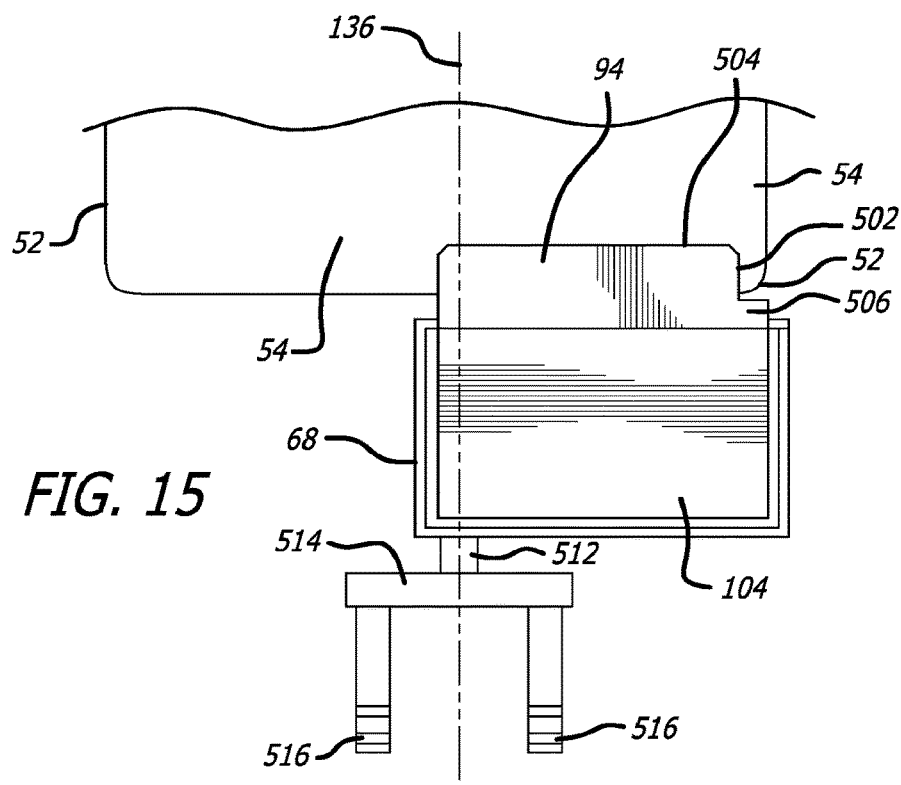

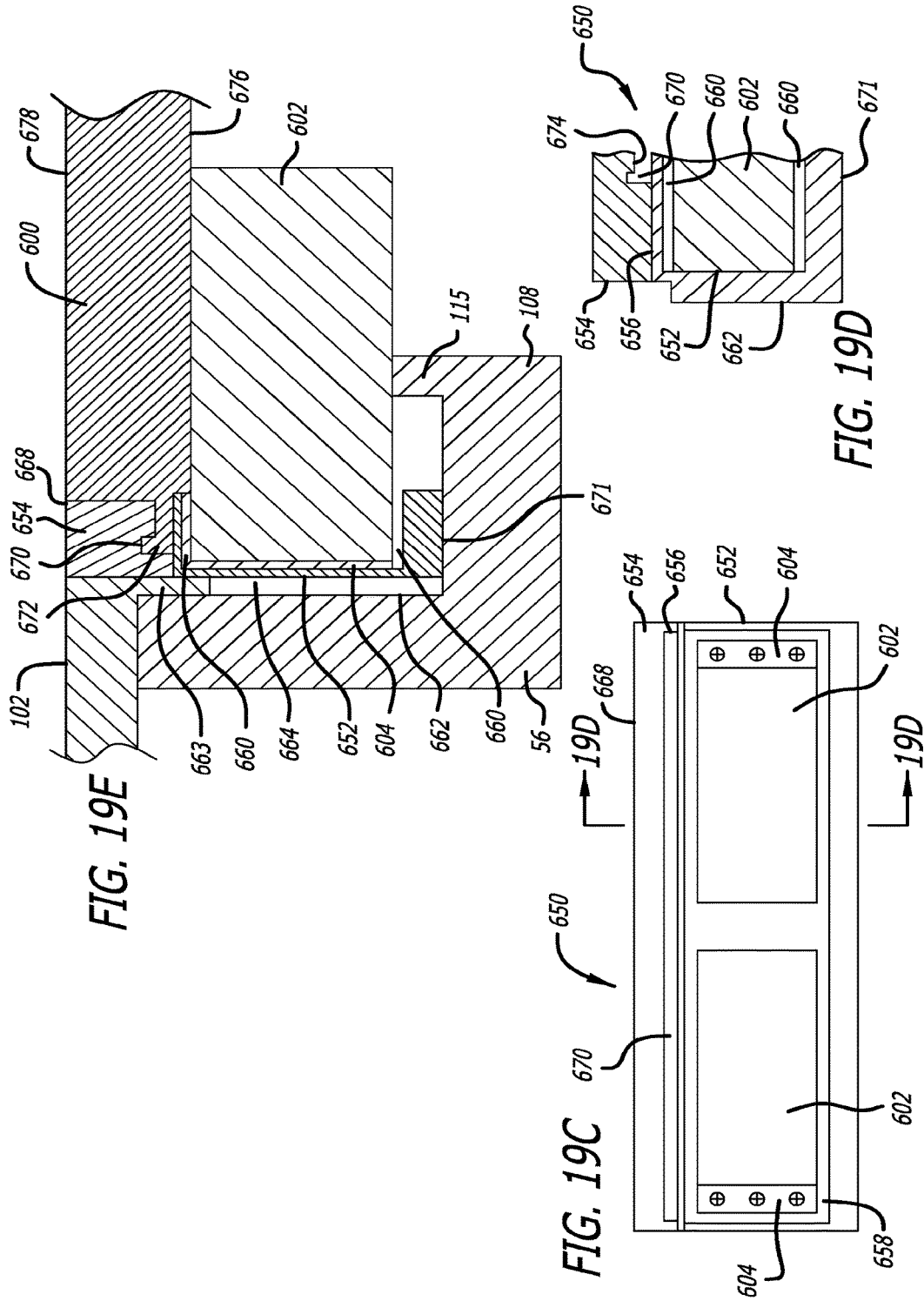

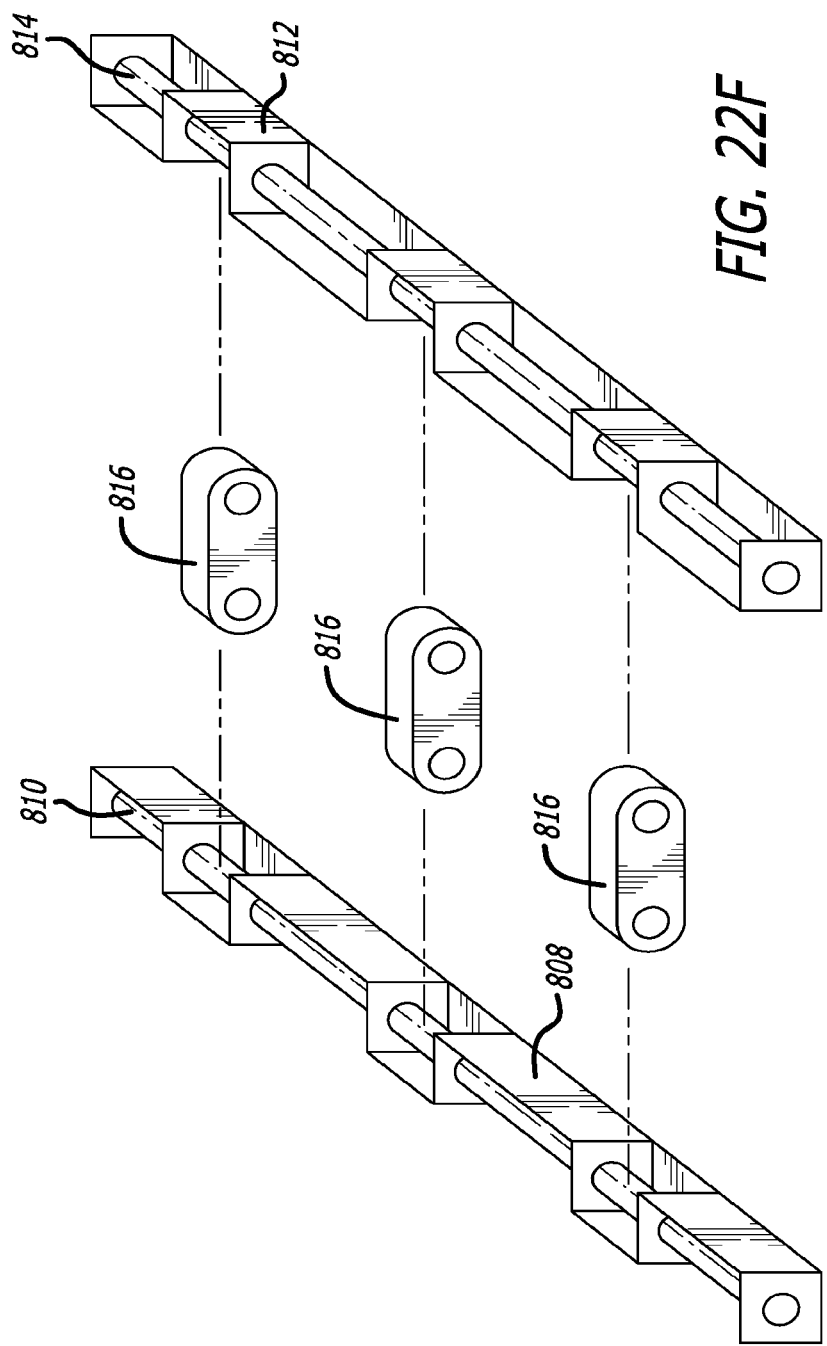

CARRIER SYSTEM WITH RAMP AND BRIDGE DEVICE AT CARGO BED

BACKGROUND

The invention relates generally to a carrier system and method usable with a vehicle for handling cargo, and more particularly to a carrier system and method that provides a level and contiguous surface with the bed of the vehicle and extends out the back of the vehicle for easier handling of the cargo.

Vehicles are often used to transport cargo which can take many forms. For the purposes of this application, cargo is used to refer to inanimate items as well as animals. Cargo can range from smaller sizes to larger sizes. Many vehicles have a cargo bed extending from the back of the vehicle to a more forward position. Cargo may be placed on the bed for transport and if needed, secured in position with straps or other devices. The back of the vehicle has a door or doors which, when opened, allow access to the cargo bed for handling the cargo as needed. Cargo may be both loaded onto the cargo bed or removed from the cargo bed and the vehicle through the back door.

Full size vans, minivans, sport utility vehicles (SUVs), hatchbacks, delivery vans, utility vehicles, work trucks, pick-up trucks, and station wagons are just a few examples of vehicles with cargo beds. A cross-over utility vehicle example is the Audi® Q7 TDI. This vehicle has a cargo bed that is accessible through the vehicle's rear door by opening the rear door in an upward direction. Cargo beds are also similarly present in many non-motorized vehicles, such as U-Haul® trailers.

Regardless of vehicle size, loading and unloading cargo into the vehicle's cargo bed can be difficult. Heavy cargo can be hard to handle, especially if it is bulky. A vehicle with a protruding bumper may obstruct an operator from standing straight up when accessing the cargo bed which requires the operator to bend over to load something onto the cargo bed or to pull something off the cargo bed. Bending in this way puts stress on the operator's lower back which may strain the lower back and or potentially cause more serious injury. A structure that allows for an exterior resting surface extending out the back of the vehicle that is flush with the interior surface of the vehicle would help facilitate the moving of cargo in and out of the vehicle. The exterior resting surface allows for cargo to be pulled and slid from inside the interior cargo area of the vehicle to the exterior resting surface outside of the vehicle before being lifted and carried away either from the left, from the right, or from the back of the vehicle.

This problem also applies to animals, such as pets, that are transported in a vehicle. When transporting dogs in the car, young and healthy dogs are generally able to jump in and out of the car without significant risk of injury; however older, injured, and smaller dogs cannot jump in and out of the car without significant risk of injury. Therefore, in many cases it is necessary for the owner to manually lift the dog into and out of the car to prevent injury from jumping. Picking up a dog from the ground to put it into the car and taking it from the car and putting it down on the ground can be quite a burden for both the dog and the owner. This burden is magnified when the lifting process is done several times per day and further magnified when the dog is heavy or squirms a lot when being lifted.

Many people cannot lift their dogs because of age, injury, lack of physical strength, or other physical limitations, as well as fear of injuring themselves from lifting, fear of injuring the dog from dropping it during the lifting process, the difficulty of lifting a squirming dog, or fear of dirtying their clothing from lifting the dog. It is particularly difficult to lift and carry heavy dogs to and from the ground because holding the dog requires the owner to be bent over when lifting, which is very stressful on the lower back. A protruding bumper can make it more difficult to get into the proper position to both gently lift the dog from the cargo area as well as gently place the dog into the cargo area of a vehicle. Being out of proper position can make lifting more stressful for the back of the owner and more difficult to get a secure hold on the dog. It would be much better for both the owner and the dog if the owner never had to lift the dog to get it into and out of the vehicle.

When transporting dogs in the car, older, injured, or smaller dogs should not be allowed to jump in and out of the car because of the significant risk of injury. Older dogs develop progressive physical limitations as they age which makes jumping more difficult and dangerous. Injured dogs cannot jump at all for obvious reasons, and smaller healthy dogs cannot safely jump the distances necessary to get into and out of the car. The risk of injury to a dog from jumping into and out of a car increases exponentially as the height required to jump into and out of the car increases. Cars that are higher off the ground, such as larger SUVs, are much more difficult and dangerous for a dog to jump into and out of than cars that are lower to the ground, such as station wagons. The risk of injury to a dog from jumping into and out of the car increases significantly as the dog's age increases.

Jumping into the vehicle requires the dog to explode off its back legs to gain the height necessary to get in the vehicle, which can put a tremendous amount of stress on the dog's hips, knees, and knee ligaments. This type of explosive leap can have terrible degenerative effects on a dog's joints and ligaments over time, can lead to significant injuries at any time, and can greatly exacerbate existing injuries. Jumping into the car can cause muscle tears, exacerbate arthritis, cause torn knee ligaments, cause hip injuries, and accelerate conditions such as hip dysplasia. Explosive leaps can be particularly dangerous from a cold start when the dog is not warmed up, as well as from a fatigued start when a dog is tired from exercising.

Jumping out of a vehicle requires the dog to sustain repeated high force compressions on the joints of the front paws, ankles, elbows, shoulders, neck, and back. This type of jumping can have terrible degenerative effects on the dog's joints and disks over time, can lead to significant injuries at any time, and can greatly exacerbate existing injuries. Jumping out of the vehicle can cause muscle tears, exacerbate arthritis, cause ankle injuries, cause elbow injuries, cause shoulder injuries, cause back injuries, and cause neck injuries. Jumping can be particularly dangerous from a cold start when the dog is not warmed up, as well as from a fatigued start when a dog is tired from exercising. As a result, as dogs get older or are injured the simple task of jumping into and out of the car can become too physically demanding and can become a very dangerous health risk. Eliminating jumping into and out of the car prevents injuries to the dog, significantly increases the dog's quality of life, improves the dog's mental health, and greatly increases the dog's longevity. It would be much better for both the owner and the dog if the dog never had to jump to get into and out of the car.

If the dog cannot jump into and out of the car and the owner cannot lift the dog into and out of the car, it can seem as though it is impossible to take the dog anywhere. Therefore, some owners tend to leave their older or injured dogs at home alone as a result of the difficulties and risks of getting the dog into and out of the car. For many pets, being left alone can result in depression and loneliness. Dogs would much prefer to be with their owners in the car than left at home. Older or injured dogs that cannot exercise or play as they used to, find the process of riding in a vehicle to be a very enjoyable and exciting experience. Riding in the car can be one of an older or injured dog's last great pleasures and greatly increases its quality of life. Also the ability to take an older or injured dog to new places safely and easily greatly enhances its quality of life.

Providing a better method to get a dog into and out of a vehicle would enable a pet owner to bring the dog on more trips, eliminate the possibility of injury to the owner and the dog while getting the dog into and out of the vehicle, greatly increase the dog's quality of life, and enhance the dog's mental health. A structure used to get a dog into and out of a vehicle that is relatively easy to deploy, use, and store would make the pet owner more inclined to take the pet in the vehicle. Both pet and owner would derive benefit from such a system.

Ramps are well-known structures and are often used to facilitate the loading and unloading process for a vehicle. A ramp is typically defined as a flat supporting surface that can be tilted at an angle, with one end higher than the other. It is used as an aid for raising or lowering a load and is also referred to as an inclined plane. The advantage of using a ramp for loading cargo into a vehicle is the ramp provides an angled flat surface from the ground to the interior cargo area of the vehicle. Creating an angled flat surface is particularly valuable in the case of a dog that can walk on its own because the ramp allows the dog to walk into and out of the car which eliminates the need for the owner to lift the dog into and out of the car as well as eliminates the need for the dog to jump into and out of the car. This can be a tremendous advantage for both pets and pet owners.

The ramp's slope angle has a big impact on how difficult it is for the pet to walk up and down the ramp, so reducing the slope angle is very beneficial. The two most important factors that impact the ramp's slope angle are the ramp length and the height difference between the ramp's top resting surface and the ramp's ground resting surface. Increasing the ramp length and reducing the height difference between the top and ground ramp resting surfaces make using the ramp much easier for the dog. It is important to note that many times when using a ramp that is oriented perpendicularly to the longitudinal axis of a car, there is a curb present which raises the ground height relative to the side of the car above the ground height of the street where the car is parked. As a result, when using a ramp perpendicularly to a vehicle when there is a curb present, the height difference between the top and ground resting surfaces of the ramp can be significantly reduced which consequently reduces the ramp slope angle. This is a major benefit for using a ramp perpendicularly to the vehicle.

Creating an angled flat surface with a ramp also allows cargo to be rolled into a vehicle as opposed to lifted which allows the user to manage much heavier loads at once and to do so much more quickly and safely. Although rolling cargo up a ramp incline requires work, it is typically much less strenuous than lifting. The ramp slope angle has a big impact on the amount of work required to roll cargo up and down the ramp so reducing the slope angle of the ramp is very beneficial. The two most important factors that impact the ramp slope angle are the ramp length and the height difference between the ramp's top resting surface and the ground resting surface. Maximizing the ramp length and minimizing the height difference between the top and ground ramp resting surfaces makes rolling cargo in and out of the vehicle easier.

Ramps come in many forms, many lengths, and have different design features which lend themselves to different applications. Ramps typically have an angled top resting surface to make transitioning to the ramp smoother as well as to facilitate a more secure resting profile. Ramps typically have a height of several inches so that when deployed on a flat surface the ramp surface is several inches above the flat surface. Typically, the part of the ramp that comes into contact with a resting surface has a non-slippery surface such as one formed of rubber which creates a higher friction coefficient between the ramp and the surfaces with which it connects. This friction provides a grip between the ramp and the resting surfaces which tends to restrict relative motion. Making sure the ramp does not move while in use can be critical for the safe use of a ramp. Risks that could lead to a ramp moving while in use are from the ramp tilting over to either side as a result of not resting on a flat, secure, level, and stable surface, the ramp sliding off the lower resting surface as a result of a slippery connection with the ground and/or upper resting surface, the ramp sliding off the upper resting surface as a result of the absence of a safety lip on that resting surface, or the ramp falling to the ground as a result of a resting surface failure.

A ramp resting on flat stable surfaces at both the upper end and the lower end and used with a dog under general use conditions is secure enough so as not to move when in use. The forces of gravity and the force of friction will keep the ramp steady. Under general use conditions with a dog it is not necessary to secure the ramp with any special anchoring system, however a safety feature in the form of a raised tongue on the outside perimeter of the resting platform at the upper end of the ramp eliminates the small risk of the ramp sliding off the resting surface while in use. In some cases, such as when rolling cargo into the vehicle, the process of using the ramp may have more risk than general use conditions with a dog and it is necessary to have a secure anchoring mechanism connecting the ramp and the resting surface to provide more robust protection against the ramp moving while in use.

When using a ramp with a vehicle there are several difficulties that present themselves. These include the difficulty of finding a flat, stable, and secure resting surface in the vehicle for the ramp to rest on, the difficulty of finding a way the ramp can be used perpendicularly to the longitudinal axis of a vehicle in addition to parallel to the vehicle, the difficulty of finding a way to reduce the slope angle of the ramp, and the difficulty of finding a way to smooth the transition to the ramp from the vehicle's interior surface. When using a ramp with a vehicle the rear door entrance is the only practical option for accessing the cargo area. The back side doors of most cars do not open wide enough to allow a ramp with modest width to rest perpendicularly to the car which makes it impossible to access a secure and stable resting surface for the ramp inside the car. The front doors typically open wide enough for the ramp to rest perpendicularly however the top of the ramp must rest on the front seat of the car which is not a stable, level, and flat surface. Further, in order to exit the car from the front door, the dog must transition from the rear of the car through the area between the front seats to the front seat and then to the ramp which can be difficult and dangerous for older or injured dogs.

The rear door of a vehicle in most cases spans the width of the entire vehicle as well as opens either up or to the side which creates an open space in the vehicle that is wide enough to accommodate the width of the ramp and an open space behind the vehicle that is not blocked by the door itself. When using a ramp through the rear door opening of a vehicle, the user rests the top of the ramp on the interior surface of the vehicle's cargo area and the rear of the ramp behind the vehicle on the ground so that the ramp is resting out the back of the vehicle parallel to the longitudinal axis of the vehicle. There are several drawbacks to this method. Firstly, if there is another car parked behind the vehicle or another obstruction behind the vehicle, then it is not possible to deploy a ramp out the rear of the vehicle. Secondly, when the ramp rests on the interior cargo surface of the vehicle the ramp surface is several inches above the interior cargo surface which creates a non-flush transition to the ramp and increases the ramp slope angle. A non-flush transition and increased slope angle makes using the ramp much more strenuous as well as dangerous for the dog.

Thirdly, it is not possible to rest the ramp below the vehicle's interior surface height because of the interior construction of the vehicle. This makes it impossible to create a smooth transition to the ramp as well as limits the ability to reduce the ramp slope angle. Fourthly, many times the surface at the entrance to the interior cargo area of a vehicle is designed so that it is not completely flat or completely level in order to facilitate the loading and unloading of cargo; however, this makes the resting surface less secure and less safe for using a ramp. Fifthly, the ramp can only be deployed when the rear door is open and cannot remain deployed when the rear door is closed. Sixthly, the ramp cannot be used in a direction perpendicular to the longitudinal axis of the vehicle at the back of the vehicle because the rear of the vehicle does not have a stable ramp resting surface which is perpendicular to the back of the vehicle and accessible from the side of the vehicle.

A structure mounted to the back of the vehicle that includes secure ramp resting surfaces on its side perimeter and enables a stable flat contiguous exterior surface that extends out the back of a vehicle that is flush with the interior of the vehicle would facilitate, enhance, and improve the use of a ramp from the back of a parked vehicle. Such a structure would allow for a ramp to be deployed perpendicularly to the right, perpendicularly to the left, or parallel to the back of a parked vehicle. Such a structure would provide a safe and easy transition method from the interior surface of the vehicle to any of the potential ramp resting positions off the contiguous exterior surface. Such a structure would allow the ramp to be rested at a position below the interior surface level so that the top surface of the ramp is level with the interior surface of the vehicle which smoothens the transition to the ramp from the interior surface and lowers the slope angle of the ramp. Such a structure would allow the ramp to remain deployed whether the rear door is closed or open.

When storing a ramp in a vehicle while driving there are several key issues that present themselves. The first issue is finding an easy, convenient, and non-obstructive place to store the ramp while driving. When storing a ramp in the vehicle cargo area it can either be stored lying flat on its top or stored standing up on its side. If the ramp is stored lying flat on its top it can easily take up over half the usable surface area of the cargo area which significantly restricts the amount of space available for other cargo. When travelling with a dog or dogs in the vehicle they typically require a lot of open space to sit down, move around, and be comfortable. It may be that there is not enough space in the vehicle's cargo area to accommodate both the ramp lying flat and a comfortable riding space for the dog or dogs. In addition, it may not be safe for the dog to ride in the cargo area with a ramp lying flat because the dog could hit or fall on the ramp while driving and hurt itself. Further, if the ramp is stored lying flat additional cargo cannot be stored on top of the ramp because the ramp must but be reasonably accessible for deployment when the vehicle is stopped. If the ramp is stored lying on its side, it does not take up nearly as much surface area as it does if it is lying flat however it must be very well secured so it does not fall over or move while driving as well as so it does not make extremely annoying rattling noises while driving. Securing the ramp when it is lying on its side in the back of the vehicle requires the user to bend inside of the vehicle and strap the ramp to the side of the vehicle which can take time, be quite tedious, and be strenuous on the lower back. Further, even with the best effort it can be quite difficult to secure the ramp tightly enough to totally restrict its movement under the vibration and other forces that are typical in a moving vehicle. Further, when the ramp vibrates it can make very annoying rattling noises.

The second issue associated with storing a ramp in the vehicle is the process of securing the ramp in the vehicle, unsecuring the ramp from the vehicle, lifting the ramp in the vehicle, lifting the ramp out of the vehicle, deploying the ramp for use, and breaking down the ramp for storage. All of these can get quite cumbersome so anything that can simplify, minimize, and ease these processes would be a benefit.

The third issue associated with storing a ramp in a car is that ramps can get dirty during use and storing the ramp in the car can transfer that dirt into the car. Some commercial trucks have a ramp and a ramp storage area built into the rear of the truck beneath the cargo bed. The ramp is merely pulled out of the back, the front end lifted into the anchor position, and in just a few minutes, the ramp is fully mounted to the vehicle and ready for use. When the vehicle must be driven, the ramp is simply unhooked from the anchor position and slid back into the ramp storage area. It is locked there and the vehicle may be driven. This storage process can be completed in less than two minutes. However, many vehicles, such as passenger vehicles including minivans and utility vehicles do not have a built-in ramp system such as this. The ramp must be stored elsewhere. A structure that would allow for the easy storage of a ramp in a passenger vehicle as well as one that reduces the effort involved in deploying the ramp from a passenger vehicle would be of benefit.

There are many pastimes for which people use their vehicles including camping, tailgating, and hunting. When using a vehicle while engaging in pastimes, many people work or operate out of the backs of their vehicles. When working or operating out of the back of a vehicle it is necessary to have available surface space to place and rest gear, equipment, or any number of things. The interior cargo area of the vehicle can serve this purpose however there are several drawbacks with this method. First, if the cargo area of the vehicle is fully loaded then some of the cargo must be removed from the vehicle to make open surface space available for working or operating. Removing the cargo from the vehicle to make available surface space can be a hassle, can be physically demanding, and requires cargo to be placed somewhere else such as on the ground which could get the cargo dirty. Second, when working out of the back of a vehicle's cargo area, the surface can only be accessed from directly behind the vehicle and cannot be accessed from the side of the vehicle. Third, when working or operating out of a vehicle's cargo area it is necessary to bend over and lean in to access things on the vehicle cargo area surface which can be strenuous on the lower back. This is magnified if there is a protruding bumper.

Fourth, many times when working or operating out of the back of a vehicle the amount of surface space available for use is not enough to cover the requirements of the task at hand. Fifth, many times while working or operating out of the back of a vehicle a mess can be made or an accident can happen that would not be wanted in the interior surface of the vehicle. An accident or mess in the interior surface of the vehicle can be difficult to clean, can complicate using the space for other cargo, could make driving in the vehicle uncomfortable for passengers because of odor, and may cause long term damage to the vehicle.

A structure that allows for a convertible stable contiguous exterior surface out the back of the vehicle that is flush with the interior of the vehicle would provide significant additional exterior surface space out the back of the vehicle that is easy to access and which could be used to facilitate working or operating from while engaged in pastimes. A structure that allows for a convertible contiguous exterior surface that extends out the back of the vehicle would allow users unrestricted access to work and operate from the right side of the exterior surface, the left side of the exterior surface, and the back of the exterior surface. The ability to operate from all three sides of the surface greatly improves the utility and the usability of the surface as well as eases the need to bend over while accessing things on the surface which reduces strain on the lower back. The more exterior surface space out the back of the vehicle that is available to use when working or operating then the greater the utility and usability of the exterior surface area. Additional surface extensions that allow for the expansion of the main contiguous exterior surface would be a benefit. The more placement options that are available for additional surface extensions then the greater the flexibility and use options when working or operating from the back of a vehicle while engaged in pastimes. A convertible contiguous exterior surface could be hosed off and easily washed which would be handy when managing messes and accidents.

Hence, those of skill in the art have recognized a need for an improved system and method of loading and unloading cargo from a vehicle. A need is also recognized for an improved system of loading and unloading living cargo, including pets, into and out of a vehicle easily and safely using a ramp, and of storing the ramp for ready access during the loading and unloading process. A need is further recognized for an improved system that allows cargo to be moved sideways into and out of the cargo bed of the vehicle, such as from a sidewalk. The present invention meets these needs and other needs.

BRIEF SUMMARY

Briefly and in general terms, the present invention is directed to a system and method for loading and unloading cargo from the rear of a vehicle using an externally-mounted carrier container and a ramp that provide a continuous surface between the cargo bed of the vehicle and a ground surface. In particular there is provided a carrier system for use with a vehicle to assist with handling cargo of the vehicle, the vehicle having a cargo bed and an opening through which cargo may be removed from and loaded into the vehicle, the carrier system comprising a carrier container that includes an interior storage space surrounded by a front side facing the rear of the vehicle, a rear side, a left side, a right side, a top side, and a reinforced bottom side, one of the sides of the carrier container being open and allowing access to the interior storage space, a carrier support structure having a first end configured to connect to the vehicle and a second end connected to the carrier container, the carrier support structure configured to hold the carrier container in a selected position relative to the cargo bed of the vehicle, a bridge device pivotally mounted to the top side of the carrier container and pivotable between a non-deployed configuration in which the bridge device rests on the top of the carrier container outside the opening of the vehicle, and a deployed configuration in which the bridge device pivots towards the back of the vehicle and provides a bridge over a gap between the cargo bed of the vehicle and the top of the carrier container, the bridge device having a width in its deployed configuration that spans the distance between the cargo bed of the vehicle and the top of the carrier container, and a ramp having a proximal end configured to engage the carrier container and a distal end configured to engage a ground surface thereby providing a sloped surface between the top of the carrier container and the ground surface.

In more detailed aspects, the interior storage space of the carrier container is sized to receive and store the entire ramp when it is not deployed. The ramp can extend from a stored and compact configuration telescopically or have two hingedly-connected segments collapsible between a compact configuration and an extended configuration; and the interior storage space of the carrier container is sized to be large enough to fit the ramp inside the interior storage space when the ramp is in its compact configuration.

In other aspects, the carrier support structure comprises a height adjustment mechanism positioned between the first and second ends of the carrier support structure, the height adjustment mechanism operable to move the carrier container relative to the first end and selectively position the carrier container such that the top side of the carrier container is flush with the cargo bed of the vehicle. The first end of the carrier support structure comprises a tongue that is removably insertable into a receiver opening of a trailer hitch of the vehicle, and a plurality of support arms including a vertical support arm and an upwardly-angled support arm, all arms being connected between the tongue and the carrier container to hold and position the carrier container adjacent the rear of the vehicle. In one embodiment, the tongue is removably insertable into a hitch extender which is attached to the trailer hitch of the vehicle.

Also in other detailed aspects, the carrier system further comprises a carrier container lid pivotally mounted to the carrier container between a closed configuration in which the carrier container lid covers the open side and an open configuration in which the carrier container lid uncovers the open side thereby allowing access to the interior storage space. The open side of the carrier container is the top side and the lid is disposed to cover the open top side, and further comprising a common hinge by which the carrier container lid and the bridge device are pivotally mounted together to the carrier container at the top side such that the lid is mounted closest to the open side of the carrier container and the bridge device is mounted on top of the lid, whereby when the bridge device may be pivoted to its deployed position at the cargo bed regardless of the position of the lid. In more detail, the common hinge comprises a hinge barrel that includes a lid hinge knuckle connected to the carrier container lid, a bridge hinge knuckle connected to the bridge device, and a container hinge knuckle connected to the carrier container, the lid hinge knuckle, the bridge hinge knuckle, and the container hinge knuckle being assembled together to form the hinge barrel, and a single hinge pin extends through the lid hinge knuckle, the bridge hinge knuckle, and the container hinge knuckle such that the carrier container lid and the bridge hinge knuckle pivot coaxially about the common hinge relative to the carrier container. In another embodiment, the bridge device is pivotally mounted to the carrier container separately from the lid being pivotally mounted to the carrier container.

In further detailed aspects, the system comprises a weight-supporting brace mounted to the front side of the carrier container underneath the bridge device so that the bridge device rests on the brace when in the deployed configuration, the weight-supporting brace providing support for the combined weight of the bridge device and of cargo moved across the bridge device in its deployed configuration. A sill affixed externally to a side of the carrier container, wherein the sill includes one of a protrusion and a recess, wherein the proximal end of the ramp includes the other of the protrusion and the recess, whereby the proximal end of the ramp is secured to the carrier container when the protrusion engages the recess. The interior storage space of the carrier container includes a tray configured to receive and store the ramp in its compact configuration. The tray restricts the ramp movement while driving. The ramp includes retractable legs attached at its distal end which, when extended, raises the distal end up from the ground surface thereby lessening the slope of the ramp in relation to the top of the carrier container.

In yet further aspects, the open side of the carrier container is the top side of the carrier container, wherein the carrier container lid and the bridge device are pivotally mounted to the front side of the carrier container such that the hinged carrier container lid covers the top side in its closed configuration and the hinged bridge device rests on the carrier container lid in its non-deployed configuration. But in another aspect, the open side of the carrier container is one of the left and right sides of the carrier container, wherein the interior storage space of the carrier container includes a track affixed to one of the sides of the carrier container upon which the ramp is slidably disposed and accessible through the open side, wherein the carrier container lid is pivotally mounted to one of the top and bottom sides of the carrier container and covers the open side in its closed configuration.

In another detailed aspect of the invention, there is provided a work surface wherein the carrier container includes a mounting device configured to accept and secure the work surface in a fixed position in relation to at least one of the left side of the carrier container, the right side of the carrier container, and the rear side of the carrier container such that the work surface is at one side of the carrier container and does not reside on the top surface of the carrier container, and a support device located and configured to extend under the secured work surface to thereby provide vertical support to any work being performed on the work surface. The work surface is flush (at the same level) as the top surface of the carrier container.

In method aspects of the invention, there is provided a method for handling cargo of a vehicle, the vehicle having a cargo bed and a back opening through which cargo may be removed from and loaded into the cargo bed, the method comprising connecting the first end of the carrier support structure to the vehicle such that the carrier support structure holds a carrier container in a selected position relative to the cargo bed of the vehicle, positioning the carrier container adjacent the vehicle's opening, the carrier container including an interior storage space surrounded by a front side facing the rear of the mobile, a rear side, a left side, a right side, a top side, and a bottom side, one of the sides of the carrier container being open and allowing access to the interior storage space, the carrier container comprising a lid that covers the open side, and being supported by a carrier support structure having a first end configured to connect to the vehicle and a second end connected to the carrier container, adjusting the height of the top of the cargo container so that it is flush with the cargo bed of the vehicle, deploying a bridge device pivotally mounted to the top of the carrier container, the bridge device being pivotable between a non-deployed configuration in which the bridge device rests on the carrier container outside the opening of the vehicle, and a deployed configuration in which the bridge device provides a bridge over a gap between the cargo bed of the vehicle and the top of the carrier container, the bridge device having a width in its deployed configuration that spans the gap between the cargo bed of the vehicle and the carrier container, deploying a ramp having a proximal end to the carrier container to secure the ramp thereto wherein a top surface of the ramp at the proximal end is level with the top of the carrier container, the ramp having a distal end configured to engage a ground surface, and storing the ramp in the inner storage space of the carrier container. The bridge device is wide enough to cover the gap at the side edges of the cargo area, especially where the rear of the cargo area is curved.

More detailed method aspects include the step of deploying the ramp comprises opening the carrier container lid, removing the ramp from the interior storage space of the carrier container through the open side, unfolding the ramp to extend it to its full length, and engaging a proximal end of the ramp having one of a protrusion and a recess with the carrier container having the other one of a protrusion and a recess thereby securing the proximal end of the ramp to the carrier container. In yet further aspects the step of deploying a ramp open comprises opening either the left and right sides of the carrier container which is the open side, pulling the ramp through the open side along a track affixed to one of the sides of the carrier container upon which the ramp is slidably mounted.

Additional method aspects comprise opening the lid of the carrier container, removing the ramp from the carrier container, closing the lid of the carrier container; and deploying the ramp to engage the carrier container with the proximal end of the ramp such that a top surface of the proximal end of the ramp is flush with a top surface of the lid, and after a back door of the vehicle has been opened to allow access to the cargo bed of the vehicle, pivoting the bridge device from the lid of the carrier container into the cargo bed of the vehicle into its deployed configuration to provide a bridge over a gap between the top of the carrier container and the cargo bed.

The features and advantages of the invention will be more readily understood from the following detailed description that should be read in conjunction with the accompanying drawings.

BRIEF DESCRIPTION OF THE DRAWINGS

FIG. 14 is a rear view of a variation of the carrier system of FIG. 1A in which the carrier container has been mounted off-center from the longitudinal center line of the vehicle using a different configuration of a carrier support structure, the support structure also including a bike rack in this embodiment;

FIG. 15 is a top view of the carrier system of FIG. 14, illustrating the off-center mounting of the carrier's container, a modification to the bridge plate to properly fit within the cargo area of the vehicle, and the on-center mounting of the bike rack;

FIG. 19C is a rear view of a housing into which vertical support braces have been retracted. The support braces are configured to pivot outwards and under a work surface to provide vertical support to the work surface;

FIG. 19D is a cross-sectional view of a part of FIG. 19C showing part of the housing of the braces and a mounting device located above the braces configured to accept and secure a work surface in a fixed position in relation to a side of the carrier container and above the braces so that when the braces are pivoted outwardly, they will provide vertical support to the work surface;

FIG. 19E is a cross-sectional view similar to FIG. 19D but additionally shows a part of the carrier container, its lid, and a secured work surface with the vertical support braces;

FIGS. 22A-22L are plan views (FIGS. 22E and 22F in partial exploded form) depicting the operation of the hinge assembly and the pivoting movement of the bridge plate and carrier container lid.

DETAILED DESCRIPTION

Figure 1:
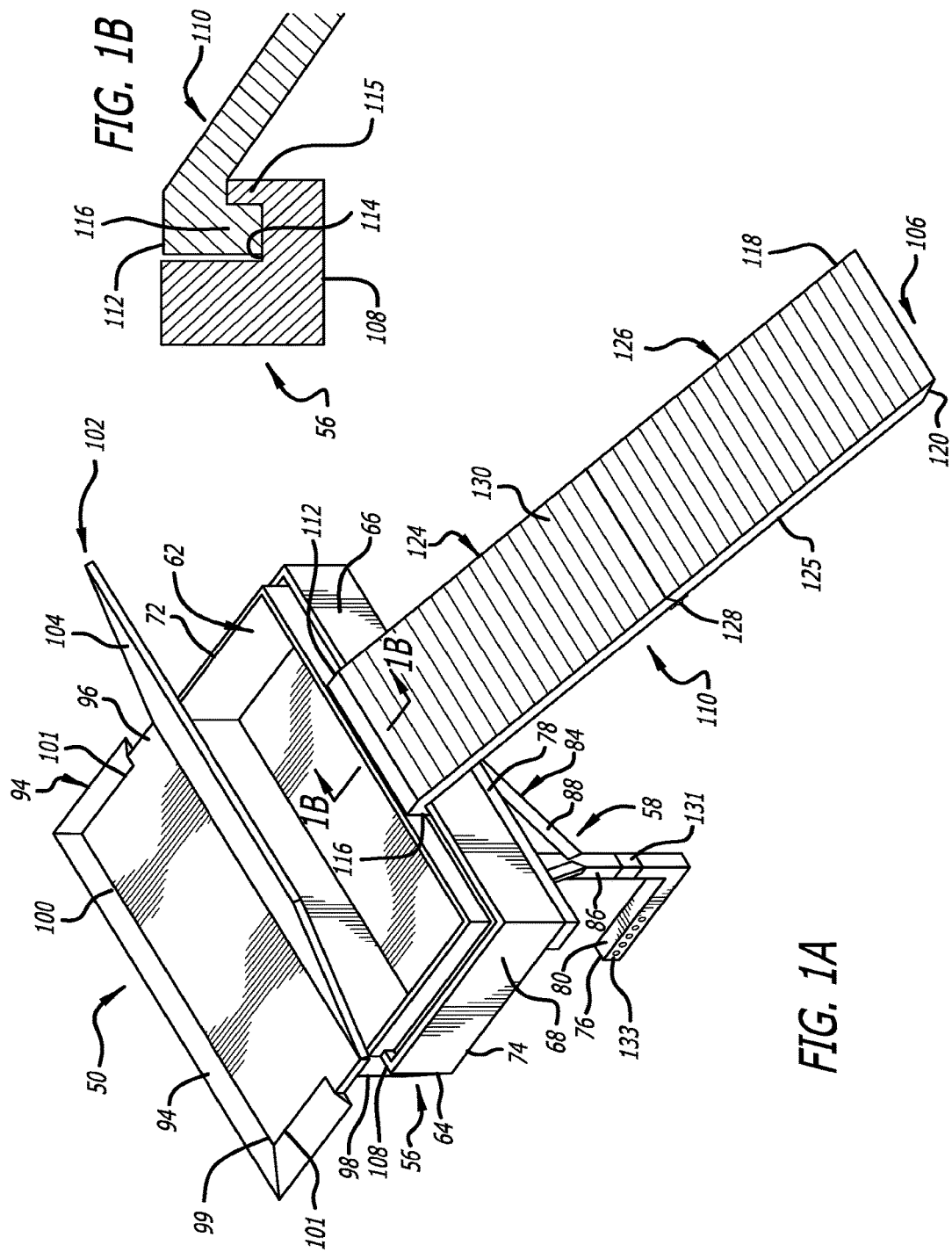
FIG. 1A is a perspective view of a carrier system for use in both loading cargo onto the cargo bed of a vehicle and unloading cargo from the cargo bed. The carrier system is shown as comprising a carrier container, a carrier support structure having a tongue that is formed to be inserted into the receiver opening of a vehicle hitch, a top hinged lid shown in a partially open/partially closed configuration, a removable ramp mounted to the back side of the carrier container in a configuration parallel to the vehicle and parallel to the tongue, and a rotatable bridge device shown in its deployed configuration, which in this case is a bridge plate.
FIG. 1B is a view of the detail of lines 1B-1B drawn in FIG. 1A illustrating a cross-sectional view of the sill and recess located about the exterior of the carrier container for receiving the anchoring device of the ramp.

Referring now in more detail to the exemplary drawings for purposes of illustrating embodiments of the invention, wherein like reference numerals designate corresponding or like elements among the several views, there is shown in FIG. 1A a carrier system 50 that is configured to be mounted to the rear hitch of a vehicle. The carrier system shown can be used to more easily load and unload cargo from the vehicle to which it is mounted, including pets.

As shown in FIG. 1A, the carrier system includes a carrier container 56 supported by a carrier support structure 58. The carrier container 56 includes an interior storage space 62 in which cargo can be stored. The interior storage space 62 is surrounded by a front side 64 of the carrier container that faces the rear of the vehicle, a rear side 66, a left side 68 and a top side 72. There is also a right side 70 and a bottom side 74 (which is a support structure) which are not shown in this drawing. The top side 72 of the carrier container is open in this embodiment to allow a vehicle operator to store a ramp 110 and other items depending on the amount of room that is available. The carrier container is preferably metal, such as aluminum, but may be made of wood or any other sturdy, durable material, including certain plastics. In one embodiment, the carrier container has a length between 3½-4 feet (106.7-122 cm), a width of 16½-17 inches (42-43 cm). The weight of the container and support structure in one embodiment is 100 pounds (45.4 kg). Preferably, the carrier container and support structure can support up to 400 pounds (181.4 kg) of cargo weight when attached to the rear of a vehicle.

The carrier support structure 58 has a first end 76 for connecting to the rear of the vehicle, and a second end 78 that is connected to the carrier container 56. The carrier support structure includes a tongue 80 configured for connection into the receiver opening of a vehicle's hitch (not shown), and a plurality of support arms 84 connected between the tongue and the carrier container 56. The plurality of support arms include a vertical support arm 86 and two upward angled support arms 88 used to support and hold the carrier container 56 in a selected position adjacent the rear of the vehicle and relative to the cargo bed 54 of the vehicle. In this embodiment, the vertical support arm is connected at the front 64 of the carrier container and the two angled support arms are connected at separate locations at the rear 66 of the bottom wall of the carrier container. This configuration may differ depending on the shape and weight of the carrier container and how much cargo weight it will need to support. For example, more or fewer support arms may be used. The carrier support structure may be made of wood, metal, or any other durable material that can support the weight of the carrier container, cargo stored in the carrier container, and cargo moved across the top of the carrier container.

When the carrier support structure 58 is mounted to the receiver of the hitch of the vehicle, a gap is formed between the rear of the vehicle and the front 64 of the carrier container 56. On conventional vehicles, this gap may range from as small as one inch to as large as on foot depending on the size of the vehicle's rear bumper and on the amount of curve at the back of the car. To bridge this gap, the carrier system in accordance with an aspect of the invention includes a bridge device which, in this embodiment, is a bridge plate 94 as shown in FIG. 1A that is pivotally mounted to the top side 72 (see FIG. 2) of the carrier container. The bridge plate in this embodiment comprises a metal plate having a bevel 99 at its forward end 100 and side ends 101 for creating a smoother transition surface between it and cargo surface 55 of a cargo bed 54 (see FIG. 2) of a vehicle into which it is deployed. Although not shown clearly in this figure, the bridge plate is pivotable between a stored configuration and a deployed configuration. The deployed configuration is shown in FIG. 1.

The purpose of the bridge plate 94 is to cover a gap that may exist between the cargo bed in the vehicle and the top of the carrier container 56 so that there is a smooth and continuous surface on which pets may walk and to slide cargo. Additionally, when the bridge plate is fully deployed, it may also serve as an extension to the cargo bed of the vehicle, thus providing more space for the storage of items. For example, during tailgating parties, vehicle operators may place items directly on the bridge plate, allowing them to easily access these items without having to reach farther into the vehicle.

The bridge plate 94 may be made of wood, metal, or any other material sturdy and durable enough to support the weight of objects moving across it. The bridge plate also preferably has a non-slip, roughened surface 96 to prevent pets and other cargo from slipping off of it. This non-slip surface may be formed, for example, by applying tape to the top surface of the bridge plate.

The bridge plate width depends on the amount of curvature of the rear of the vehicle as well as the distance between the outside edge of the rear cargo door and the beginning of the interior cargo area of the vehicle. These factors vary by vehicle but a vehicle with a greater curvature will require a longer bridge plate as will a vehicle with a larger distance between the outside edge of the rear cargo door and the beginning of the interior cargo area of the vehicle.

The distance between the outside edge of the rear cargo door and the beginning of the interior cargo area of the vehicle has to do with factors of vehicle design such as the width of the door jamb of the rear door, the width of the rubber insulation of the door jam, the width and location of the rear door locking mechanism, as well as vehicle features like an angled metal surface before the cargo area to facilitate the loading and unloading of cargo to and from the vehicle.

On an Audi® Q7 TDI for example, the bridge plate width is fourteen inches at its longest point. When the carrier is mounted as close to the rear of the vehicle as possible and the bridge plate is deployed, the part of the bridge plate that rests farthest inside of the cargo area is seven inches inside the cargo area of the vehicle. This is just inside the angled metal piece that facilitates the loading and unloading of cargo to and from the vehicle. The distance between the outside edge of the rear cargo door and the bridge plate in its stored and secured position on the exterior platform is also seven inches. This distance includes one and one-half inches for the width of the bridge plate brace on the back of the storage carrier as well as an additional five and one-half inch gap from the outside edge of the bridge plate brace to the outside edge of the rear cargo door.

If the carrier were to be mounted farther away from the vehicle then the bridge plate would have to be longer to accommodate the additional distance created by moving the carrier farther away from the vehicle. If a carrier were to have a top surface of eighteen inches in length which would assume a seventeen inch wide ramp as well as a one-half inch carrier side wall width, then the bridge plate when in the secured position on top of the carrier lid would cover fourteen inches of the top surface of the carrier lid. In a preferred embodiment, the bridge plate should cover approximately three-fourths of the top of the container lid when it is in the secured position on top of the carrier lid and should enter into the cargo area of the vehicle approximately seven inches when in the deployed position. These dimensions and ratios are variable of course, depending on the configuration of the cargo bay of the vehicle. Importantly, when deployed, the bridge plate must enter into and rest on the floor of the cargo area a sufficient distance so that cargo or animals can be transported over the bridge plate safely.

In the embodiment shown in FIG. 1A, a weight supporting brace 98 is mounted to the front surface 64 of the carrier container 56. For example, welding, screws and/or adhesive may be used for securing the supporting brace in the selected position. The supporting brace is placed just underneath the bridge plate 94 so that the bridge plate will rest upon it when deployed. The use of the weight supporting brace will increase the weight-bearing capacity of the bridge plate by transferring weight of cargo movement away from the hinge (not shown) of the bridge plate to the top of the front surface 64 of the carrier container. In one example, the weight supporting brace has a length that spans a portion of or the entire length of the carrier container. The weight supporting brace is preferably metal, but may be wood or any other sturdy or durable material. In another embodiment, a weight supporting brace includes gaps to receive the hinge(s) when the bridge plate is deployed (see FIGS. 9 and 10A).

Figure 2:
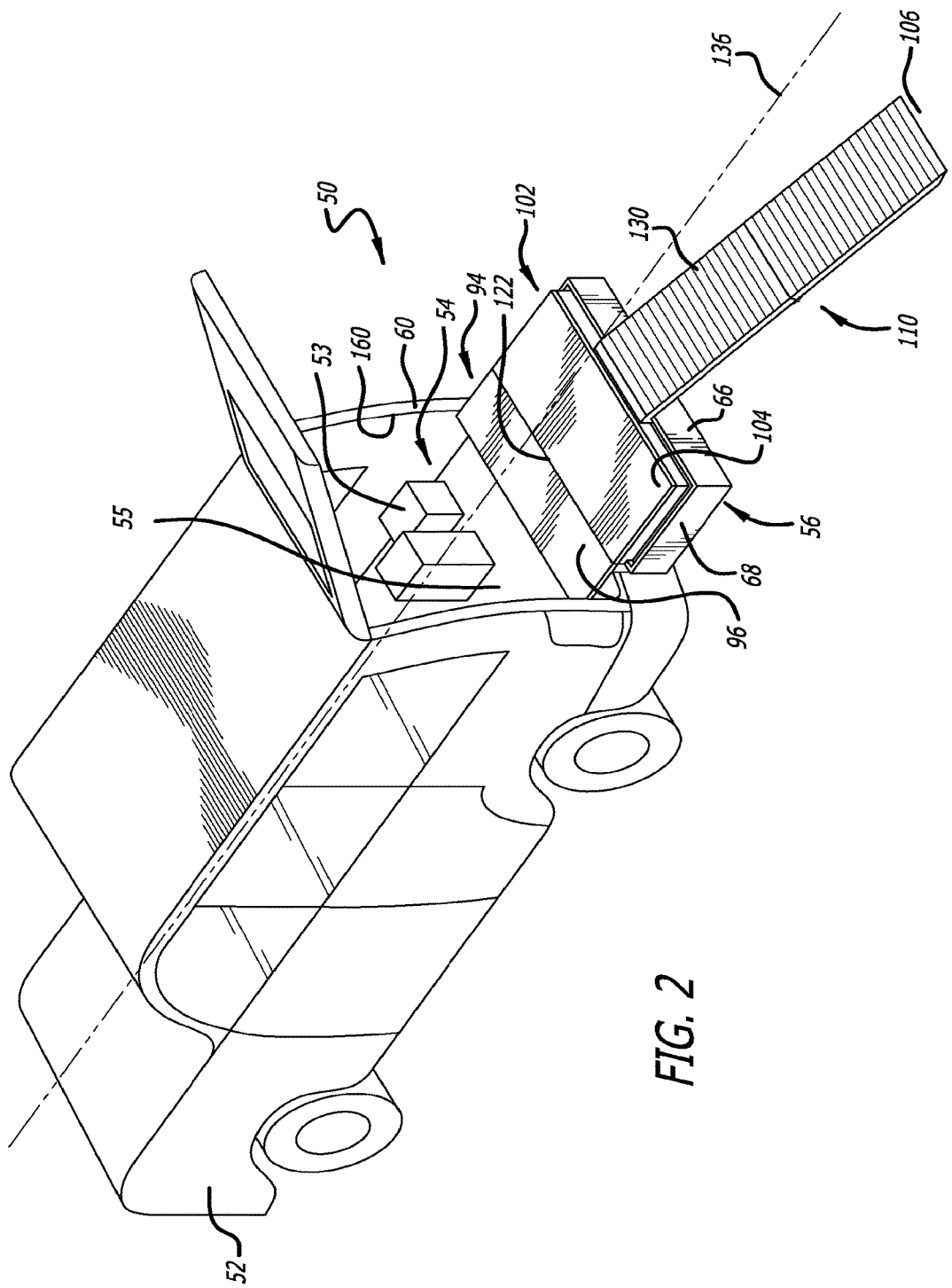
FIG. 2 is a perspective left-rear view of the carrier system of FIG. 1A showing it center-mounted to the rear of a vehicle with a bridge plate deployed to form a continuous and flush surface between the cargo bed's surface of the interior of the vehicle and the closed lid of the carrier system, and showing a ramp anchored in the sill and recess at the rear side of the carrier container such that the ramp is parallel to the longitudinal axis of the vehicle.
Figure 3:
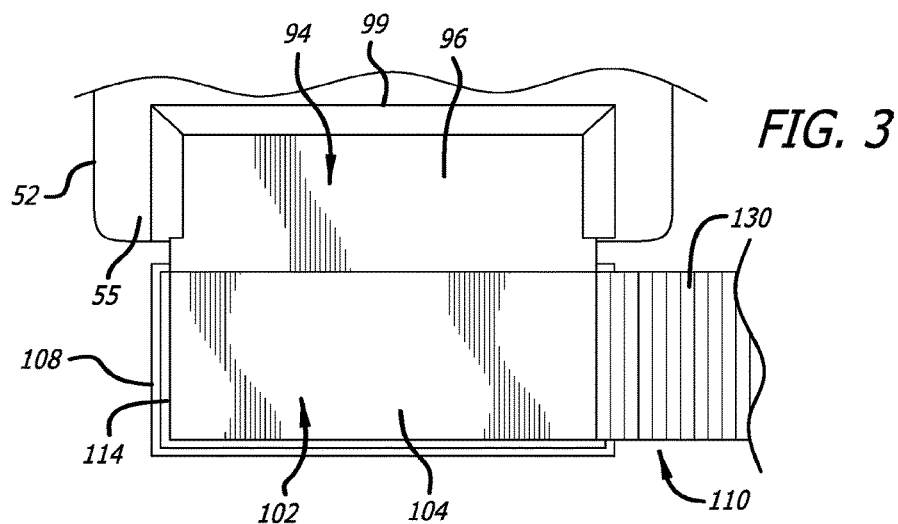
FIG. 3 is a top view of a carrier system of FIGS. 1 and 2 mounted showing the ramp positioned in this embodiment at a ninety-degree angle to the longitudinal axis of the vehicle so that the ramp extends perpendicular to the vehicle and the distal end of the ramp may rest on a sidewalk, also showing the top of the vehicle removed so that the bridge plate if providing a smooth surface across a gap between the carrier and the cargo area of the vehicle.
Figure 8:
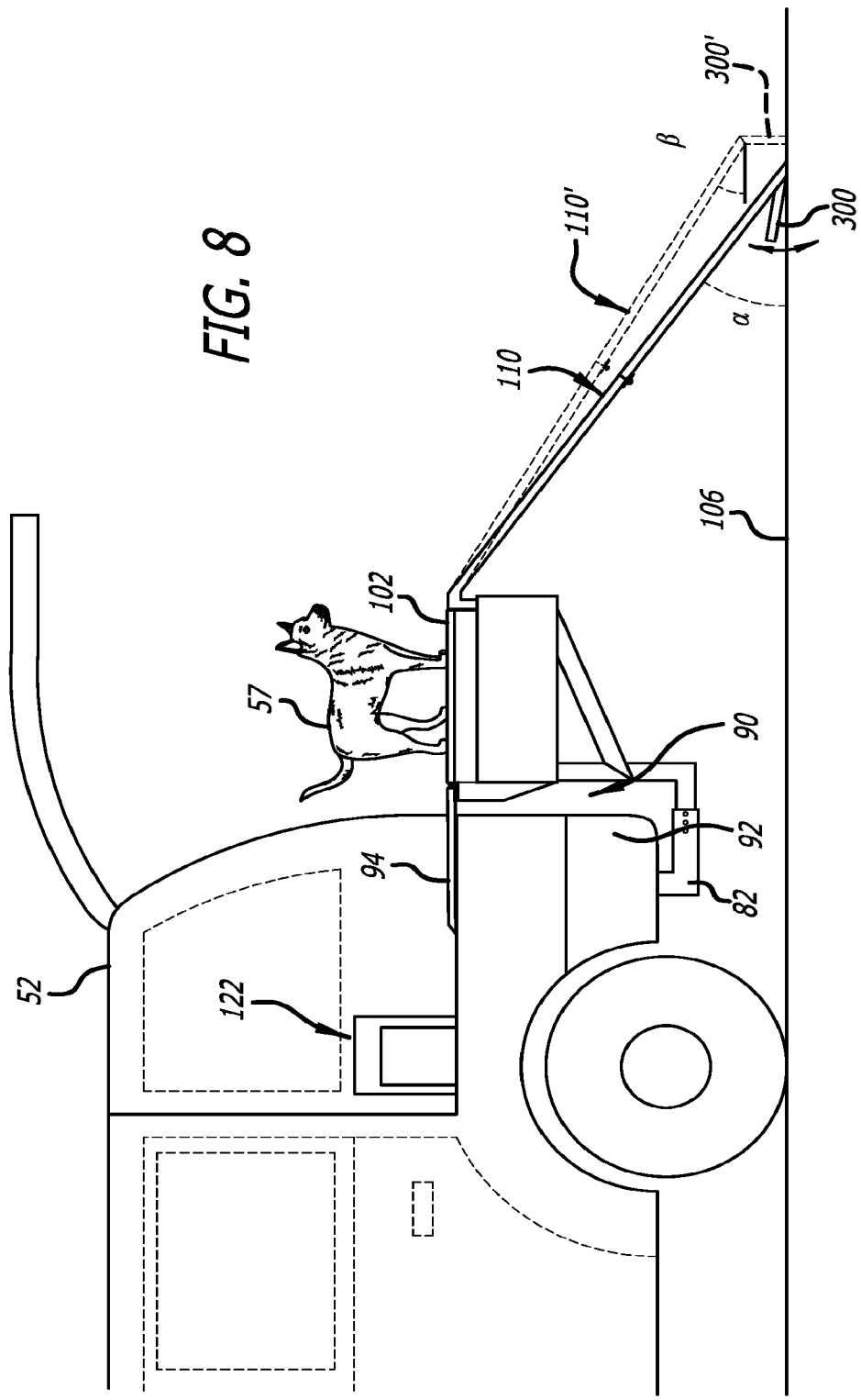
FIG. 8 is a side view of the carrier system of FIGS. 6 and 7 showing it in its fully deployed and operable configuration with the carrier container lid closed and flush with the cargo bed's surface, the ramp anchored to the carrier container so that its top surface is flush with the lid of the container, and showing a foldable ramp having legs at its ground-engaging (distal) end that are hingedly attached so that they may be deployed to raise the ground end of the ramp when needed to thereby reduce the slope of the ramp relative to the lid of the carrier container.

In one embodiment, the bridge plate 94 has beveled peripheral edges 99, as shown in FIG. 1, that facilitate movement of cargo into and out of the vehicle. When the bridge plate is pivoted onto the cargo bed of a vehicle in its deployed configuration, a slight height difference between the surface of the cargo bed and the surface of the bridge plate will exist. In accordance with aspects of the invention, this height difference is equal to the thickness of the bridge plate. The bevel reduces that thickness at the edges of the bridge plate in a tapered form. The angle in the bevel 99 can vary with the intention being to create a smooth transition between the bridge plate and the cargo bed. As used herein, the term "flush" is meant to include the thickness of the bridge plate on the cargo bed's surface. In accordance with the normal dictionary definition, flush as used herein is meant to include "having surfaces in the same plane; even." Flush as used herein is also meant to include "Arranged with adjacent sides, surfaces, or edges close together." The inventor believes that "flush" expresses the configuration of the bridge plate on the cargo bed's surface as shown in FIGS. 2, 3, and 8, inter alia. The bevel 99 also helps the operator grab the bridge plate when it is in the non-deployed position on top of the carrier lid.

The carrier container 56 includes a lid 102 that is pivotally mounted to the carrier container. The carrier container lid serves as an access door for the interior storage space 62 of the carrier container, and is pivotable between a closed configuration and an open configuration. In the open configuration, the lid is pivoted so that the open top side 72 is uncovered to allow access to the interior storage space. In the closed configuration, the carrier container lid covers the open top side of the carrier container and protects cargo stored within the carrier container. The carrier container lid is preferably metal but may be made of wood or any other sturdy material to support the weight of cargo, pets, and people that move across it. The carrier container lid also has a top surface 104 that is rugged or otherwise non-slip to prevent pets and other cargo from slipping off of it, thus reducing the risk of damage or injury. This non-slip surface may be formed, for example, by applying tape to the top surface of the carrier container lid.

In another embodiment, the top lid 102 may be latched and/or locked (not shown) to the carrier container 56 for safety and security reasons. For example, in the case where the vehicle is traveling at 65 mph and has the carrier container mounted to the back of it, substantial vertical forces may be applied to the carrier container in the case where the vehicle encounters a bumpy road. These vertical forces will tend to cause the top lid to open by swinging vertically upward and any contents in the container could be ejected when the lid is open. Latching the lid to the carrier container will avoid loss of its contents during driving conditions such as this. Locking the lid will avoid loss of contents due to theft. Similarly, latching the bridge plate 94 to the lid will keep it safely stored while the vehicle is in motion. Vertical forces generated by traversing bumpy roads will tend to also make the bridge plate to swing vertically upward and then downward into the lid. Such swinging activity can cause damage to the bridge plate, the lid, and the hinges of the bridge plate. Latches and locks are well known to those of skill in the art and can include magnetic attachments and mechanical latches and locks. Such devices also include the use of magnetic devices. These features are described in further detail below, in relation to FIG. 9.

Another feature of the carrier system 50 shown in FIG. 1A is a ramp 110 mounted to the carrier container 56. In order to lessen the need for lifting cargo, including animals, the ramp will allow the easier movement of cargo into and out of the cargo bed of the vehicle. Additionally, it will provide a safe surface upon which pets may walk into and out of the vehicle. The ramp provides a connection of the vehicle's cargo bed to the ground 106. The ramp may have different widths but if it is to be stored in the carrier container 56, its dimensions cannot exceed the inner dimensions of the container. In the embodiment of FIG. 1A, the ramp is foldable in length so that it can be twice as long as the carrier container 56 is wide. A ramp that is used for loading and unloading cargo, some heavy some light, may be dislodged from its desired location unless it is somehow anchored in place. If not anchored, a dangerous situation could develop if an animal is on the ramp and sideways forces cause the ramp to slide. Additionally, if the ground surface is slippery or not even, the weight vector of the animal ascending or descending may cause the distal end of the ramp to slide or twist pulling the proximal end of the ramp away from the carrier container, which may cause injury to the pet.

In consideration of the above, an embodiment of the invention uses an anchoring scheme for the proximal end of the ramp. As shown in FIGS. 1A and 1B, the anchoring mechanism includes a sill 108 formed onto the left, right, and rear sides of the carrier container, the sill having a ramp anchor recess 114 for receiving a complementary protrusion 116 from the ramp. The recess results in a rim 115 located at the outer edge of the recess. The sill extends around the left 68, right 70, and rear sides 66 of the container in the embodiment shown and is configured to receive and mate with one or more ramp anchor protrusions 116 extending downwardly from the proximal end 112 of the ramp. More specifically, the sill is mounted to or formed on the external wall of each of these three sides of the container 56. The sill is grooved at the top to form the recess having the outer rim with the recess comprising a complementary shape with downward extending protrusions 116 of the upper end (proximal end) of the ramp.

In another embodiment, the anchoring mechanism comprises a protrusion or protrusions formed into the top of the sill that have a complementary shape to a groove formed into the bottom surface of the proximal end of the ramp. In one form for this second embodiment, the protrusion on the sill would comprise a ridge extending upward along the entire length of all three sills (left, right, and rear sides of the container) with the proximal end of the ramp having a complementary groove in its bottom. In either embodiment, the anchoring mechanism secures the proximal end of the ramp to the carrier container due to the force of gravity pulling the ramp downward into the recess or onto the sill protrusions. Additionally, the rim of the recess or the groove in the underside of the ramp opposes any tendency of the ramp to slide away from the carrier container. Other forms of anchoring mechanisms may be used that rely on gravity, latching, or other type of securement means.

The anchoring mechanism 108 in the embodiment of FIGS. 1A and 1B is positioned below the top surface 104 of the carrier container lid 102; for example, four inches below the top surface 104 of the carrier container lid. This offset of four inches in this embodiment is the exact depth of the proximal end 112 of the ramp, including its anchoring protrusion. Therefore, when the ramp is mounted into the sill of the side of the carrier container, the top surface 130 of the ramp is flush with the top surface 104 of the carrier container lid so that cargo or animals moving across the top surface 104 will smoothly transition to the ramp. The flush configuration of the proximal end of the ramp with the top surface 104 of the carrier container lid is beneficial for loading and unloading aged or injured pets that walk on the ramp and the carrier container as well as being beneficial for rolling cargo into and out of the vehicle because there will be a smoother transition between the top of the ramp and the top surface of the lid of the container.

One of the main features of the carrier system 50 in accordance with aspects of the invention is that the anchoring mechanism 108 is formed on all three walls 66, 68, and 70 of the carrier container that face rearward and sideways. The proximal end 112 of the ramp therefore can be engaged with the anchoring mechanism at the left 68 or right side 70 of the carrier container to allow for side loading or unloading from the back of the vehicle, for example from a curb. The capability of side loading is markedly beneficial for use with pets on streets dense with cars and having little parking availability or where there is a slope in the roadway. This feature is also beneficial for package delivery trucks.

The ramp 110 is preferably foldable, telescoping, or otherwise collapsible so that it may be safely stored inside the interior storage space of the carrier container 56 for future use. For example, the ramp may include two connected segments 124, 126 foldable along a central hinge 128. When fully deployed, the ramp has a length that reaches the top surface of the carrier container lid from the ground at an acceptable angle. In one embodiment, the ramp includes a ridged or otherwise roughened top surface 130 to provide traction for pets that are walking the ramp. In another embodiment, the ramp may be made much smoother so that cargo can more easily be pushed up or down the ramp. The ramp is also flexible enough to support the weight of cargo moving along it. In one embodiment, the ramp is 17 inches (43 cm) wide and between 7 and 8 feet long (213.4 to 243.8 cm), having a weight of 5 pounds (2.3 kg), with the capability of supporting 400 pound (181 kg) loads without harmful deformation. Although not shown in FIG. 1A, the ramp may also include side rails so that cargo does not inadvertently fall sideways off the ramp. The ramp may be made of bamboo, carbon fiber, or any other sturdy and durable material for handling cargo loads. A ramp such as this is available at Petstep International, Inc. at P.O. Box 700, Lake Bluff, Ill. 60044 USA.

It will be noted that the hinge 128 is mounted at the underneath surface 125 of the ramp 110. This configuration results in keeping the ramp from collapsing when in use because the gravitational force of weight placed on the top surface 130 of the ramp will be translated sideways by the hinge resulting in force tending to keep the ramp unfolded. Other types of extendable configurations are also possible. For example, a telescoping ramp may be used instead of a folding ramp.

Additionally, the distal end 118 of the ramp 110 that engages the ground surface 106 may comprise a device that resists sliding. For example, the distal end of the ramp may include rubber blades or other types of stoppers 120 that have a higher coefficient of friction and tend to keep the distal end of the ramp where it was placed upon the ground. Additionally, as will be discussed in conjunction with the embodiment of FIG. 8, the ramp includes foldable legs 140 or telescoping legs (not shown) at its distal end 118 for the user to selectively adjust the slope of the ramp by raising or lowering the distal end.

Vehicles come in different shapes and sizes and consequently the carrier system 50 may be closer to the ground for some vehicles than with others when mounted to the vehicle's hitch. The distance between the level of the cargo bed and the trailer hitch will vary from vehicle to vehicle and can vary in some cases from 2 inches to 26 inches. Preferably, the carrier container 56 is positioned so that the top surface 104 of its lid is flush with the cargo bed. As shown in FIG. 1A, the carrier support structure 58 preferably includes a height adjustment mechanism 131 that the vehicle operator can use to raise or lower the height of the carrier container from the ground such that the top surface 104 of the carrier container lid with the bridge plate are flush with the cargo bed of the vehicle. In particular, the height adjustment mechanism is positioned between the first end 76 and second end 78 of the carrier support structure 58, and is operable to vertically move the carrier container relative to the tongue 80 at the first end. The vehicle operator can use the height adjustment mechanism to selectively position the carrier container in relation to the cargo bed.

In another embodiment, a horizontal adjustment mechanism 133 is included that allows for moving the carrier container horizontally; i.e., towards the rear of the vehicle or away from the rear of the vehicle. This adjustment mechanism is useful to adjust the carrier container so that the bridge plate is optimally utilized. For example, where the bridge plate does not fully cover the gap between carrier container and the cargo bed when deployed, or when the bridge plate extends too far into the cargo bed, the horizontal adjustment mechanism can be used to remedy these problems. Alternatively, the bridge plate can be curved to accommodate cargo beds having a curvature due to the curved rear end of the vehicle. Alternatively, a trailer hitch extender (discussed below with respect to FIG. 16) can be used instead of, or in addition to, the horizontal adjustment mechanism. Additionally, another alternative is to replace the bridge plate with one that is either longer if it does not fully cover the gap, or shorter if it extends too far into the cargo bed.

Various height adjustment mechanisms may be used including an ordinary telescoping mechanism with a screw lock, a pneumatic mechanism, a pin system in which an upper shaft has a number of closely-spaced holes drilled through it with the shaft resting in a sleeve also with a hole drilled completely through the sleeve, and a pin used to set the height of the carrier container by moving the shaft to the desired height and inserting a pin through the sleeve and the nearest shaft hole. An enlarged clip may then be placed through a hole drilled through the distal end of the pin to retain it in position so that it cannot be pulled out of the sleeve and shaft holes. Many other height adjustment means are available.

Likewise various horizontal adjustment mechanisms may be used. In one embodiment, the standard type of hitch adjustment may be used where the tongue 80 of the carrier support structure 58 has multiple holes drilled through it. It is then inserted into the hitch receiver 82 the distance needed that will permit the bridge plate to make contact with the cargo bed of the vehicle. A pin is then inserted sideways through the walls of the hitch, through the closest hole of the tongue and the pin has a clip inserted through a hole drilled in its end to retain it in position in the hitch and hold the carrier support structure in position.

Referring now to FIG. 2, it will be seen that a carrier system 50 has been mounted to the rear 60 of a vehicle 52 and is in position. For purposes of reference, the figure shows a centerline or longitudinal axis 136 of the vehicle. The carrier container 56 is at the correct level so that the top surface of its lid is flush with the cargo bed 54 of the vehicle. The bridge plate 94 has been pivoted into contiguous position with the cargo bed and the ramp 110 has been deployed into contact with the ground 106. With the configuration shown, the carrier system 50 may be used to assist with the handling of the vehicle's cargo 53 into and out of the cargo bed 54. Although not shown, the carrier container 56 is connected to the rear 60 of the vehicle 52 by the carrier support structure 58 having a tongue that has been inserted into the hitch of the vehicle (see FIG. 1A).

When the carrier support structure is mounted to the trailer hitch socket 82 of the vehicle, a gap 90 is formed between the rear of the vehicle and the carrier container. On conventional vehicles, this gap may range from as small as one inch (2.54 cm) to as large as one foot (30.48 cm) (depending on the size of the vehicle's rear bumper 92. Where the rear end of the vehicle is curved, the gap may be smaller in the middle of the carrier container and progressively larger towards the sides of the vehicle (e.g., 1.0 to 24 inches). To bridge this gap, the carrier system includes a bridge plate 94 as shown in FIG. 1A that is pivotally mounted to the top side 72 of the carrier container. The bridge plate 94 is easily pivoted between a non-deployed configuration, in which the bridge plate rests on top of the carrier container, and a deployed configuration, in which the bridge plate covers and provides a bridge over the gap between the cargo bed of the vehicle and the carrier container. When the bridge plate 94 is thus deployed, cargo 53 may be loaded into and out of the vehicle across the bridge plate. Additionally, when the bridge plate is fully deployed, it may also serve as an extension to the cargo bed of the vehicle, thus providing more space for the storage of cargo in the vehicle. For example, during tailgating parties, vehicle operators may place cargo directly on the bridge plate, allowing them to easily access the cargo without having to reach into the vehicle.

The bridge plate 94 is pivotally mounted to the carrier container such that when the bridge plate is not being used, the bridge plate rests on top of the carrier container lid. When the bridge plate 94 is deployed and the carrier container lid 102 is closed, the two components together provide a smooth loading surface 122 extending continuously from the ramp to the vehicle's cargo bed. In this way, cargo 53 may be loaded and unloaded into and out of the vehicle from the ground using the ramp. Additionally, the continuity of the surface prevents pets from falling in the gap between the rear of the vehicle and the carrier container system, thus reducing risk of injury.

Figure 4:
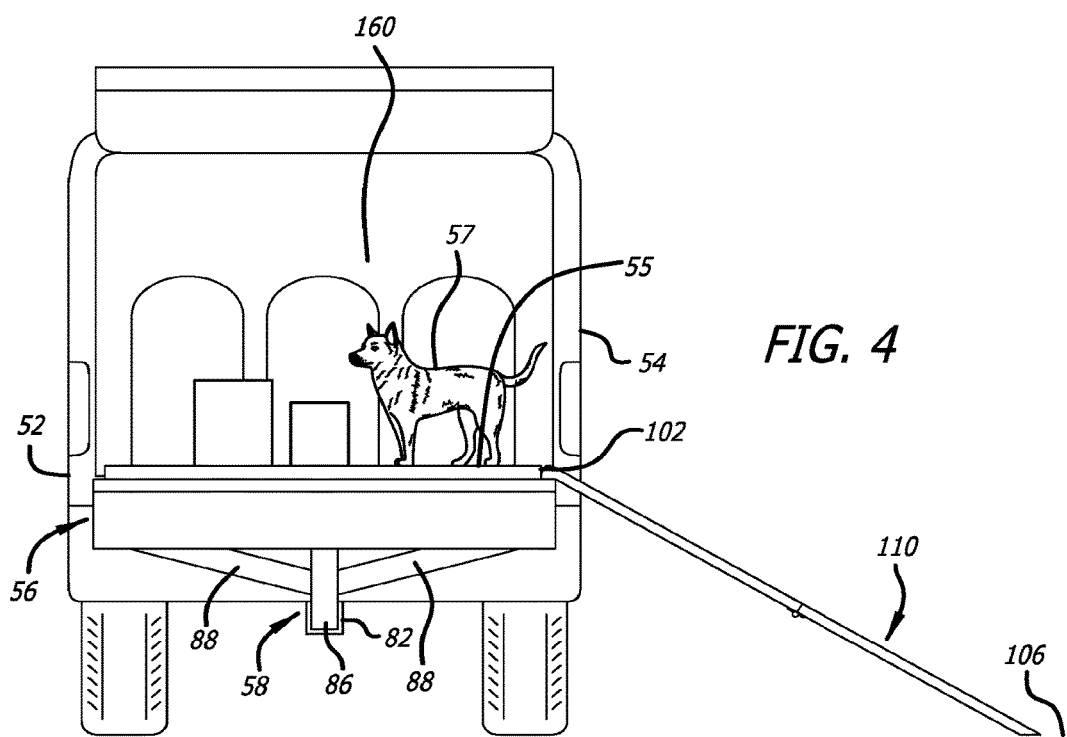
FIG. 4 is a rear view of a vehicle with its back door lifted up and open showing the carrier system of FIG. 3 mounted in the hitch of the vehicle, the support structure, the carrier container, and the ramp shown in FIG. 3 mounted and anchored to the sill at the right-side of the carrier container perpendicular to the vehicle.

FIGS. 2-4 illustrate the carrier system 50 of FIG. 1A connected to the rear of a vehicle 60 in its fully deployed state. Various types of cargo 53, including pets such as the dog 57 shown in FIGS. 4, 6, 7, and 8, may be loaded or unloaded through the opening 160 in the rear 60 of the vehicle using the carrier system. The position of the carrier container 56 is adjusted using the height adjustment mechanism (131, see FIG. 1A) such that the top surface 104 of the carrier container lid 102, the top surface 96 of the bridge plate 94, and the ramp surface 130 at the upper end of the ramp together form a continuous surface between the cargo bed of the vehicle and the ground. The cargo may be loaded and unloaded between the cargo bed of the vehicle and the ground using the ramp. The ramp may extend from the rear side 66 of the carrier container as shown in FIG. 2, or the left 68 or right sides 70 of the carrier container. FIGS. 3 and 4 show views of a ramp mounted to the right side of the carrier container.

Figure 5:
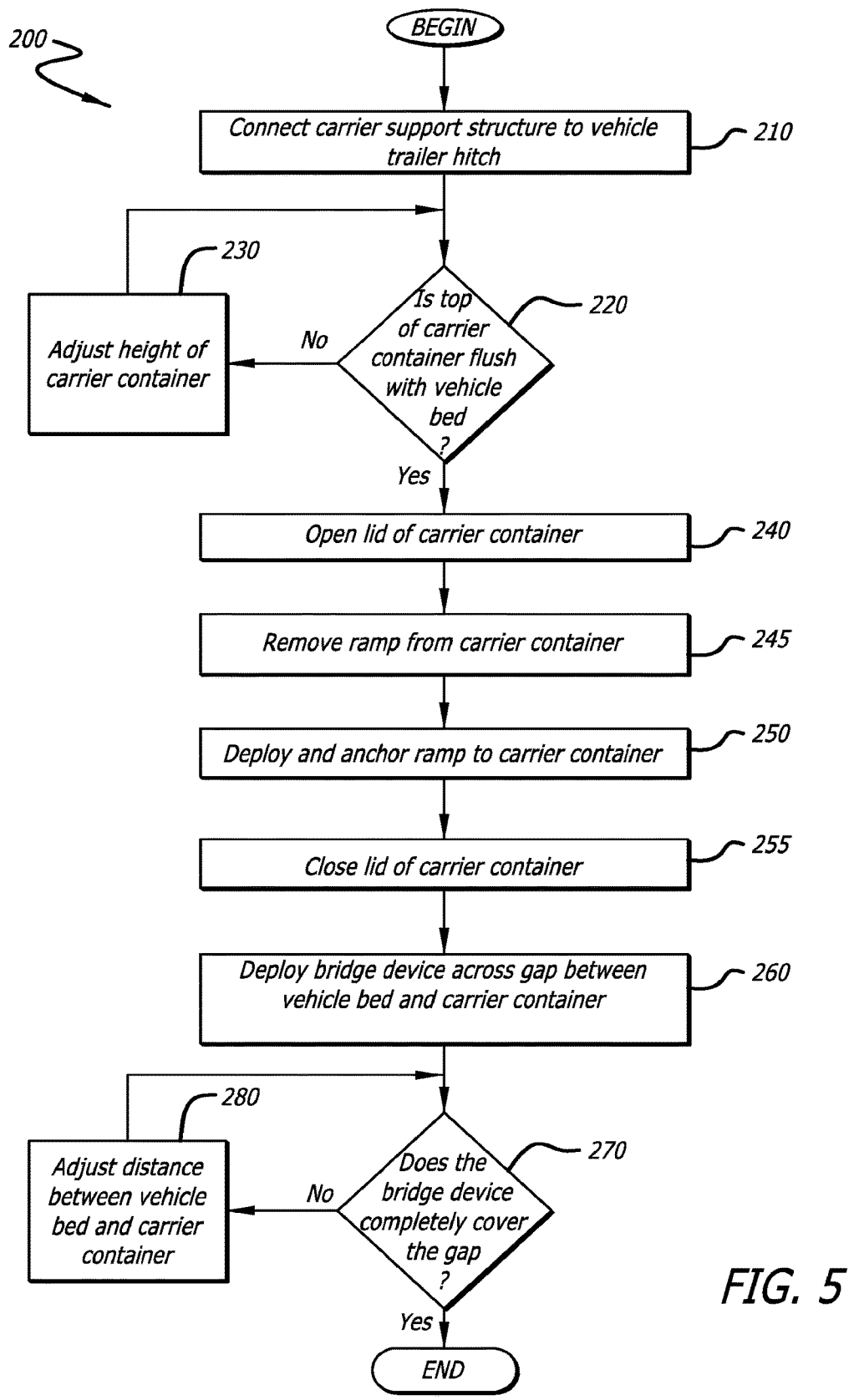
FIG. 5 is a flowchart depicting a method of handling cargo of a vehicle using a carrier system in accordance with aspects of the invention, in which the carrier is mounted to the vehicle, adjusted in height and distance from the vehicle to result in the lid of the carrier being flush with the vehicle bed and a gap that can be covered with the bridge plate, and deploying a ramp.
Figure 6:
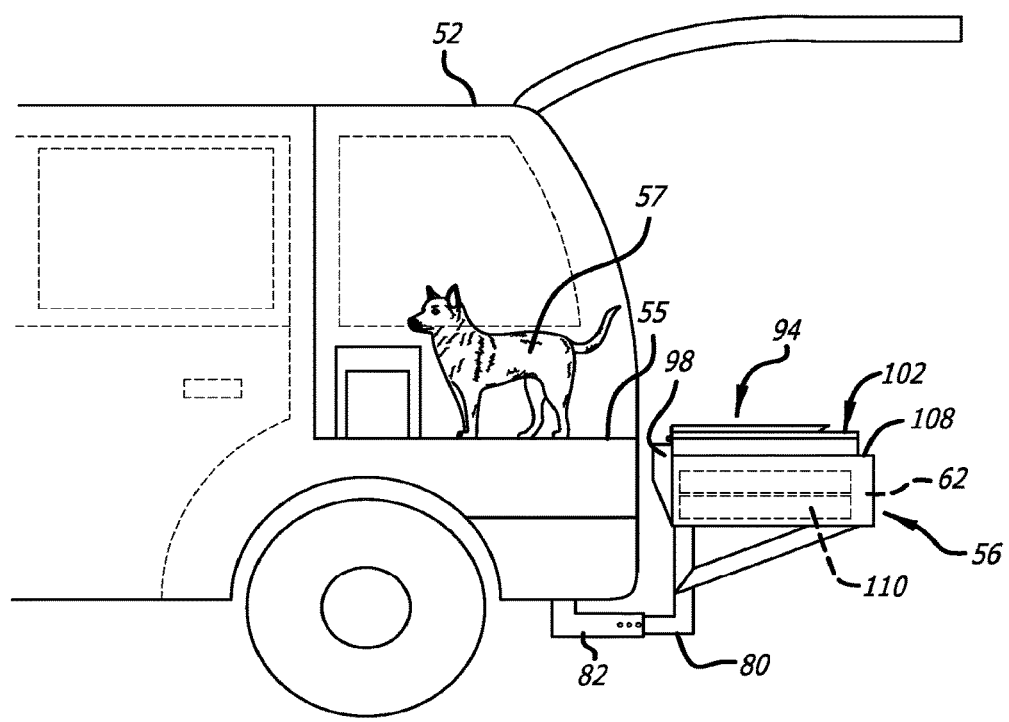
FIG. 6 is a left side view of a utility vehicle with its rear door open and up to enable access to the cargo compartment, and a carrier system mounted to the vehicle's hitch, with part of left side of the vehicle removed so that a dog located inside the vehicle can be seen, the carrier container storing a folded ramp shown in dashed lines, and with the top of the lid of the carrier adjusted to be level with the cargo bed's surface.
Figure 7:
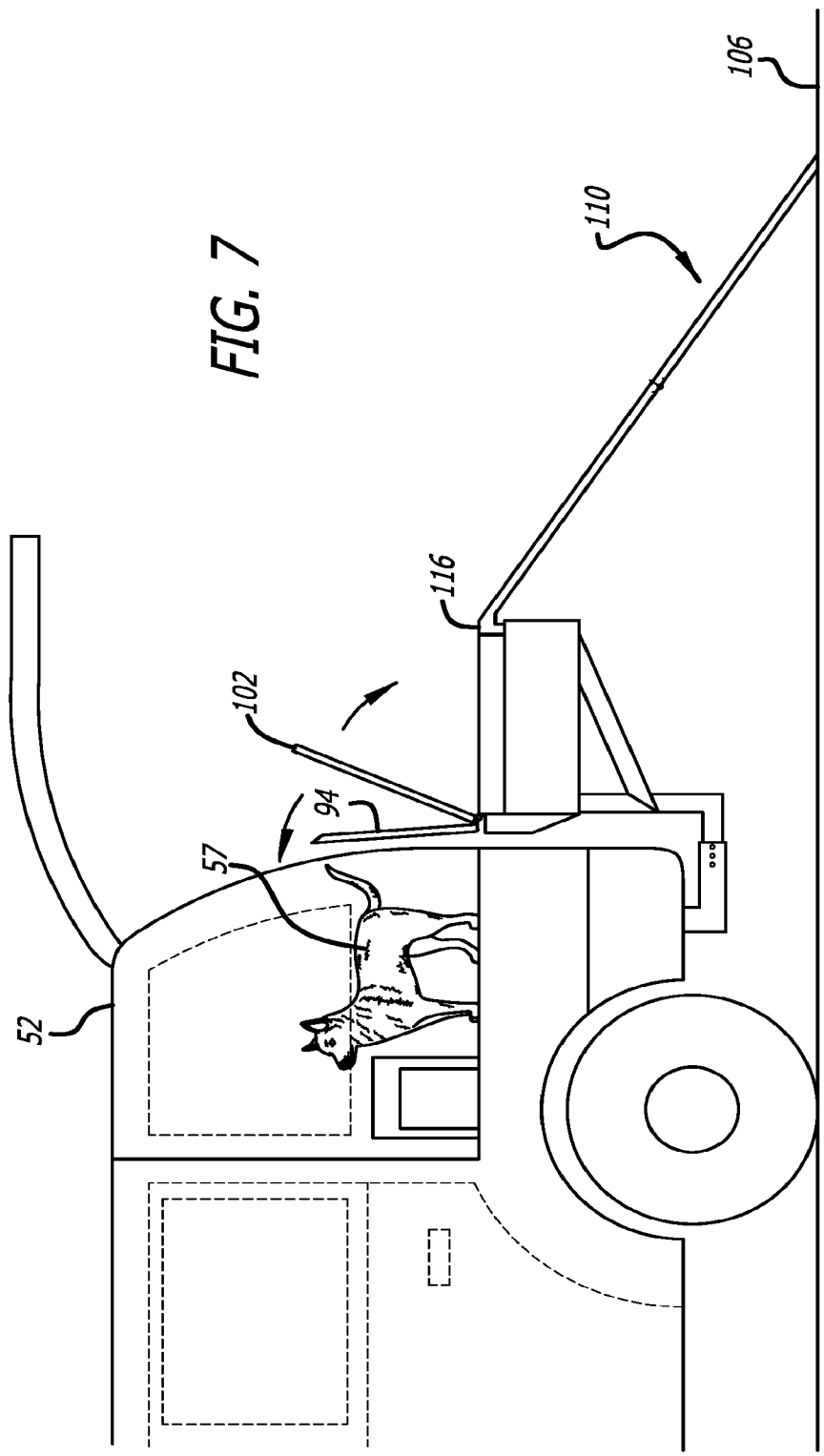
FIG. 7 is a side view of the carrier system of FIG. 6 showing the deployment of the ramp anchored to the back surface of the carrier container in the sill, with the bridge plate and lid being pivoted in opposite directions to bridge the gap between the container and the cargo bed's surface and to close the container, respectively.

FIG. 5 describes a preferred embodiment of a method 200 using the carrier system 50 of FIG. 1, the use of which is illustrated in FIGS. 6-8. According to the method shown in FIG. 5 and with reference to FIG. 6, the carrier container is positioned adjacent the rear of the stopped vehicle, and the carrier support structure 58 is connected to the vehicle by insertion of the tongue 80 of the carrier support structure into the trailer hitch socket 82 at the rear of the vehicle 210. The container lid 102 and the bridge plate 94 are mounted to the carrier container 56 such that the bridge plate rests on top of the closed carrier container lid. The ramp 110 may also be stored in its compact or folded configuration in the interior storage space 62 of the carrier container.

One embodiment uses a hitch to attach the carrier system 50 to the vehicle as mentioned above. It is important that a hitch with sufficient capacity be used. In this use of the hitch, the tongue weight requirement will far surpass the gross trailer weight specification of the hitch. In fact, there will be very little gross trailer weight as wind friction may be the only load pulled. The following is a chart of hitch specifications from the Society of Automotive Engineers:

| Hitch Class | Tongue Weight |
| --- | --- |
| Class I | 200 pounds (79 kg) |
| Class II | 300 Pounds (118 kg) |
| Class III | 600 pounds (236 kg) |

If only the ramp is stored in the carrier container, the carrier system 50 may apply up to 45 pounds (17.7 kg) of weight to the hitch. If an operator of the vehicle weighs 185 pounds (72.8 kg) and were to climb on top of the carrier container, the total weight would be 230 pounds (90.6 kg). This immediately takes the requirement to a Class II hitch. However, if the operator of the vehicle has a dog that weighs 80 pounds (31.5 kg) and both are on the carrier container simultaneously, the weight would be 310 pounds (122 kg). This moves the hitch requirement into Class III. The operator must also be aware that the vehicle maximum weight limit is not exceeded with passengers, cargo, and the carrier system.

Returning to FIG. 5, the top 104 of the carrier container lid is then checked to determine if it is flush with the cargo bed of the vehicle 220. If the carrier container is too high or too low relative to the cargo bed, the operator adjusts the height of the carrier container 230 using the height adjustment mechanism until the top surface 104 of the lid is flush with the cargo bed. If the carrier container is correctly positioned such that the top surface of the carrier container lid is flush with the cargo bed of the vehicle, the lid of the carrier container is opened 240, the ramp is removed from the interior storage space of the carrier container 245, and the ramp is deployed and anchored to the carrier container 250, an example of which is illustrated in FIG. 7. Here, FIG. 7 shows the carrier container lid 102 being rotatably opened so the collapsed ramp 110 from the interior storage space of the carrier container may be accessed. The ramp is deployed, for instance by unfolding the ramp along its hinge, or in the case of a telescoping ramp, by extending the ramp. The deployed ramp 110 is then engaged at its proximal end 112 to the anchoring mechanism 108 of the carrier container, and secured as described above. After the carrier container lid is closed, the top surface of the carrier container lid and the ramp form continuous surfaces with the ground.

Next, the bridge plate is deployed across the gap between the rear of the vehicle and the carrier container 260, as illustrated in FIG. 8. This step 260 can occur before or after the ramp is deployed 250. The bridge plate 94 is checked to determine if its length spans the distance between the rear of the vehicle and the carrier container and thus completely covers the gap 270 (even when the rear end of the vehicle is curved). In the event where the bridge plate does not completely cover the gap, the carrier support structure may be adjusted to shorten the distance between the rear of the vehicle and the carrier container 280, for example, using the horizontal adjustment mechanism or replacing the bridge plate with one that is shorter or longer as needed. If the bridge plate is correctly deployed, a continuous surface is formed between the cargo bed and the ramp top surface, and cargo may thereafter be loaded into and unloaded from the cargo bed across the bridge plate.

FIG. 7 illustrates a standard ramp 110, however a ramp may optionally include foldable legs 300 as shown in FIG. 8. A purpose of the foldable legs is to control the slope angle α of the ramp relative to the carrier container lid 102 to enable older or injured animals to more easily ascend or descend the ramp. Deployment of the legs will naturally require older and injured animals to have to step or jump up onto the distal end of the ramp before the ramp. However, compared to the difficulty of climbing a steeper slope, stepping or jumping up onto the distal end of the ramp propped up by the legs is relatively easier for these animals. Telescoping legs may also be used in lieu of foldable legs.

As further shown in FIG. 8, the foldable legs 300 are hingedly attached to the distal end 118 of the ramp and are stowed under the ramp when not in use. To control the ramp's slope angle, the legs pivot downwardly to raise the height of the distal end of the ramp relative to the ground surface 106. As the legs are unfolded downwardly, the height of the ramp relative to the ground is increased until the ramp is positioned as denoted in dashed lines at 110'. The fully deployed legs are denoted in dashed lines as 300'. The increase in the height of the distal end reduces the ramp's slope angle to β, which is less than its original slope angle α and thus allows older or infirm animals to more easily use the ramp. When the legs of the ramp are propped on a curb, the additional height provided by the curb lessens the slope angle of the ramp even more. The foldable or telescoping legs 300 preferably have a length between 3.0 to 4.0 inches (7.62 to 10.16 cm) when fully deployed or extended, but may have a length even as large as 7.0 to 8.0 inches (17.8 to 20.3 cm). It has been found that dogs are more able to step up a small distance of 7.0 to 8.0 inches (20.3 cm) than they are to walk up a 6.0 foot (1.8 m) ramp having a steeper slope.

In a method in accordance with aspects of the invention, the operator of the vehicle would bring it to a stop at a selected position. A determination would then be made as to whether the ramp would be deployed in a direction parallel to the vehicle or in a perpendicular direction to the vehicle. If an animal is involved, the early steps would be for the operator to unlock the carrier container. Then the operator will open the carrier container lid sufficiently far so that the operator can grasp and remove the ramp from the container. The container lid stays open automatically until it is intentionally closed by the operator. The ramp is unfolded to achieve its full length. The lid may then be closed. The ramp is mounted to the sill of the carrier container in the desired orientation to the vehicle.

The back door or doors of the vehicle may then be opened and the bridge plate pivoted into position onto the cargo bed. If the bridge plate does not interact with the cargo bed where desired, the position of the carrier container may be adjusted upwards or downwards so that the carrier container lid and bridge plate are flush with the cargo bed. Likewise, if the bridge plate does not make the desired contact with the cargo bed; i.e., there exists a gap between the cargo bed and the bridge plate, or the bridge plate is deployed too far into the cargo bed, the distance from the carrier container to the cargo bed may be adjusted at the hitch or by some other adjustment approach. The animal is then coaxed on a leash out of the cargo bed onto the bridge plate, onto the carrier container lid, and down the ramp to the ground surface.

In the case where the cargo comprises inanimate objects, they may be pulled by someone standing at the bumper of the vehicle towards the carrier container lid or may be pushed towards the carrier container lid by somebody inside the cargo bed of the vehicle. They are then eased down the ramp to the ground surface.

When all cargo has been removed from the cargo bed, the ramp is disengaged from the sill of the carrier container and is folded. The lid of the carrier container is opened, and the folded ramp is placed securely into the carrier container for storage. The carrier container lid is then closed, the bridge plate is pivoted into contact with the lid of the carrier container, and locked into position in relation to the carrier container. The back door or doors of the vehicle may then be closed.

Figure 9:
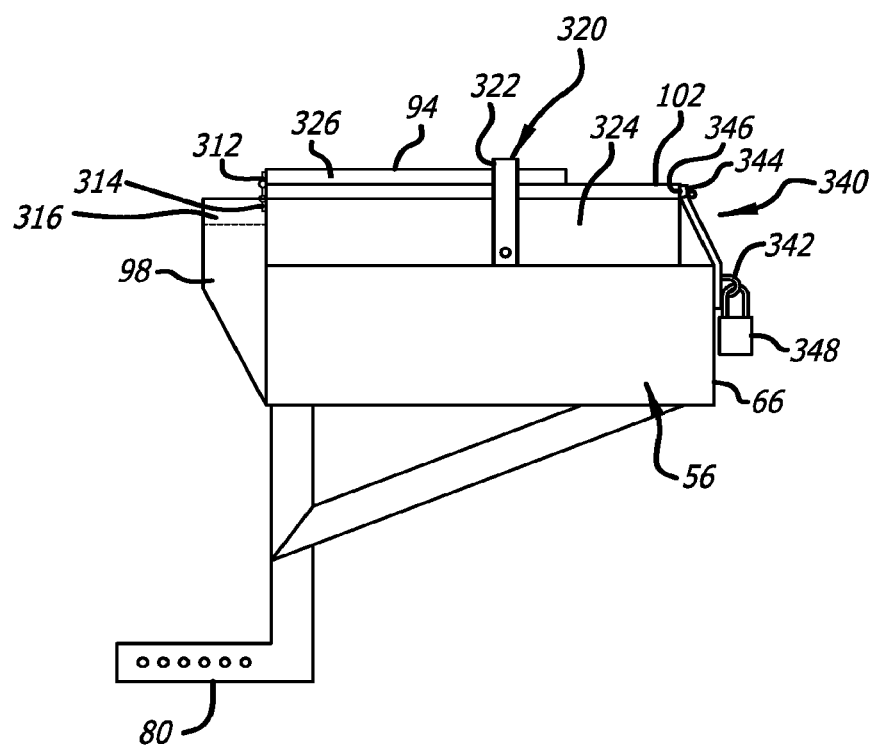
FIG. 9 is a left side view of a carrier system in accordance with aspects of the invention in its traveling configuration in which the bridge plate and the carrier container lid are latched to the carrier container after the ramp has safely been stored within the carrier container, also showing a for securing the contents of the carrier container.
Figure 10A:
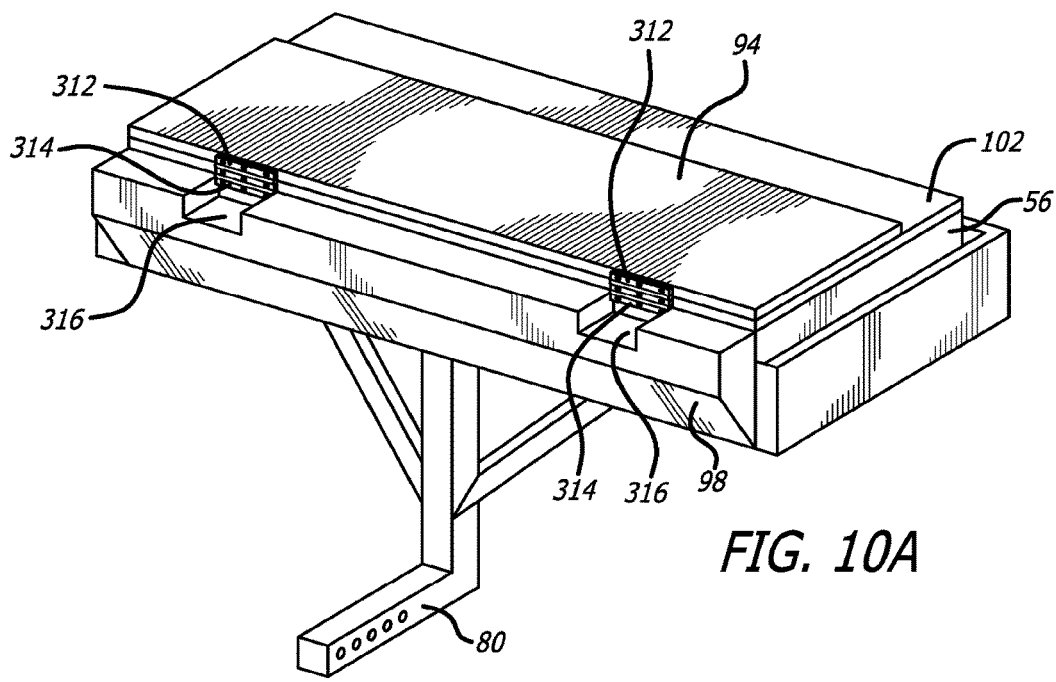
FIG. 10A is a perspective view of the front end of an embodiment of a carrier having separate hinges connecting to the bridge plate and carrier container including gaps in the weight supporting brace for receiving and supporting the bridge hinges.
Figure 10B:
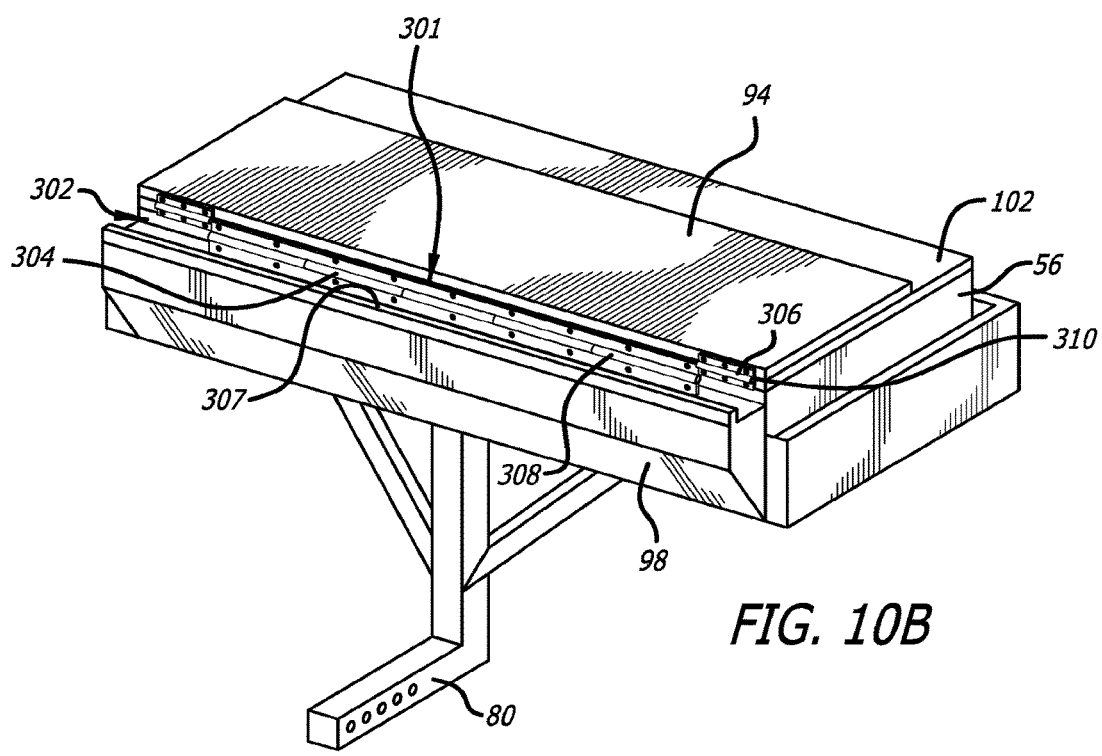
FIG. 10B is a perspective view of the front end of an embodiment of a carrier having a double-function hinge used to connect three items together, which in this case are the carrier container, the lid of the container, and the bridge plate, for selective use.
Figure 10C:
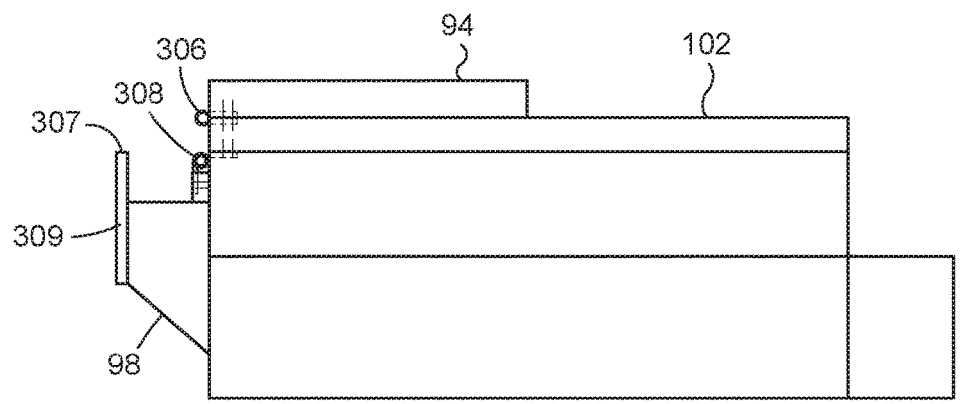
FIG. 10C-10F are side elevational views similar to the embodiment of FIG. 10B, except that the bridge support is moveable vertically to accommodate for differences in height between the carrier lid top surface and the cargo area surface.
Figure 10D:
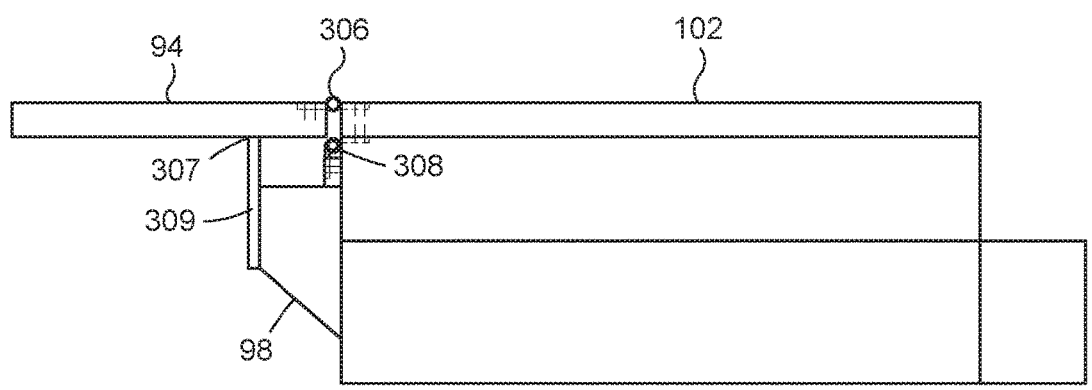
Figure 10E:
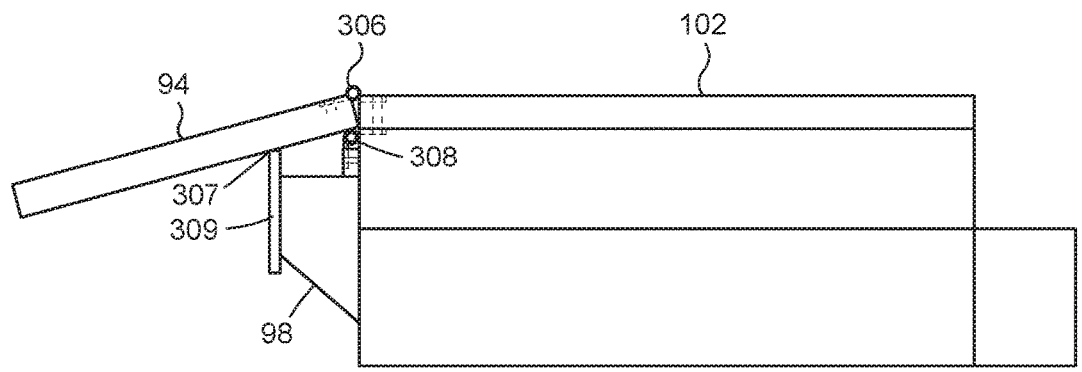
Figure 10F:
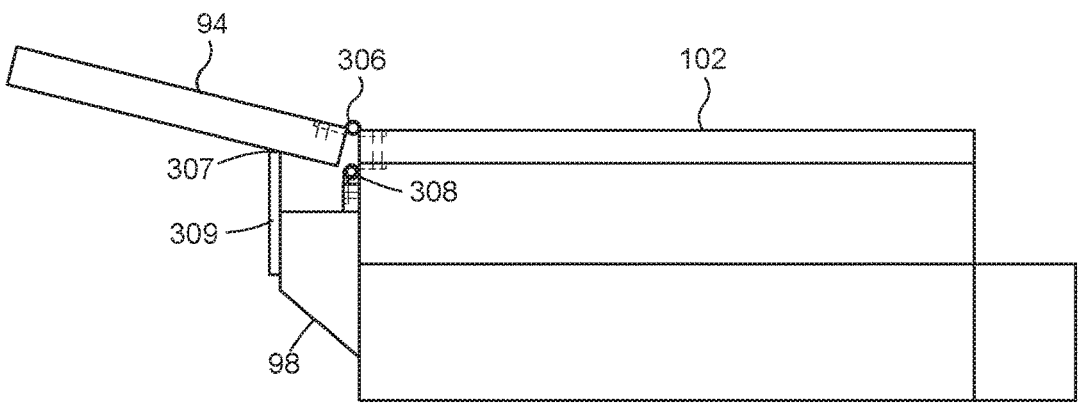

FIGS. 9, 10A and 10B illustrate exemplary hinge connections by which the carrier container lid 102 and the bridge plate 94 are pivotally mounted together to the front side 64 of the carrier container 56. In the embodiment of FIGS. 9 and 10A, hinges 312 connecting the bridge plate 94 and carrier lid 102 provide pivoting capability to the bridge plate relative to the carrier container lid, and hinge(s) 314 connecting the carrier container lid and the carrier container 56 provide pivoting capability to the lid relative to the carrier container. Gaps 316 in the supporting brace 98 receive and support hinges 312 when the bridge plate is deployed.

In the alternative example of FIG. 10B, a single hinge 301, common to the carrier container lid, the carrier container front side, and the bridge plate, provides pivoting capability to the carrier container lid and the bridge plate relative to the carrier container. The common hinge 301 illustrated in the figures is a three-leaf hinge including a hinge barrel 302 formed by a lid hinge knuckle 304 connected to the carrier container lid, a bridge hinge knuckle 306 connected to the bridge plate, and a container hinge knuckle 308 connected to the carrier container. A single hinge pin 310 extends through the knuckles such that the carrier container lid and the bridge hinge knuckle pivot coaxially about the common hinge. The weight supporting brace 98 may include gaps 312 as in FIG. 10A, or be a solid piece as shown in FIG. 10B. When the bridge plate is rotated 180° and fully opened, it will be supported by lip 307 on the support brace 98 and the floor of the cargo area surface. Depending the weight limit of the bridge plate, the robustness of the hinge mechanism connecting the bridge plate to the carrier lid, and the robustness of the connection of the hinge mechanism to the bridge plate and the carrier lid, it may not be necessary to have a bridge plate support brace 98.

In FIGS. 10C-10F, it is possible that bridge support 309 on the outside perimeter of the support brace 98 has mechanical functionality which allows the bridge support 309 to have a vertical range of motion. The mechanical vertical range of motion would allow the bridge support 309 to be adjusted up and down in order to compensate for the difference in height that is possible if the carrier lid top surface 102 and the vehicle cargo area surface are not at the identical height. The bridge support 309 securely connects to the support brace 98 with a rail system or other mechanical mechanism (not shown) that allows the bridge support 309 to slide up and down the outside surface of the bridge plate support brace as well as robustly lock in place once the desired height is selected. The top lip 307 of the bridge support 309 would have a rounded top so that it would be functional whether the cargo area of the vehicle is above the carrier lid top surface or below the carrier lid top surface. This would allow for the bridge plate support brace to remain functional for several of the embodiments even if the carrier lid top surface and the vehicle cargo area surface are not at the identical height which would increase the usability of those embodiments.

Although FIGS. 9 and 10A and 10B illustrate specific examples of a hinge, other hinge configurations and connecting configurations may be used. This is but one example. The use of a hinge connection for the bridge plate 94 allows for the bridge plate to be deployed and stowed relatively quickly because the hinge acts as a securing mechanism, which is preferred when loading and unloading restless animals. Where speed is not an issue, however, an unhinged configuration for the bridge plate may be used. In this configuration, the bridge plate 94 is connected to the front side 64 of the carrier container when deployed. For example, the bridge plate and carrier container lid may include magnetic attachments that join the two components together using magnetic forces. The bridge plate rests upon the weight supporting brace 98 for support, and its top surface 96 lies flush with the top surface 104 of the carrier container lid 102. Another configuration to secure a loose bridge plate is to use an interface mounting lip at the front of the container that accepts the bridge plate and assists in positioning and holding it in position. The loose bridge plate may be stored in the interior storage space 62 of the carrier container 56 when not in use.

Also shown in FIG. 9 is a latching mechanism 320. It is shown in block form because such a latch can take many different configurations. In this embodiment, the latch bar 322 is mounted to the upper portion of the left side 324 of the carrier container and engages the left side 326 of the bridge plate 94. By latching the bridge plate to the carrier container, the intervening carrier container lid is sandwiched between the two and is also immobilized. In another embodiment, a self-latching mechanism may be used. Whenever the bridge plate is pivoted to the fully non-deployed configuration shown in FIG. 9, a pin of the bridge plate will move into engagement with the latch which will automatically receive the pin and close around it, firmly locking the bridge plate and carrier container lid in the stowed configuration. Also shown in FIG. 9 is a locking mechanism 340 comprising a locking ring 342 mounted to the carrier container rear side 66, and a locking strap 344 mounted to the rear edge 346 of the carrier container lid 102. Although not shown, this locking system functions in a common way. A slot (not shown) is formed in the strap and the ring protrudes through it. A lock 348 is engaged with the ring to secure the strap in place which in turn secures the bridge plate 94 and the carrier container lid 102 in place. It will be obvious to those skilled in the art that many other arrangements for locking the carrier container lid in a closed position on the carrier container are possible including those where that make it much more difficult to break the lock mechanism. For example, the bridge plate 94 may be magnetically coupled to the lid 102, the magnetic force being sufficient to hold the bridge plate secure even during highway speeds or on rough roads. Also, the latch mechanism may be internal in the carrier container.

Figure 11:
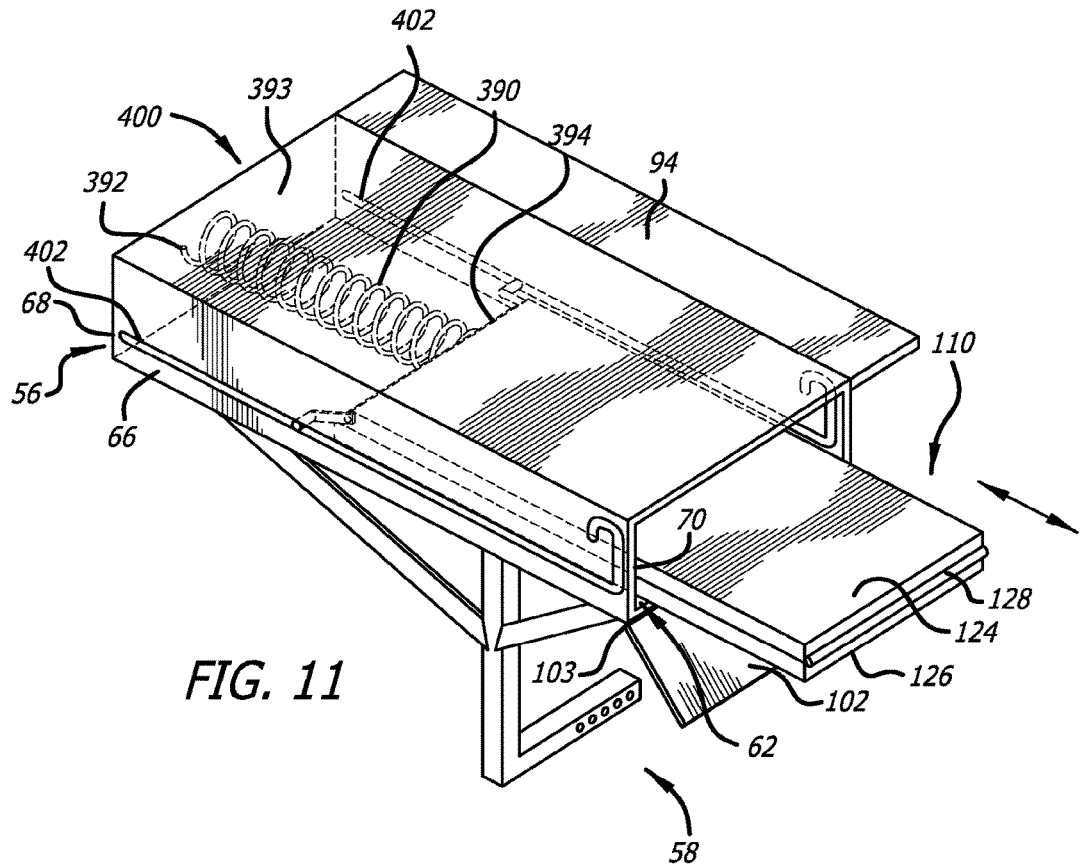
FIG. 11 is a perspective view of a second embodiment of a carrier system in accordance with aspects of the invention where the ramp is configured for side deployment so that it will be perpendicular to the longitudinal axis of the vehicle as shown in FIG. 4, internal components shown in dashed lines with the ramp being connected with internal slide rails of the carrier, an internal spring provides spring-loading to the ramp to assist in its slidable deployment of the ramp through the right side of the carrier container, also showing a hook-shaped guide slot in which pivotable pins at the top end of the ramp are engaged to cause the upper surface of the ramp to be flush with the top surface of the container when fully deployed, the ramp being folded for storage in this embodiment with the ramp hinge being visible.
Figure 12:
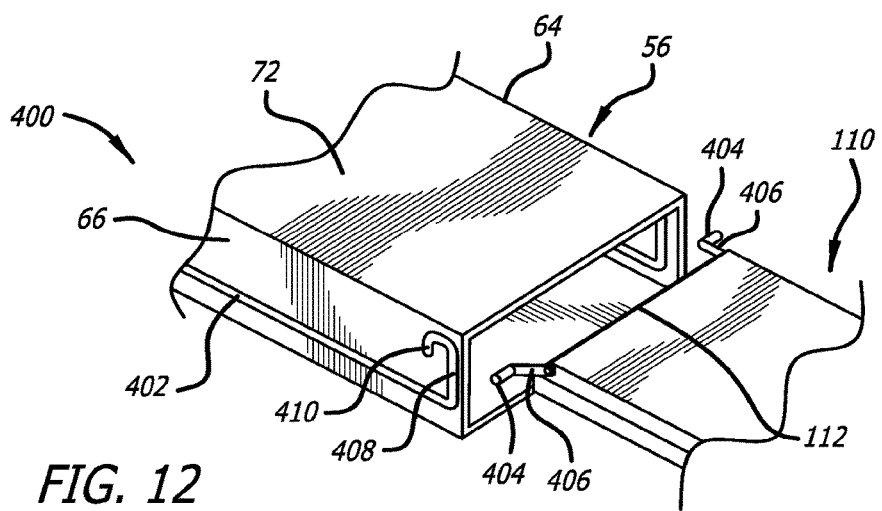
FIG. 12 is a partial perspective view of the track and guide slot shown in FIG. 11 with pivotable end positioning pins to show the operation of deployment of the ramp so that its top end will be flush with the top surface of the container.
Figure 13:
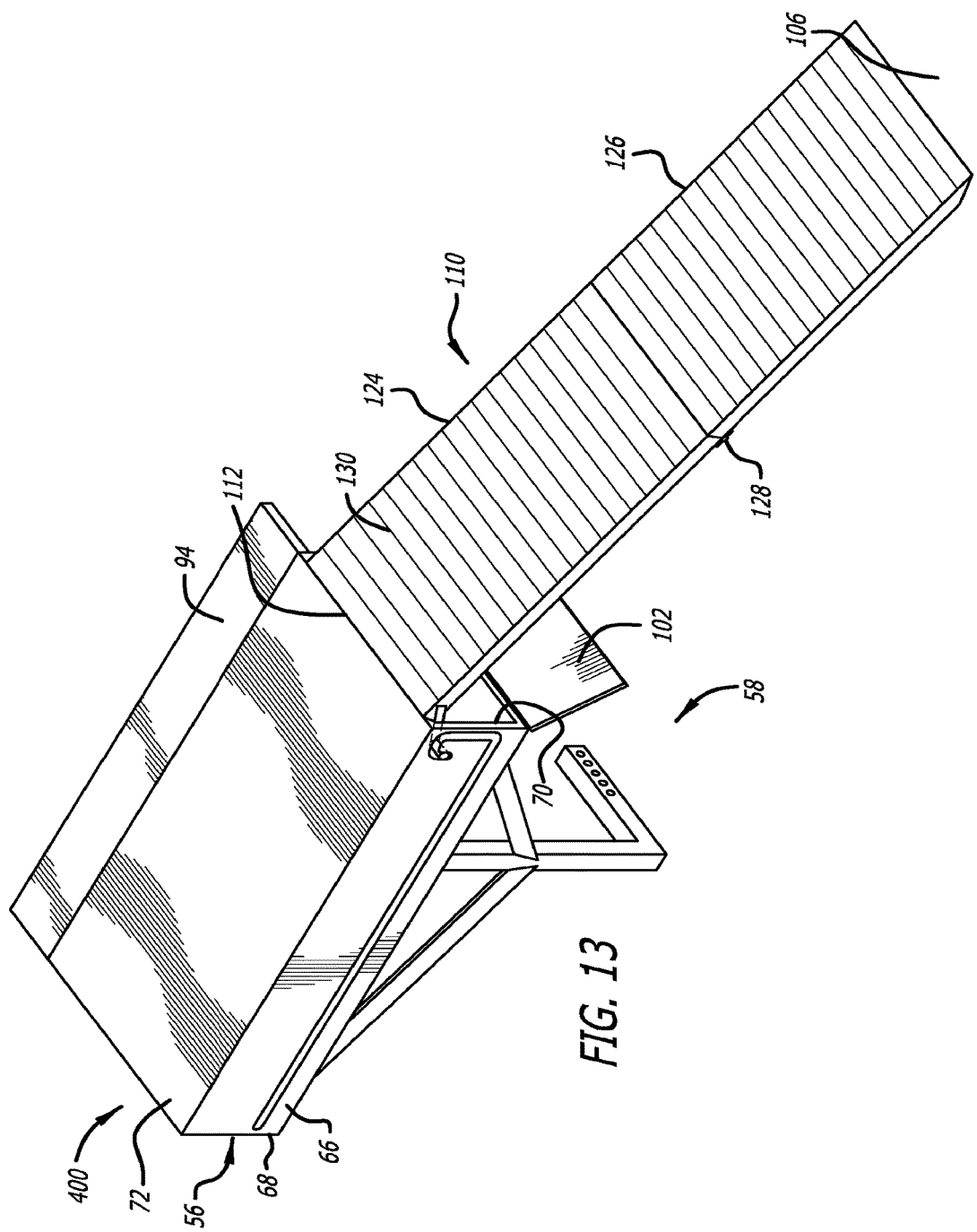
FIG. 13 is a perspective view of the carrier system of FIG. 12 where the ramp has been fully removed from the carrier container and has been deployed into providing a slope from the ground surface to the top surface of the carrier container, also showing the bridge plate being deployed.

Turning now to FIGS. 11-13, another embodiment of a carrier system 400 in accordance with aspects of the invention is shown. FIG. 11 shows in an exaggerated and schematic form the folded ramp 110 being pulled from its interior 62 storage position out the open right side 70 of the carrier container 56. Alternatively, a telescoping ramp may be used. A track slot 402 is formed in the rear wall 66 of the carrier container and another track slot 402 is formed in the front wall 64 of the carrier container. In this embodiment, the right side of the carrier container is open and has a lid 102 for covering the open right side. In this figure, the lid has been pivoted downward to be out of the way of the movement required to deploy the ramp. In another embodiment, the open side may be the left side 68 and the lid may be mounted over that side, or the rear side 66 with the lid mounted over that side. The carrier container lid 102 is pivotally mounted to the bottom side of the carrier container with a hinge 103 as depicted in FIG. 11 such that, when closed, the carrier container lid covers the open side and protects the cargo contained within. Although a sill 108 is not shown in this embodiment, the carrier container can also include a sill similar to that depicted in FIGS. 1A and 1B to anchor the deployed ramp 110. Also, the two slots 402 are shown as being formed in walls of the carrier container. This is only for clarity of illustration. It is anticipated that such guide slots would be formed in an internal track so that the walls of the container may be solid to prevent rain and other environmental contaminants from reaching the inside of the container.

FIG. 12 illustrates positioning guide slots 402 in further detail. The slots 402 in this embodiment are opposing each other from opposing walls 64, 66 in the container 56 and each engages a respective guide pin 404 mounted at the proximal end 112 of the ramp 110. The guide pins are located at the ends of guide pin brackets 406 that are mounted at opposite sides of the proximal end of the ramp. The angle of the bracket mounting to the ramp is predetermined so that when the ramp is deployed from the container, the guide pins will hold the proximal end of the ramp in which the ramp is flush with the top surface 72 of the container 56.

The guide pin brackets each with a guide pin at its end have a size that is long enough to allow the entire ramp to be pulled out of the container 56 so that it can be unfolded and reach a ground surface. However, the guide pins are still within the guide slots at that time. Once the ramp has been unfolded and is in contact with the ground, the proximal end of the ramp is then raised so that the guide pins follow a vertical portion 408 of the slot. This vertical portion of the slot causes the proximal end of the ramp to be raised above a flush position with the top surface 72 of the container. The ramp is then pushed toward the container and the guide pins follow a short "L" section in which the proximal end of the ramp is brought closer to the top surface of the container and then the guide pins drop into locking sections 410 of the slots. The guide pins are not restricted in movement away from the container. The proximal end of the ramp each is not flush with top surface of the container. Because guide pins have been used, the ramp has freedom to be rotated up or down for placement purposes. Various details of this guide and locking system may be changed to achieve the desired mounting of the proximal end of the ramp with the top surface of the container. Those skilled in the art may recognize various changes that may be made.

The carrier system 400 of FIGS. 11 and 12 includes a spring mechanism 390, such as a coil spring, that is configured to assist an operator in pulling the ramp 110 out of the open side 70 of the carrier container 56. In the example shown in FIG. 11, a first end 392 of the coil spring 390 is attached to the interior surface 393 of the left side 68 of the carrier container, and a second end 394 of the coil spring is attached to the top segment 124 of the ramp 110. When the lid 102 of the carrier container is opened, a spring force provided by the coil spring pushes the ramp out the open right side of the carrier container, facilitating its deployment. Other spring mechanisms, configurations, and operator-assisting features may exist that can be used.

FIG. 13 shows the ramp storage and deployment system of FIGS. 11 and 12 in which the ramp has been deployed and has its proximal end 112 flush with the top surface 72 of the container 400. When the loading or unloading has been completed, the proximal end of the ramp is lifted, pulled away from the container, and allowed to lower. The ramp 110 is then folded and it is pushed back into the container against the spring force (see FIG. 11). Once the ramp is completely in the container, the lid 102 is pivoted upwards to the closed position and it locks the ramp within the container.

In the figures discussed above, the carrier system (50, 400) has been centered on the longitudinal axis 136 at the rear of the vehicle 52 (for example, see FIGS. 2 and 4). FIGS. 14 and 15 illustrate an alternate embodiment in which the carrier system 500 is mounted to the hitch such that it is off-center towards the right side of the vehicle 52 thereby leaving space on the left side of the vehicle for the operator to access the cargo bay. The carrier system 500 can also be mounted such that it is off-center towards the left side of the vehicle. The off-center mounting configuration is shown for a carrier container that is somewhat smaller than that shown in FIGS. 2 and 4 and therefore it occupies less space at the rear 60 of the vehicle. As a result, the off center mounting configuration provides additional room at the rear of the vehicle for vehicle operators to use for another purpose or purposes. The carrier container in this embodiment is connected to the same hitch 82 of the vehicle 52 as the embodiments discussed and shown in previous drawings. Because this embodiment is mounted off center or to the side of the hitch, it is referred to below in some instances as being side mounted, or having a side mount. However, this "side mount" term may also refer to a structure wherein a support arm from the support structure engages a side of the container for mounting purposes. It is then "side mounted" to a side of the container.

In the embodiments of FIGS. 14 and 15, the carrier container 56 has been side mounted to the vehicle 52, and the carrier support structure 58 includes an upward angled support arm 88 extending into supporting contact with the carrier container. In FIGS. 14 and 15, the supporting arm 88 is connected with the bottom 74 of the container. However, in another embodiment, the support arm may be connected to either the left 68, right 70, or front sides 64 of the container (not shown). Various support connections are possible. The support arm 88 may be bolted to the container, or otherwise attached in a sturdy manner.

In the off-center configuration of the carrier container shown in FIGS. 14 and 15, the bridge plate 94 has been shaped with a notch 502 to fit into the cargo area so that it does not collide with the inner right side of the vehicle 52 during deployment. Specifically, the modified bridge plate includes two segments, namely a cargo bed segment 504 and a bridge segment 506 separated by the notch 505. The cargo bed segment 504 is cut to rest fully on the cargo bed 54 of the vehicle. The bridge segment 506 connects to and spans the length of the top surface 104 of the carrier container as in the center-mounting configuration. In this way, the modified bridge plate covers any gap between the upper surface 104 of the carrier container lid 102 and the cargo bed 54, yet can be off center to the vehicle and still engage the cargo bed.

Figure 16:
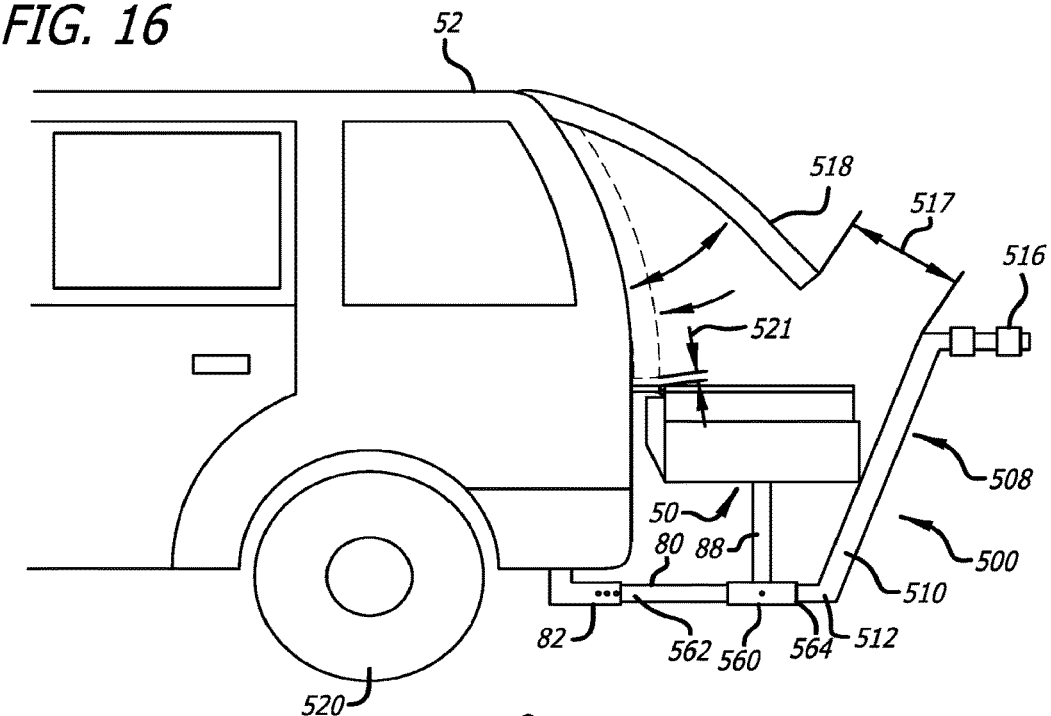
FIG. 16 is a side view of a variation in the construction of a bike rack support strut with the carrier system of FIGS. 14 and 15, the figure also showing the use of a hitch extender to locate the bike rack far enough to the rear to permit the rear door of the vehicle to be opened without obstruction.

FIGS. 14, 15, and 16 show the carrier system 500 having a bicycle rack 508 attached to the carrier support structure 58. In this embodiment, the bicycle rack is center mounted with a bike rack support arm 510 formed on the center mounted tongue 512 and terminating in the rack 514. In this embodiment, the bicycle rack has two prongs 516 on which bikes mounted and secured for travel. So that there is adequate room for the container and the bicycles, the bicycle rack 508 is positioned to the rear of the container. In FIG. 14, the bicycle rack does not interfere with mounting a ramp to the rear side 66 of the carrier container. However, if bicycles were present and mounted onto the rack, a ramp could still be mounted to the carrier container, but at its right side 70.

Turning now to FIG. 16, one embodiment of the bicycle rack mounting arm 510 is shown. In this case, the arm is angled upward to the rear for three reasons. One reason is so that bicycles will be hung on the rack to the rear of the carrier container. Bicycles for adults can be almost as long as some passenger vehicles are wide and therefore a center mount is necessary. To successfully mount the bicycles to the back of the vehicle and still have use of the cargo carrier container system 500, the bicycle rack must be located rearward of the carrier system.

A second reason for mounting the bicycle rack rearward of the carrier system 500 is to avoid interfering with opening and closing the rear door 518 of the vehicle 52. A third reason for the rearward angle for the bicycle rack support arm 510 is to avoid having an extended tongue 512 length. Tongues that are too long are susceptible to ground impact when the front wheels of the vehicle are higher than the rear wheels 520. Keeping the tongue length shorter by using a bicycle rack support arm that is angled rearward and upward is a way to avoid such problems.

To implement spacing between the bicycle rack 508 and the vehicle's rear door 518 so that the door may be opened and closed when bicycles are mounted to the rack, a trailer hitch extender 560 may be used, as illustrated in FIG. 16. In such case, the first end 562 of the trailer hitch extender 560 is a tongue that fits into the hitch receiver 82 of the vehicle. The second end 564 of the trailer hitch extender 560 is a receiver that receives the tongue 512 of the bike rack support structure. The carrier support structure is mounted on top of the trailer hitch extender in front of the bike rack so the carrier does not interfere with the bike rack. The added length provided by the trailer hitch extender also moves the bicycle rack 514 rearward enough so that the rear door of the vehicle does not collide with the bicycle rack or other side mounted item as the door is opened or closed. This is shown by distance 517 which designates the closest distance the door and bicycle rack are to each other through the full arc 519 of movement of the back door 518. It is likewise the case that clearance is provided between the arc of the door and the topmost feature of the carrier container, which is the lid 102. Distance 521 designates the clearance distance of the door 518 from the lid of the container. Therefore, full functionality of all of the back door, the carrier container, and the bike rack are provided by the particular design of the carrier system.

Various improvements to the carrier system 50, 400, 500 are contemplated. For example, the carrier container 56 may include one or more internal trays (not shown) that may be used to hold cargo stored in the interior storage space of the container. These trays also serve to constrain the movement of cargo in the carrier container. This is useful when cargo may otherwise tend to be thrown about in the container due to being subjected to physical forces caused by acceleration, deceleration, and centrifugal forces resulting from vehicle movement. One or more trays may be used to store the ramp and other cargo, including hunting weapons, and the tray may include dividers for the vehicle operator to organize the cargo stored.

Additionally as shown in FIG. 14, the carrier container includes one or more foldable or telescoping legs 550 on its bottom side 74 at the rear. These legs provide added bracing support for the weight of cargo moving along the top of the carrier container when needed.

In another embodiment, the carrier container 56 may include a recess or a bracket for holding the vehicle's license plate. This may be necessary to comply with applicable traffic laws requiring license plate visibility. In such case, the recess or bracket may include a light at its upper perimeter for illuminating the plate during the night. For instance, a battery-operated light-emitting diode may be used. The carrier system may include one or more reflectors attached to the rear side 66 of the carrier container for improved visibility.

In a further embodiment, the carrier system 50 may include multiple carrier container lids 102 in lieu of a single lid. For example, one lid may be connected to the left side 68 of the carrier container 56 by a hinge, and another lid may be connected to the right side 70 of the carrier container 56 by a hinge, by which the two lids can pivot outwardly to provide access to the interior storage space 62 of the carrier container. Such a configuration has not been shown in the drawings. Side openings (not shown) also are possible.

Depending on the particular design of individual vehicles, different carrier support structures may be needed. As an example, the height difference between the cargo bed of the vehicle and the hitch may range from several inches to several feet (several centimeters to more than a meter). To accommodate these height differences, the carrier support structure shown in FIG. 1 may be modified to extend downward or upward before being mounted to the bottom 74 of the carrier container 56, or may be mounted instead to the left, right, or front side of the carrier container, while keeping the top surface 104 of the carrier container lid or carrier container flush with the cargo bed of the vehicle. The use of an interchangeable support structure with the carrier container will allow the carrier system to be useable with a variety of different vehicle sizes. The ability for vehicle operators to replace the carrier support structure without having to replace the entire carrier system also provides a cost-effective solution to vehicle operators who want to switch vehicles while using the same carrier system, or to change the carrier system from a center-mounting to off-center mounting configuration, or vice-versa.

In another embodiment, the carrier support structure has a built-in height adjustment mechanism capable of raising or lowering the height of the carrier container in several inch increments. For instance, a first version of the carrier support structure includes a height adjustment mechanism capable of increasing the height of the carrier container within the range of 6.0 inches (15.3 cm), and a second version capable of increasing the height of the carrier container in the range of 7.0 to 12.0 inches (17.8 to 30.5 cm), so that the operator can selectively position the carrier container such that its top side surface is flush with the vehicle's cargo bed. A third version of the carrier support structure may also exist that is capable of decreasing the height of the carrier container within a range of zero to 4.0 inches (10.2 cm), in situations where the top surface 104 of the carrier container lid happens to be higher than the cargo bed. In that case, the side mount may include a second height adjustment mechanism that decreases the height of the carrier container until its top side is flush with the cargo bed. Alternatively, a reduction in height may be achieved by modifying the carrier support structure to adjust downward before being mounted to the bottom side 74 of the carrier container 56. In other embodiments, the carrier support structure mounts to the left, right, or front side of the carrier container instead of the bottom side. Different versions of the carrier support structure may also exist between the center-mounting and off-center mounting configurations.

The top surface 104 of the carrier container lid 102 (see FIG. 2) not only allows vehicle operators to move cargo into and out of the vehicle, but it also provides working space for the operator to use. For example, a gardener who is carrying pots and bags of soil in the vehicle can move the items onto the top surface of the carrier container lid and use this surface as working space to fill the pots with the soil. However, the working space provided only by the top surface of the carrier container lid may not be enough for operators to arrange their tools, work pieces, or other items. Accordingly, the carrier system in accordance with other aspects allows removable work surfaces to be positioned at the rear and sides of the carrier container to provide operators with additional working space to place their tools and other objects.

Figure 17:
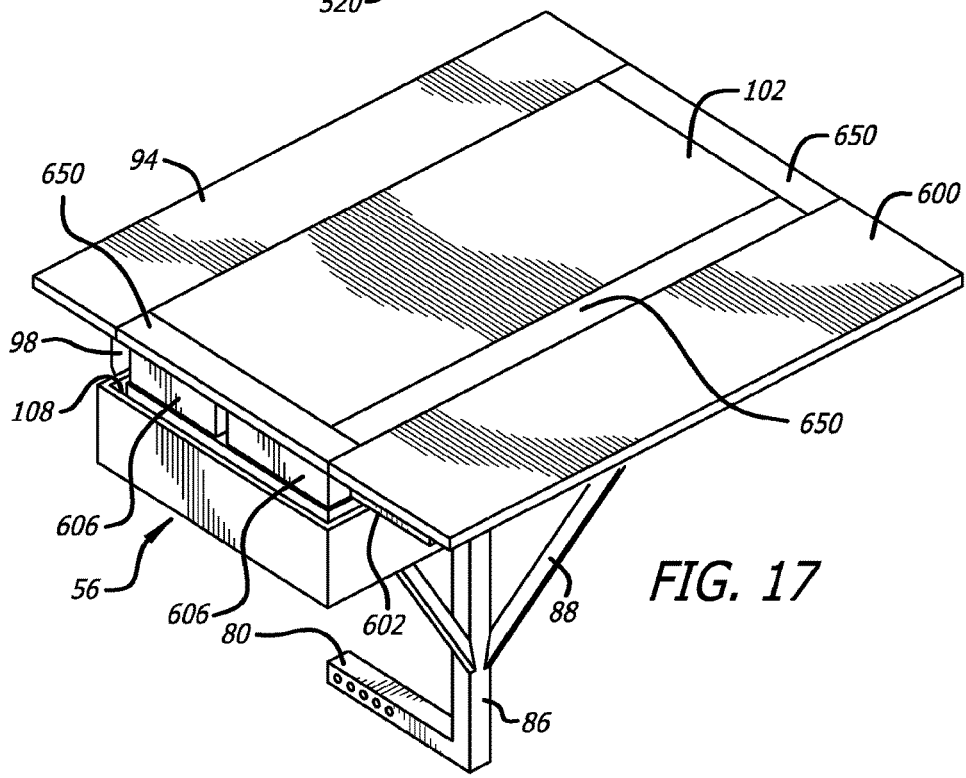
FIG. 17 is a perspective view of a variation of a carrier system that includes a removable work surface placed on pivotable braces forming a part of the outer structure of the carrier container, the pivotable braces being with support brace housing assemblies connected to the carrier container.
Figure 18:
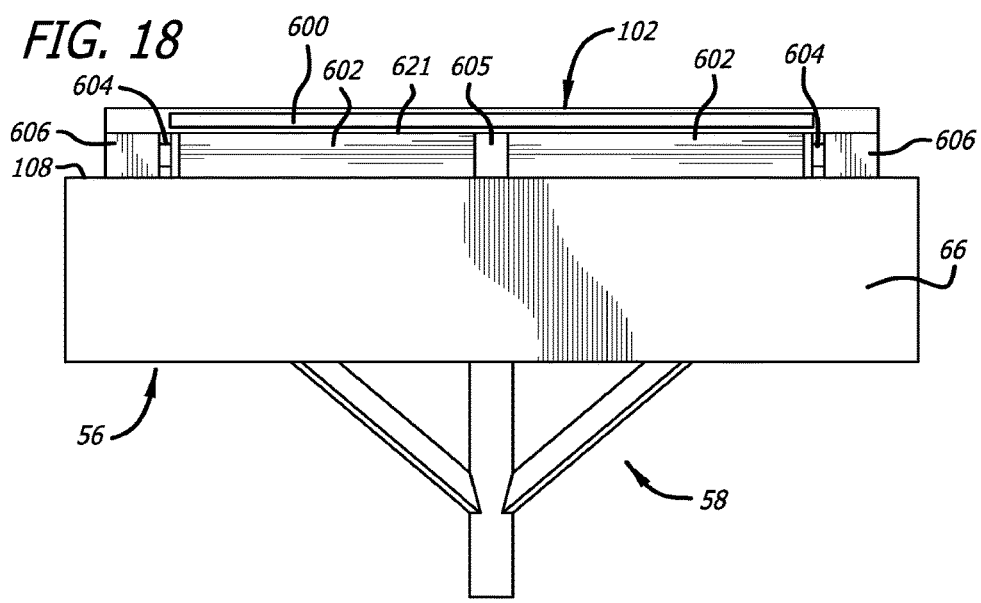
FIG. 18 is a rear view of a carrier system showing work surface pivotable braces mounted under the lid of the carrier container for use in supporting a work surface when needed.
Figure 19A:
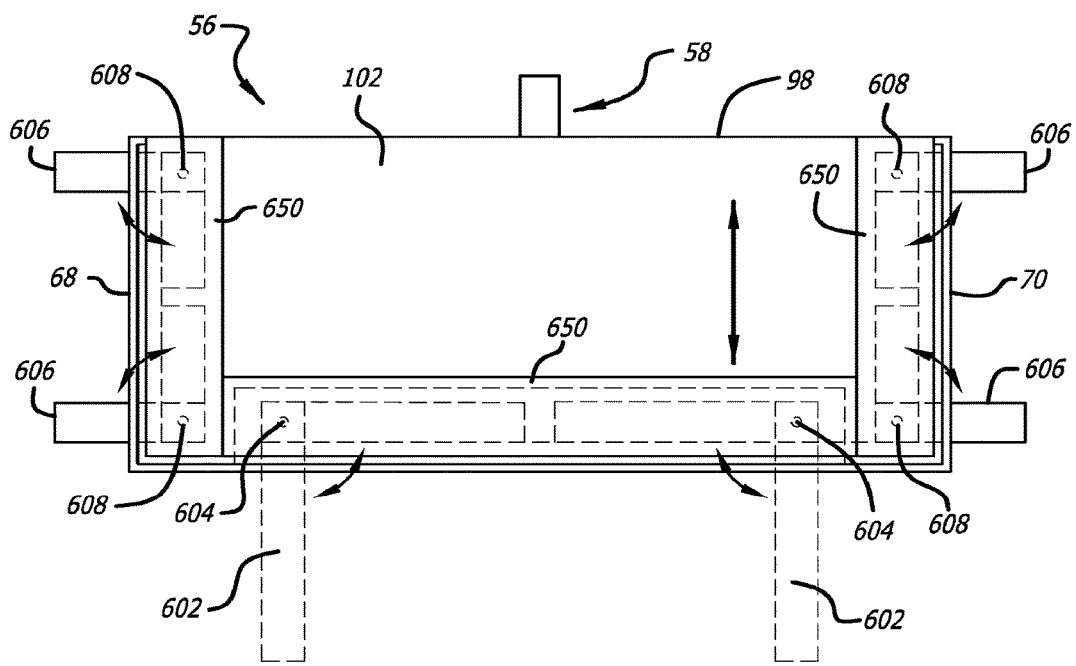
FIG. 19A is a top view of the carrier system of FIG. 18 showing in dashed lines the pivotable braces located on both right and left sides and at the back side of the container that may be used with work surfaces, in this case, actually showing support of a work surface mounted at the rear.

In the embodiment of FIG. 17, a work surface 600 is provided. In this embodiment, the work surface comprises a thin and rigid board made of any rigid material that can support a given weight. The work surface is shown resting on a pair of support braces 602, only one of which is shown due to the angle of the drawing. FIGS. 18 and 19A show further detail of the support braces. Such support braces 602 are pivotally mounted in this embodiment and are deployed by pivoting them rearward from their stored position. As a summary of the embodiment of FIG. 17, the work surface is stored in the interior storage space 62 of the carrier container 56 (see FIG. 1A). The operator would open the carrier container lid 102, remove the work surface 600 from the interior storage space, pivot the rear braces 602 outward into their deployed positions, close the lid, and place the work surface on the deployed rear braces. The work surface 600 attachments are stored in the carrier container 56 below the ramp container and they rest on shelves (not shown) which can be accessed through a pivoting side door which pivots open to expose the shelves and the work surface 600. The work surface may be attached to the tops of the rear support braces 602 in some manner to secure it in a working position on the braces. For example, the braces have indentations formed in their top surfaces that are sized to receive pins or other protrusions formed on the bottom surface of the work surface device (not shown). Upon mating the protrusions of the work surface device with the indentations of the braces, the work surface 602 is held in position for use. Importantly, the top of the work surface 600 is flush with the top surface 104 of the carrier container lid to provide a large, flat work area. In another embodiment, protrusions may also be formed in the rear surface of the lid that mate with indentations in the top or front surfaces of the work surface device to hold the work surface device in position in relation to the braces. Other means for holding the work surface is a selected position are possible.

Referring now to FIGS. 18 and 19A, two rear support braces 602 are mounted to the rear side 66 of the carrier container 56 above the sill 108 for supporting the work surface 600. The rear support braces 602 are connected to the carrier container by hinges 604 that allow the rear support braces to pivot outwardly and rearward away from the carrier container when deployed, as illustrated in FIG. 19A. The same hinges allow the support braces to be stowed along the rear side 66 of the carrier container when not deployed. Securing the support braces in stowed position may be accomplished by various fasteners known to those of skill in the art.

Figure 19B:
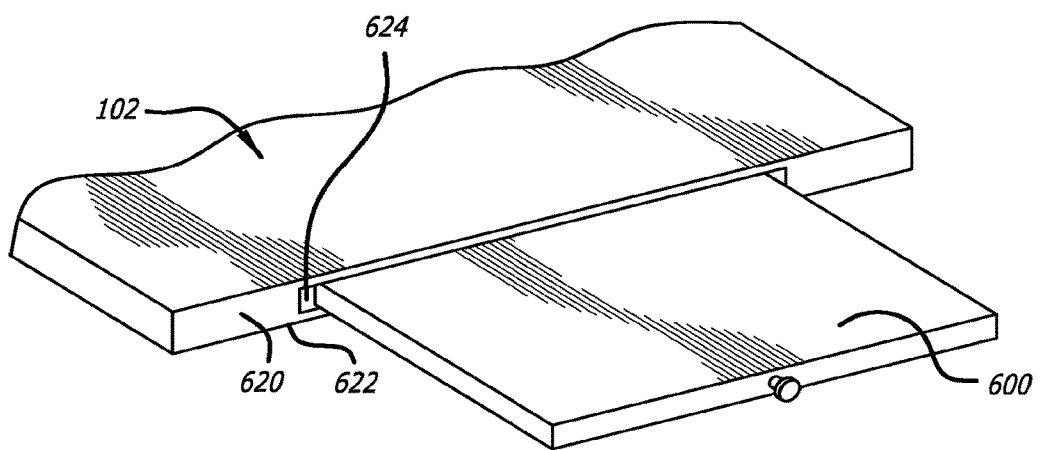
FIG. 19B is a perspective view of the container lid of a carrier system in which is slidably mounted a work surface, the work surface being slidable rearward through an opening in the rear side of the carrier container lid and having a knob mounted at its rear surface that may be grasped by an operator to assist in movement of the work surface.

As shown in FIG. 19B, the removable work surface 600 may be dimensioned to fit inside the carrier lid 102 when not in use, and can slide out of carrier lid when deployed. Alternatively, the removable work surface 600 in these figures may be dimensioned to fit inside the carrier lid 102 when not in use, and it slides out of the carrier lid when deployed. This is shown in FIG. 19B.

It should also be noted that although the support braces 602 and 606 are shown as single pieces in FIG. 19A, they may be made longer by attaching additional lengths to their ends by hinges. The hinges will allow the additional lengths to be folded inward to be stowed thereby taking less storage room and folded outward when used to support larger work surfaces.

Still referring to FIGS. 18 and 19A, the carrier container 56 also includes side support braces 606 mounted to the left 68 and right sides 70 of the carrier container also above the sill 108 for supporting additional side work surfaces (not shown) for extra working space. The side support braces 606 can be connected to the carrier container 56 by the same hinges 604 as the rear support braces, or by separate hinges 608 as illustrated in FIG. 19A. The hinges allow the side support braces 606 to pivot outwardly away from the carrier container to support side work surfaces (not shown) when deployed and to be stowed along the left 68 or right sides 70 of the carrier container when not used. Side work surfaces can be stored in the carrier container when not used or stored in their own compartment below that ramp compartment as referenced in FIG. 21.

In one embodiment where a work surface 600 is stowed within the lid 102 of the carrier container 56, the work surface is slidable out of the lid through its back wall 620, as shown in FIG. 19B.

In this embodiment, the work surface may be restricted from being fully removed from the lid so that it is secured in position and will not fall off the braces. A pair of ridges, one extending upward from the back of the work surface and one extending downward from the top of the lid at its opening 624 would retain the work surface in the lid, yet the work surface could still be removed from the lid by sliding it outward until the two ridges engaged, then lifting the rear end of the work surface upward at an angle so that its top ridge could move under the ridge of the opening of the lid and be removed.

Deployment of side work surfaces (not shown) slidably stored in the lid would be performed in a similar manner as described above for the rear work surface. Where a lid is used the store three work surfaces that slide out from the rear and sides of the lid, the work surfaces will be likely be much smaller than the work surface shown in FIGS. 18, 19A, and 19B. In another embodiment, only one work surface is slidably stowed within the lid.

In the embodiment shown in FIGS. 17-19A, the stowed positions of the work surface support braces 602, 606 are located inward enough so that the sill 108 remains available for use for mounting a ramp 110 (see FIG. 1A). This configuration results in a particular advantage in that items may be loaded into or unloaded from the cargo compartment of the vehicle 52 to which the carrier system 50 is mounted while any necessary paperwork may be done on a work surface 600 that has been deployed at a different side of the lid 102 from that side where the ramp is anchored.

Referring now to FIGS. 19C-19E, each pair of rear support braces 602 and side support braces 606 (not shown) may be respectively contained within a support brace housing assembly 650. A structure of a support brace housing assembly is shown in the rear view of FIG. 19C. Although only two rear support braces 602 are illustrated in the figure, the support brace housing assembly could similarly include side support braces as well.

As shown in FIGS. 19C and 19D, the support brace housing assembly 650 includes a support brace housing 652, a pair of support braces (602 or 606) contained within the support brace housing, the hinges 604 for each pair of support braces, and a work surface mounting interface 654 or "lip" connected to the top surface 656 of the support brace housing for securely receiving the work surface 600. The hinges 604 for each pair of support braces (602, 606) are attached to the inner wall 658 of the support brace housing. Alternatively, the support braces 602, 606 are attached to the support base housing with a rotating cylinder (not shown) attached to the top and bottom of the housing assembly. Gaps 660 located above and below the support braces provide clearance for the support braces to move. The support braces are also vertically positioned such that the support braces do not collide with the rim 115 of the sill 108 when deployed. The drawings of FIGS. 19D and 19E are schematic in form to illustrate concepts rather than to provide features that are to scale or that may be used in generating manufacturing drawings. However, those skilled in the art will readily understand the concepts presented in these drawings.

The support brace housing assembly 650 is connected to the rear, left, and right sides of the carrier container 56. In one embodiment, where the carrier container lid 102 is designed so that it does not extend over the sides of the carrier container (e.g. a panel lid), the back 662 of the support brace housing 652 may be fastened directly to the side 66, 68, or 70 of the carrier container 56 (see FIG. 1A). Moreover, where the carrier container lid 102 includes sides 663 that extend down over the side of the carrier container to assist in holding the lid in place as shown in FIG. 19E, the support brace housing assembly can be mounted the same by fastening the back 662 to the side 66, 68, 70 of the carrier container 56 similarly.

When the support brace housing assembly 650 is connected to the carrier container 56, the top surface 668 of the surface mounting interface 654 lies flush with the top surface of the carrier container lid 102 when the carrier container lid is closed. A recess 670 is formed in the surface mounting interface to receive a complementary protrusion 672 from the work surface 600. The recess results in a rim 674 located at the outer edge of the surface mounting interface 654.

To attach the rear work surface 600 or side work surfaces to the surface mounting interface 654, the work surface is held at an angle relative to the surface mounting interface such that the protrusion 672 can be inserted into the recess 670. This angle may, for example, be 45 degrees. Once inserted, the work surface is rotated until its bottom surface 676 lies upon and is supported by the deployed support braces (602, 606). The configuration results in the top surface 678 of the work surface being flush and continuous with the top surfaces of the closed carrier container lid 102 and the surface mounting interface. The rim 674 also prevents the protrusion from inadvertently dislodging from the recess, thereby securing the work surface to the surface mounting interface.

In one embodiment, the support brace housing assembly 650 includes a folding cover (not shown) hingedly connected to the top surface of the support brace housing assembly. In such case, the cover is pivoted to rest on the support braces when deployed, and the work surface rests partially on the cover as well as the support braces when the work surface is attached to the surface mounting interface.

It will be appreciated that the work surface 600 is located off to one side or the rear side of the cargo container top surface 104 so that the bridge plate 94, the cargo container top surface, and the ramp 110 can continue to provide a continuous surface from the cargo bed 54 to the ground surface 106. Meanwhile, the work surface may be used for a wide variety of things, such as completing paperwork to inspecting a sample of the cargo while the remainder of the cargo is being onloaded or offloaded. Devices have been shown to secure the work surface in place at the carrier container and additionally, vertical support of the work surface in the form of braces 602 and 606 have been shown. These vertical support devices (braces) are configured to extend under the secured work surface to allow more weight to be placed on the top of the work surface without damaging the work surface.

Figure 20:
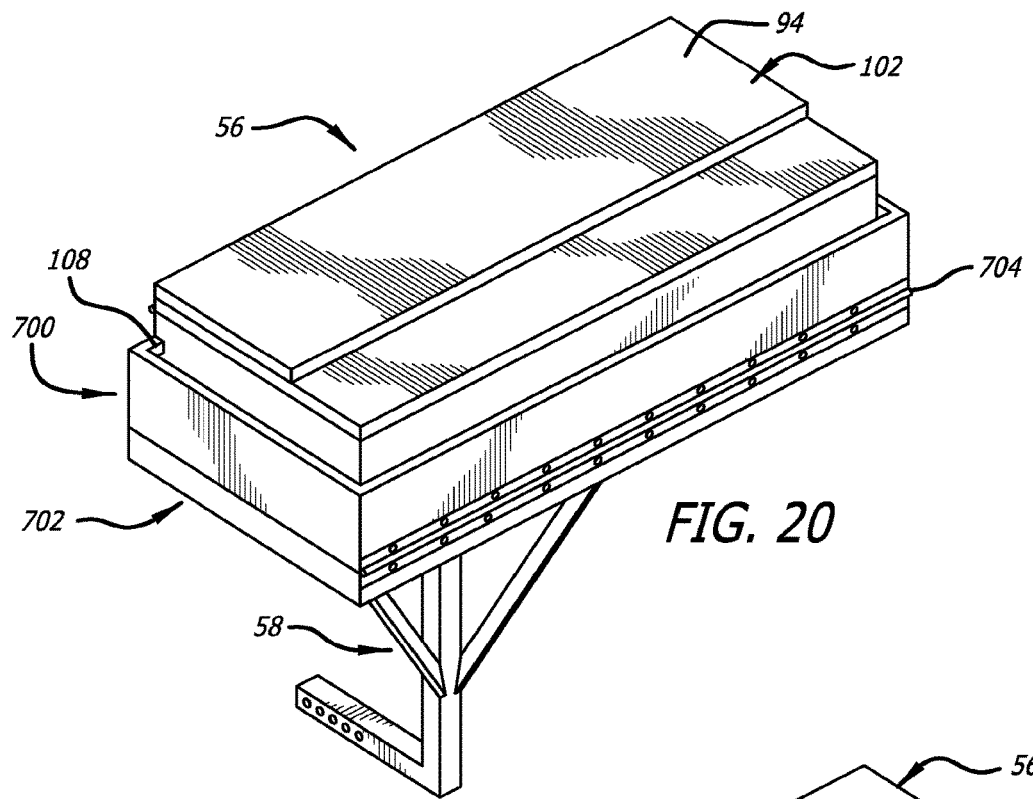
FIG. 20 is a perspective rear view of a carrier system having a container comprising two storage compartments, the main one of which is shown in FIG. 1A and the second of which is at the bottom of the container reachable by pivoting the main compartment to the rear to thereby open the second compartment.
Figure 21:
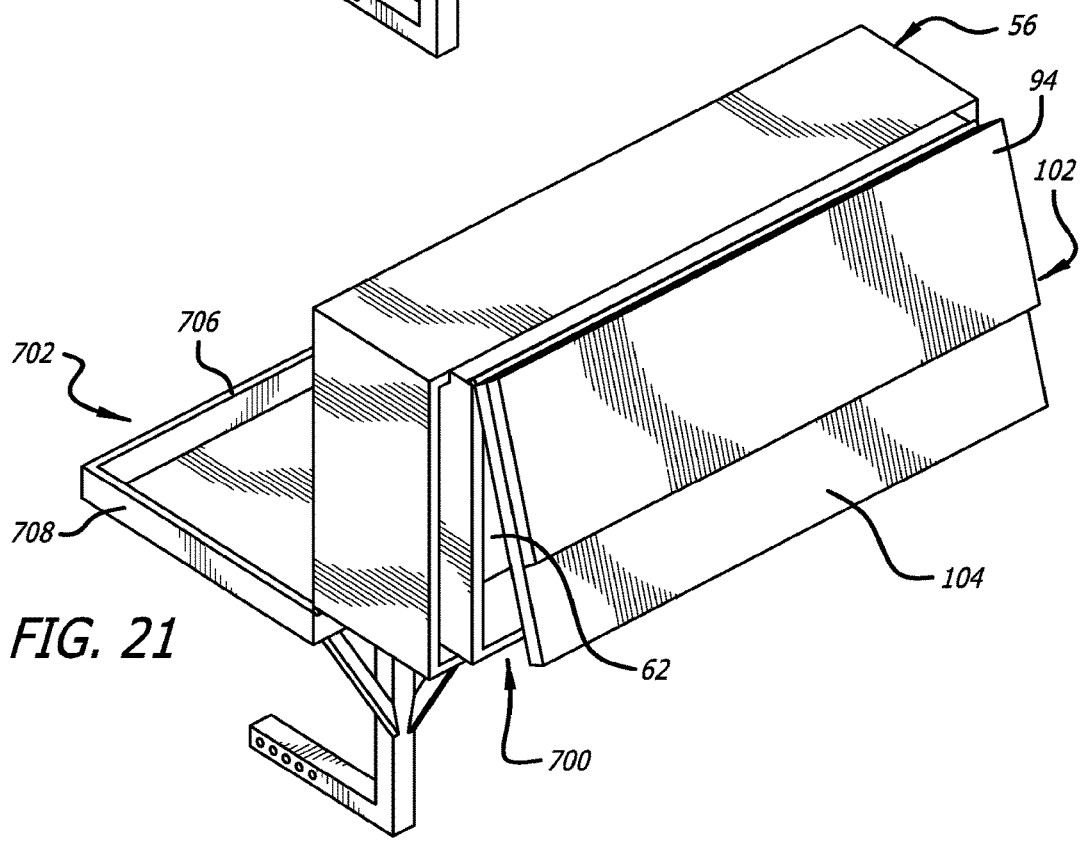
FIG. 21 is a perspective view of the carrier system of FIG. 20 showing the main compartment pivoted to the rear to thereby open the second container.

In another embodiment of a carrier container as shown in FIGS. 20 and 21, the container 56 includes two storage compartments, which are a first compartment 700 at the top of the carrier container and a second compartment 702 located at the bottom of the carrier container. In this particular embodiment, the second, or lower, compartment is shown as being smaller than the first compartment. Heavier items may be stored in the second compartment, for example. The side work surfaces (additional surface features) may be stored in the second compartment as well. Also, in one embodiment the second compartment has a size selected to receive and store a ramp. Because the carrier container is positioned near the back door of the vehicle to which it is mounted, the hinge between the first and second compartments is located at the rear of both so that the upper compartment is pivoted rearward to allow access to the lower (second) compartment. Otherwise, if the hinge were at the front surface of the container, the upper compartment portion may hit the back of the vehicle when opened. FIG. 21 shows the operation of the rear hinge 704 which allows the carrier container to pivot outward until the top surface 104 of the carrier container lid 102 is facing rearward. As a result, the first compartment of the carrier container 56 effectively serves as a lid to the second storage compartment 702.

While FIG. 21 illustrates that the second storage compartment 702 can be accessed from its open top side 706, in an alternative embodiment, the left side 708 or right side (not shown) of the storage compartment 702 may be open to provide access to the second storage compartment 702. In such case, a lid may cover the open left or right side similar to that shown in FIG. 11. This compartment can also have shelves to help store and organize the additional surface features.

In another embodiment, the carrier does not have a carrier container 56 but instead has only a carrier platform. In the carrier platform embodiment, the carrier container top surface 104 exists but there is no storage area under it. The continuous surface will be provided from the cargo bed to the ground surface by the bridge plate, the carrier platform, and the ramp, but there is no storage container at the carrier platform. Storage of the ramp will be provided by the vehicle or the ramp can be strapped to the top of the carrier platform. As with the carrier container embodiment, the bridge plate is attached to the front of the platform by hinge as shown and described above for the carrier container embodiment. Also, the carrier platform will have a depth sufficient for providing a sill large and strong enough to support the ramp. As with the carrier container embodiment, in the carrier platform embodiment, the sill is configured to receive the proximal end of the ramp so that the upper surface of the ramp is flush with the carrier platform.

The carrier platform version has several considerations. If the width of the exterior platform is less than fourteen inches (which is the width of a typical bridge plate) then the bridge plate will overhang the exterior platform surface at the rear side. This is not a problem as long as the overhang is not so large as to also overhang the outside perimeter of the ramp resting sill mounted on the rear side of the exterior platform. This means that the overhang can be as much as three inches which means that the minimum width of the exterior platform is eleven inches.

Also, as the width of the platform gets thinner, then the width of the side perimeter of the exterior platform gets thinner. If using a seventeen inch ramp, the side resting sill for the ramp must have at least nineteen inches of width if the ramp is to be used safely perpendicularly to the vehicle. The nineteen inches includes seventeen inches for the ramp and two inches for a safety margin. As mentioned above when using a seventeen inch ramp and two inches for a safety margin. As mentioned above when using a seventeen inch ramp there must be nineteen inches of width available on the sill, which means the sill must extend at least five inches beyond the front perimeter towards the rear of the vehicle.

In order for there to be enough space for the ramp's sill to extend beyond the front perimeter of the exterior platform towards the rear of the vehicle, the vehicle design must have a certain amount of curve at the rear of the vehicle and the exterior platform must be mounted in the side configuration as opposed to the center configuration. It is possible to have a configuration where the exterior platform is as wide as the entire width of the vehicle such that there is enough space for the resting sill to extend beyond the front perimeter of the exterior platform towards the rear of the vehicle on both sides of the exterior platform. This is the equivalent of having two side-mounted exterior platforms mounted on each side of the vehicle at the same time.

Vehicles with a curved design and an exterior platform mounted in the side configuration can accommodate a resting sill with a greater width extending beyond the front perimeter of the exterior platform towards the rear of the vehicle than a vehicle with no curve. Vehicle design and how much space is available to extend the resting sill beyond the front perimeter of the exterior platform towards the rear of the vehicle are main factors driving the minimum width of the exterior platform. If the exterior platform width is less than fourteen inches, then it must be mounted in a side configuration and must be used on a vehicle that has a certain amount of curve. Also, no matter what the amount of curve the vehicle has, the exterior platform cannot be less than eleven inches as a result of the bridge plate rear overhang limitation. The main issue when the exterior platform has a width that is less than fourteen inches is preserving the important functionality of being able to use the ramp both perpendicular as well and parallel to the back of the vehicle. The issues of exterior platform width and vehicle curvature have no impact on the ability to use the ramp parallel to the back of the vehicle. It also is possible to adjust these figures by changing the width of the ramp to a thinner width which would allow relative reductions in the minimum platform width. Importantly, it is intended to keep the distance the carrier extends off of the back of the vehicle to a minimum.

The improved system and method described above: 1) facilitates, significantly improves, and adds flexibility to a user's ability to deploy a ramp from the back of a parked vehicle; 2) allows the ramp to be deployed perpendicularly to the right, perpendicularly to the left, and parallel to the vehicle from the back, as opposed to current standards where the ramp can be used only parallel to the vehicle from the back; 3) allows the top of the ramp to be level with the vehicle's cargo bed, thereby smoothing the transition to the ramp, reducing the ramp slope angle, and resulting in easier use of the ramp, as opposed to current standards requiring the ramp to rest on the interior surface of the vehicle, thereby increasing the difficulty of transitioning to the ramp, increasing the slope angle of the ramp, and resulting in more difficult use of the ramp; and 4) allows the rear door of the vehicle to both open and close while the ramp is deployed in all three possible directions, as opposed to current standards allowing for the ramp to be deployed only when the rear door is open and only parallel to the vehicle from the back.

The improved system and method further at least: 5) allows the ramp to be deployed perpendicularly to the vehicle when a curb is present, thus significantly reducing the height difference between the ramp resting surface and the ground surface, lowering the slope angle of the ramp, and significantly reducing the difficulty of using the ramp, as opposed to current standards only allowing for the ramp to be deployed out the back of the vehicle and rendering it impossible to take advantage of the ground height increase to the side of the vehicle that the curb provides; 6) provides a storage carrier container that significantly reduces the hassle and strain of both loading and unloading the ramp to and from the back of the vehicle as well as the hassle and strain of deploying and stowing the ramp from the back of the vehicle, as opposed to current standards which require significant effort and strain to load and unload the ramp as well as deploy and stow the ramp; and 7) provides a platform having the very significant benefit of serving as an easily deployable stable exterior resting surface outside the back of the vehicle which facilitates the process of loading cargo in and out the rear of a parked vehicle as well as the process of working out of the rear of a parked vehicle.

The carrier system of the embodiments shown and described possesses several additional advantages. For example, vehicle operators who store the ramp in its compact configuration in the covered, interior storage space of the carrier container can prolong the effective life of the ramp 110 by protecting it against the natural elements while also protecting the vehicle interior from dirt and damage from the ramps. When no longer desired for use, the carrier system (50, 400) is easily removed from the vehicle by pulling the tongue 80 of the carrier support structure out of the receiver 82 of the hitch. Additionally, in the event where the operator wants to apply the carrier system to a new vehicle, the carrier support structure 58 is easily interchangeable, regardless of vehicle size. The carrier system is useful for pets that need assistance in egress and ingress of a vehicle and for loading, transporting, and unloading relatively heavy cargo. In the case where a non-slip surface 96 is used for the bridge plate 94, and for the top surface (104, 72) of the carrier container, and for the top surface 130 of the ramp, pet owners will feel more confident about the safety of their pets using the carrier system. Pets will not need to jump into or out of a vehicle and may safely walk up and down a ramp.

In another embodiment of the invention, as shown in FIGS. 22A-22K, the carrier system 800 includes a bridge plate 802 and carrier container lid 804, as shown in previous embodiments. In this embodiment, hinge assembly 806 is attached to the bridge plate and container lid in order to facilitate opening bridge plate and the container lid. The hinge assembly 806 includes first hinge brackets 808, a first hinge pin 810, and second hinge brackets 812, and a second hinge pin 814. The first hinge brackets 808 are attached to the rear surface 818 of the bridge plate 802, and the second hinge brackets 812 are attached to the rear surface 819 of the carrier container lid 804 and to the carrier 807. The first hinge pin 810 extends through the first hinge brackets 808, and the second hinge pin 814 extends through the second hinge brackets 812. The first hinge brackets 808 and the second hinge brackets 812 are attached to the rear surface 818 and 819 respectively, by any means, such as metal screws or bolts.

The hinge assembly 806 also includes third hinge brackets 816 which are an oval shaped set of brackets each having a hole for accepting the first hinge pin 810 and the second hinge pin 814. The third hinge brackets 812 are free floating, that is they are held only by the first hinge pin 810 and the second hinge pin 814, and do not attach to the bridge plate or the container lid. While the third hinge brackets 816 are shown having an oval configuration, they can be any shape that allows the brackets to rotate or pivot 90° on second hinge pin 814.

Figure 22A:
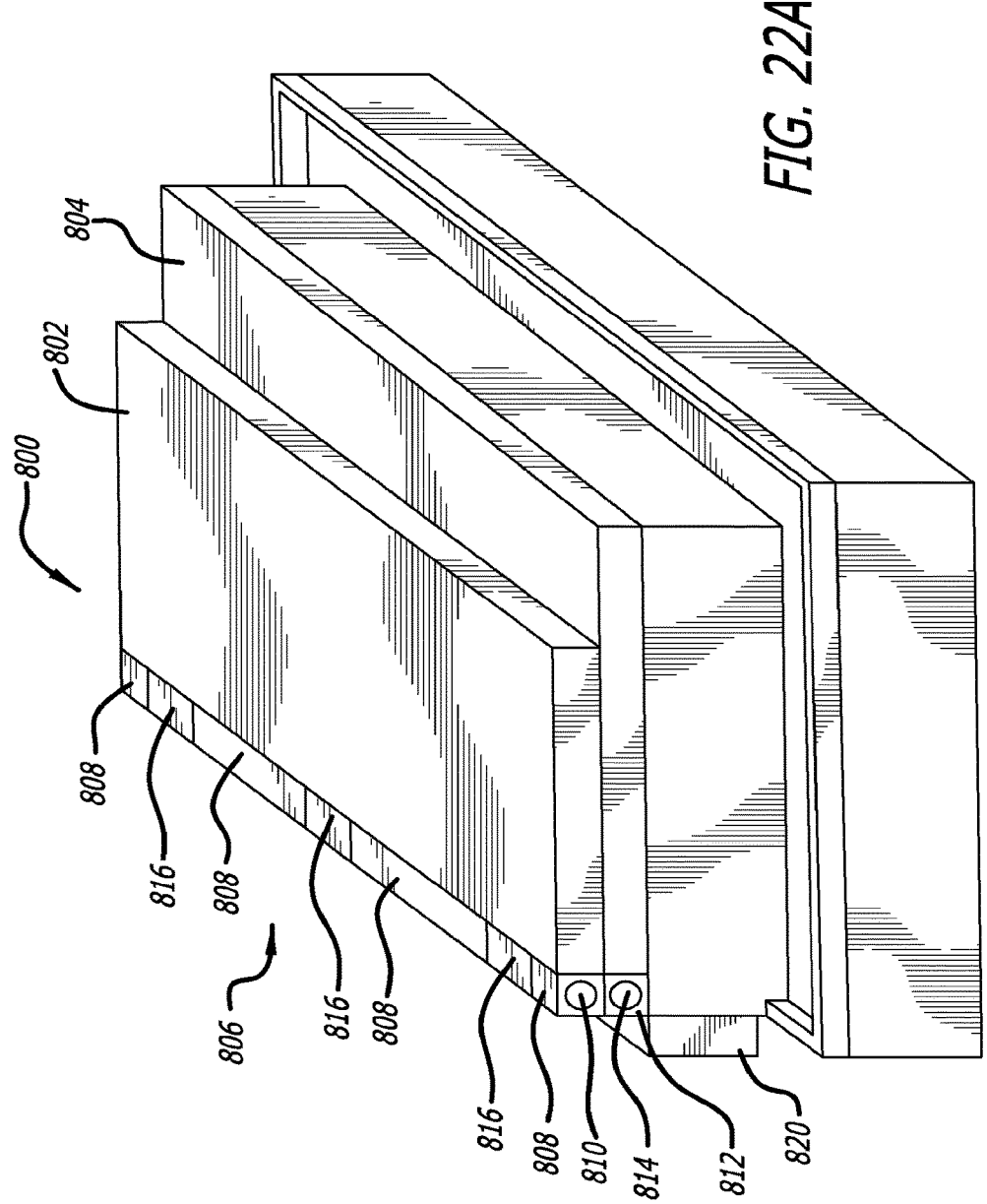
Figure 22B:
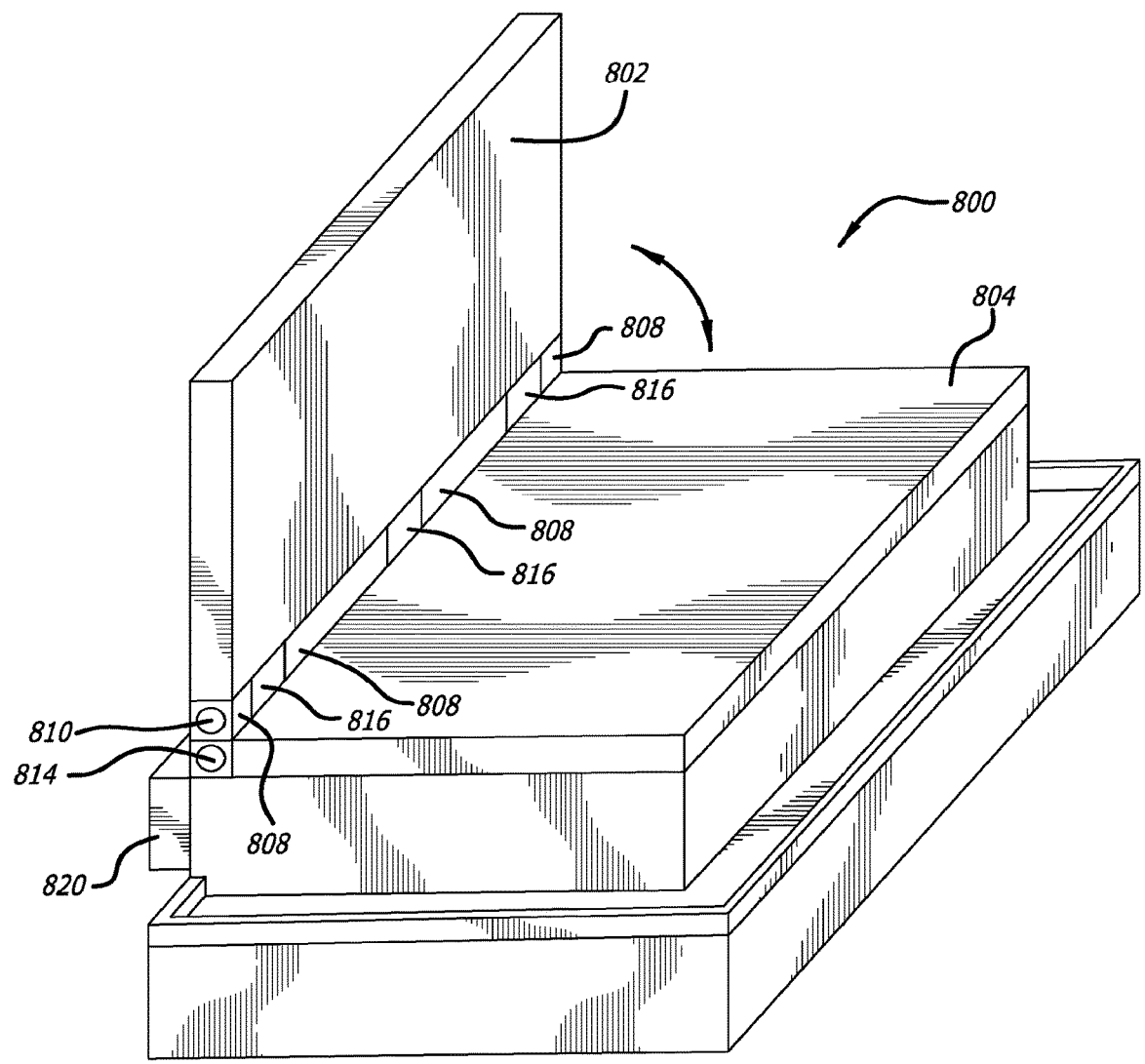
Figure 22C:
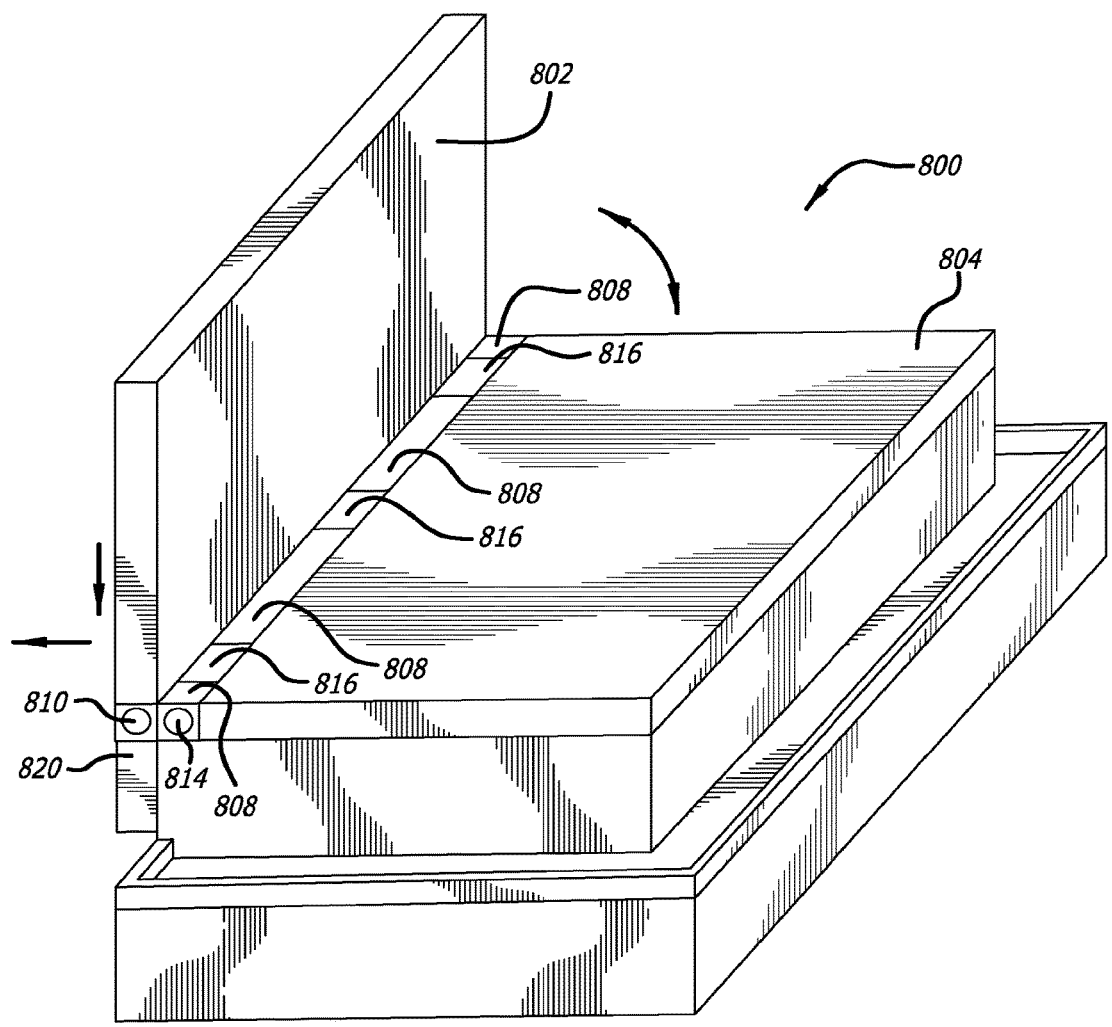
Figure 22D:
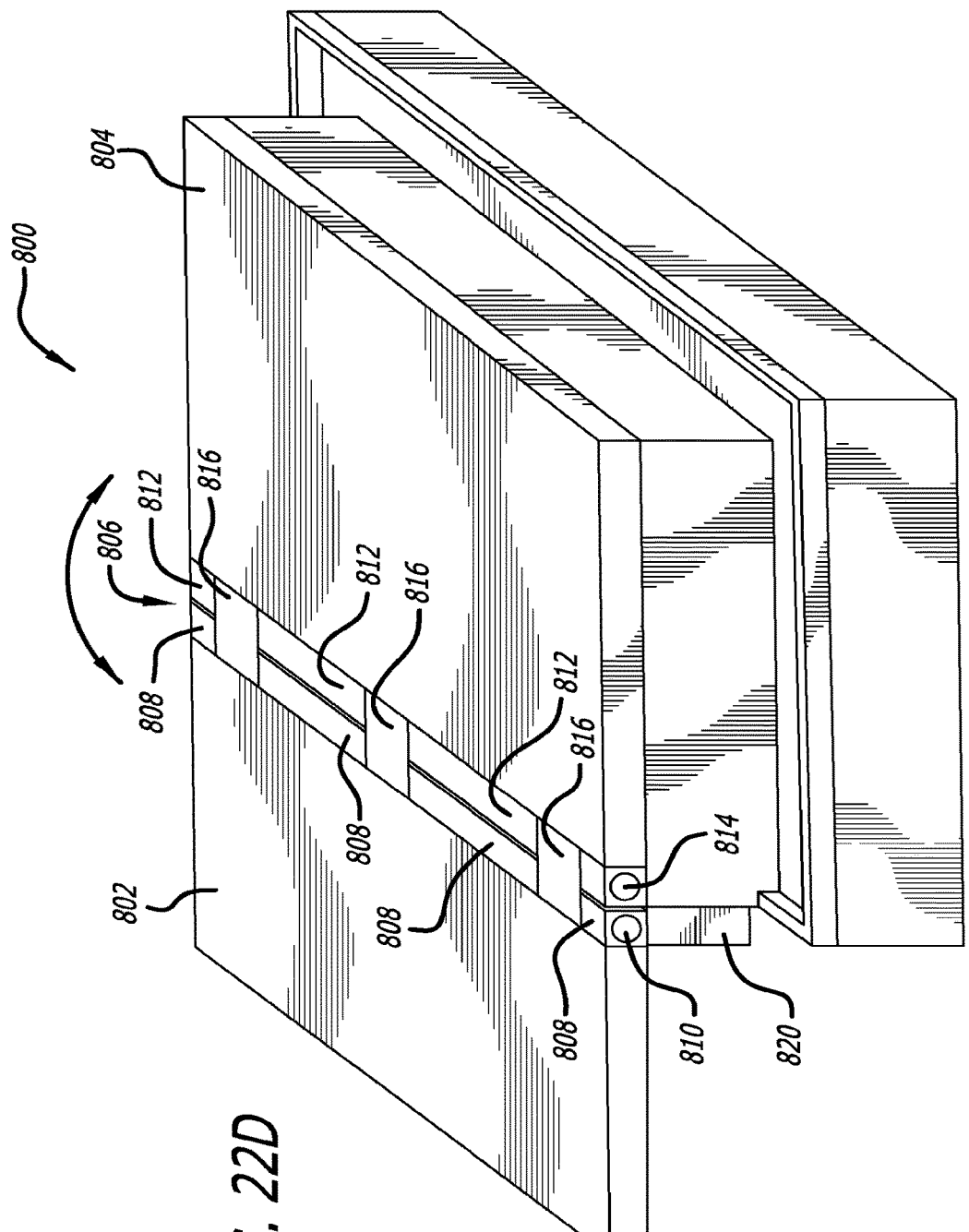
Figure 22E:
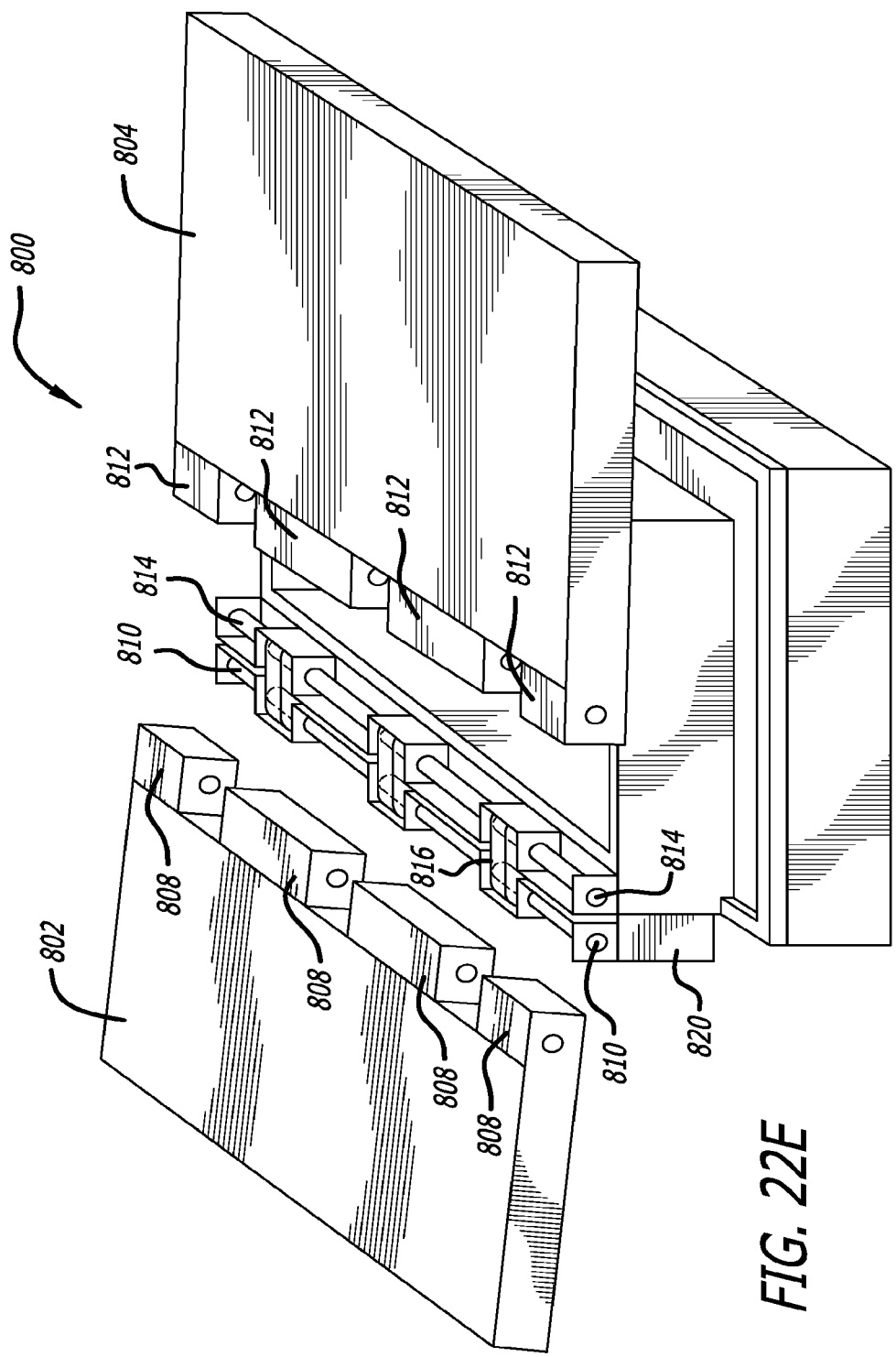

As shown in FIG. 22B, the bridge plate 802 is rotated vertically 90° utilizing the first hinge brackets 808 pivoting or rotating on first hinge pin 810. Referring to FIG. 22C, the bridge plate 802 has rotated vertically 90°, and shifted downward and to the rear (see directional arrows) in order to shift the first hinge brackets 808 on to support plate 820. In the process, the third hinge brackets 816 have rotated 90° so that the first hinge pin 810 and the second hinge pin 814 are now side by side, rather than one on top of the other. The third hinge brackets 816 have rotated around second hinge pin 814 in order to position the bridge plate 802 in the vertical position and resting on the support plate 820. Referring to FIG. 22D, the bridge plate 802 is rotated 90° more so that it is now aligned with the carrier container lid 804. The bridge plate has rotated on first hinge pin 810 so that a first edge 822 of the bridge plate is supported by the cargo floor at the back of the vehicle and a second edge 823 of the bridge plate and the first hinge brackets 808 are supported on top of the support plate 820. The bridge plate is now supported at two points, the rear of the vehicle and the support plate 820 as shown in FIG. 22L. An exploded view of the first and second hinge brackets 808, 812 and the first and second hinge pins 810, 814 is shown in FIGS. 22E and 22F.

Figure 22G:
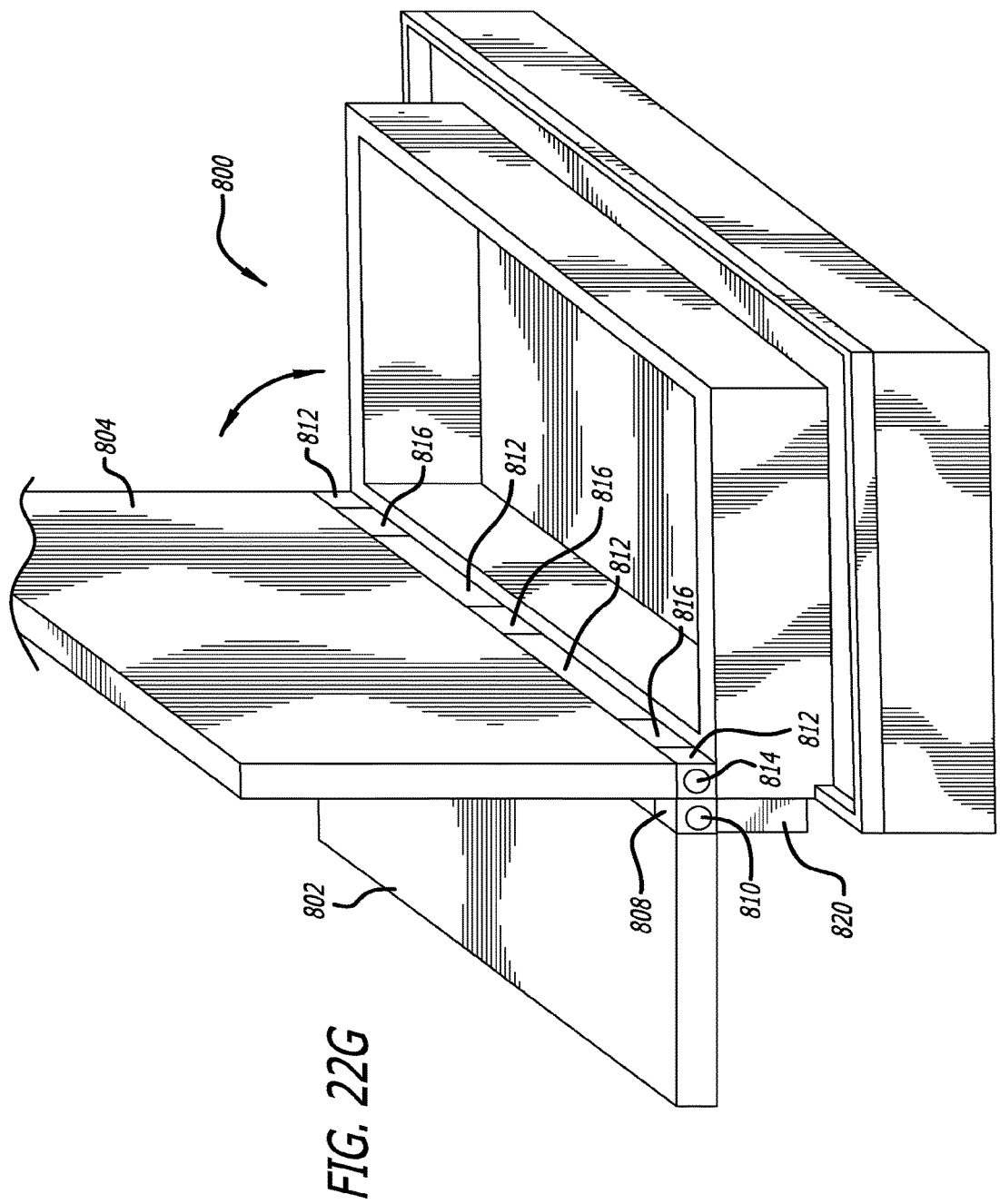
Figure 22H:
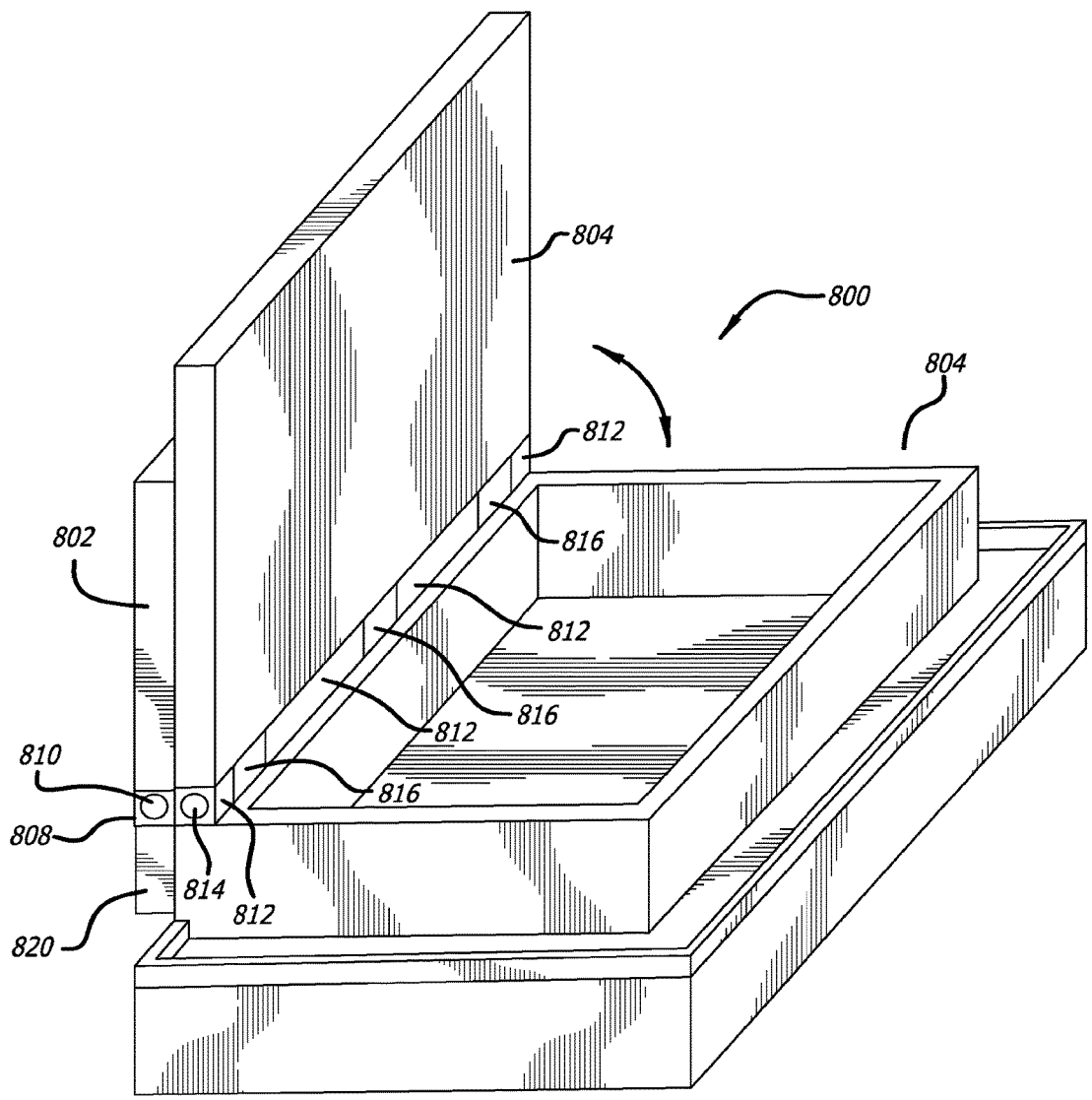

Referring to FIG. 22G, with the bridge plate 802 in the horizontal position resting on the rear of the vehicle, the container lid 804 can be opened to the vertical position by rotating the lid 90° on second hinge pin 814. In other words, container lid 804 is rotated or pivoted on second hinge pin 814 to a vertical position at 90° and allows the user to remove anything stored in the carrier container, such as a ramp, in order to facilitate unloading or loading animals or cargo into the vehicle. As seen in FIG. 22H, both the bridge plate 802 and the carrier container lid 804 are rotated or pivoted 90° to the vertical position for access to the carrier container, yet this is without the bridge plate 802 being in the horizontal position to load or unload the vehicle. As discussed previously, the bridge plate is attached to the carrier while rotating, and can be detached as required as previously described.

Figure 22I:
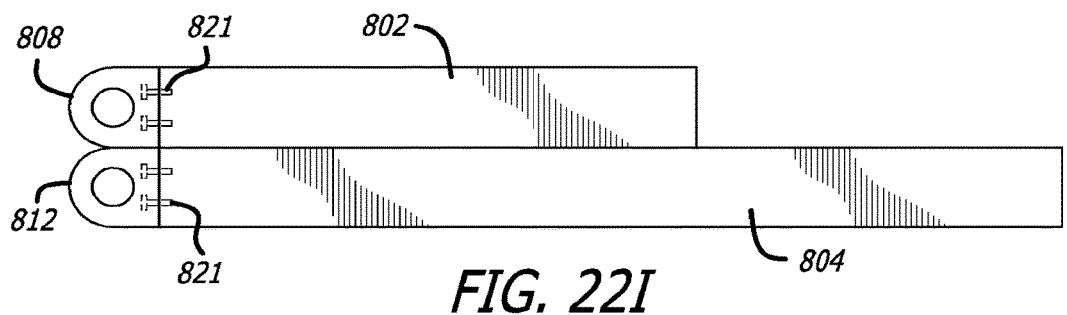
Figure 22J:
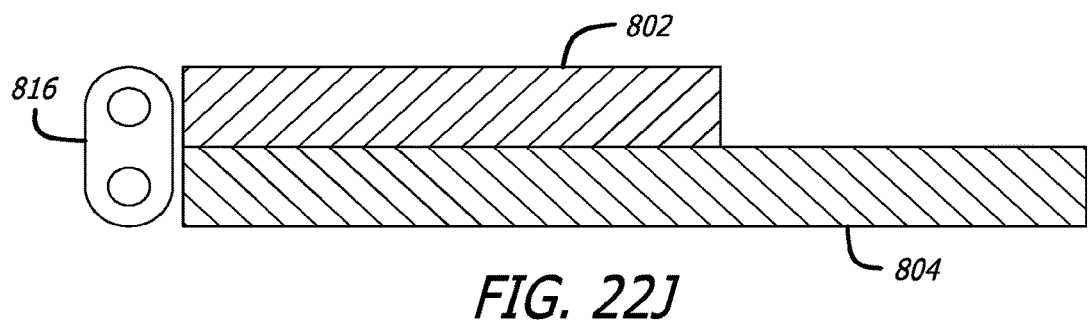
Figure 22K:
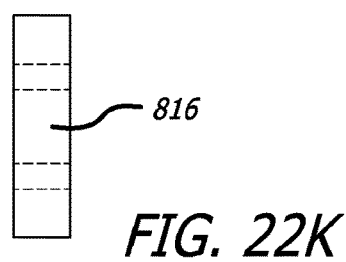
Figure 22L:
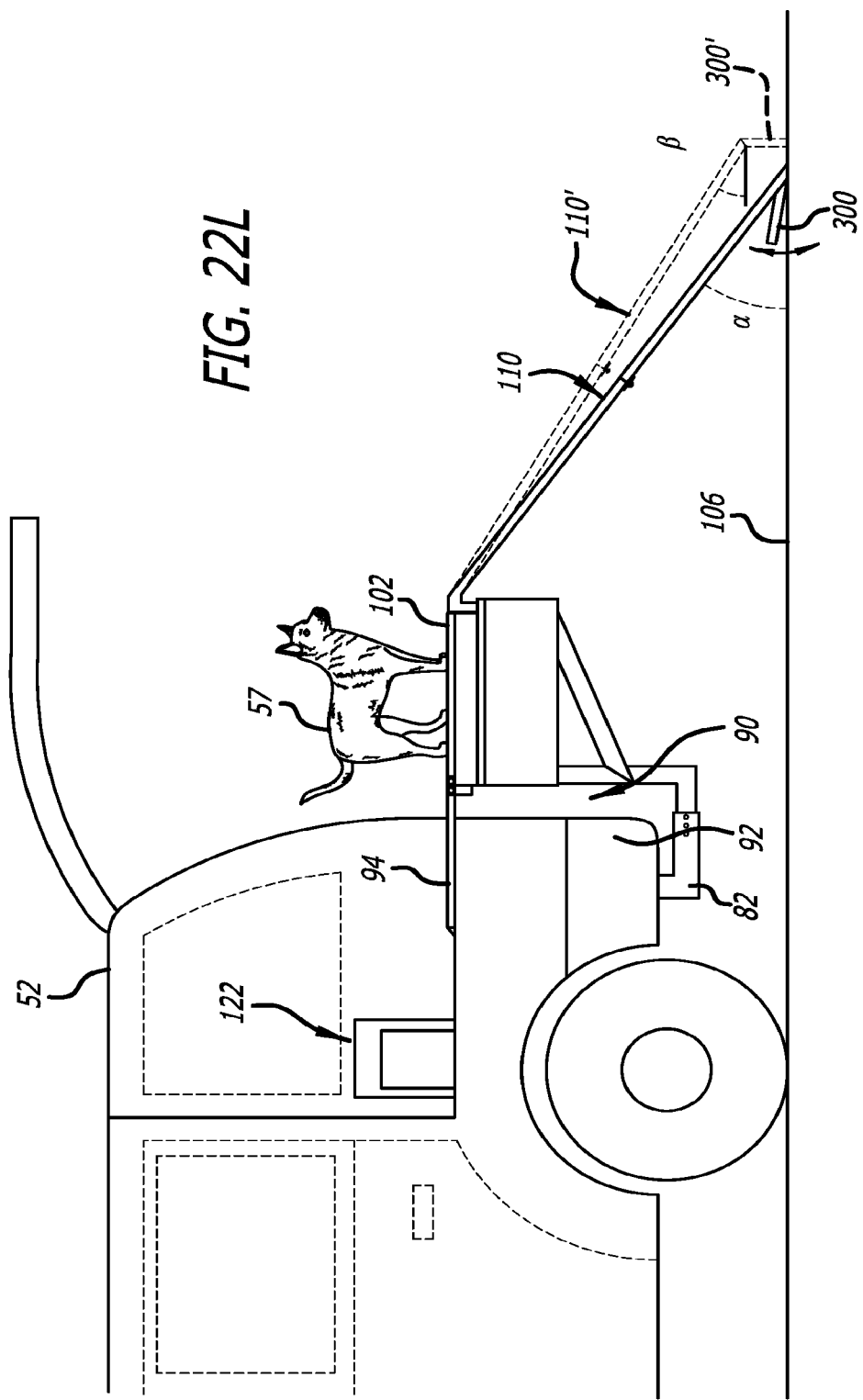

Turning to FIG. 22I, the bridge plate 802 is positioned on top of the carrier container lid 804 and in this side view it can be seen that the first hinge brackets 808 are attached to the rear surface 818 of the bridge plate. Further, the second hinge brackets 812 are attached to the rear surface 819 of the carrier container lid. The first hinge brackets and the second hinge brackets can be attached by any means, such as metal screws 821. Other means to attach the hinge brackets are contemplated, and in one embodiment the hinge brackets are formed together with the bridge plate and container lid to form an integral structure. As shown in FIG. 22J, the third hinge brackets 816 are shown with the first hinge pin 810 and the second hinge pin 814 extending through the third hinge brackets. In this embodiment, the third hinge brackets 816 are not physically attached to the bridge plate or the carrier container lid. As seen in FIG. 22K, a side view of the third hinge brackets 816 shows the holes for the first hinge pin and the second hinge pin. The third hinge brackets 816 can be a metal plate that can range in thickness from a 0.25 inch to 2 inches.

Figure 23A:
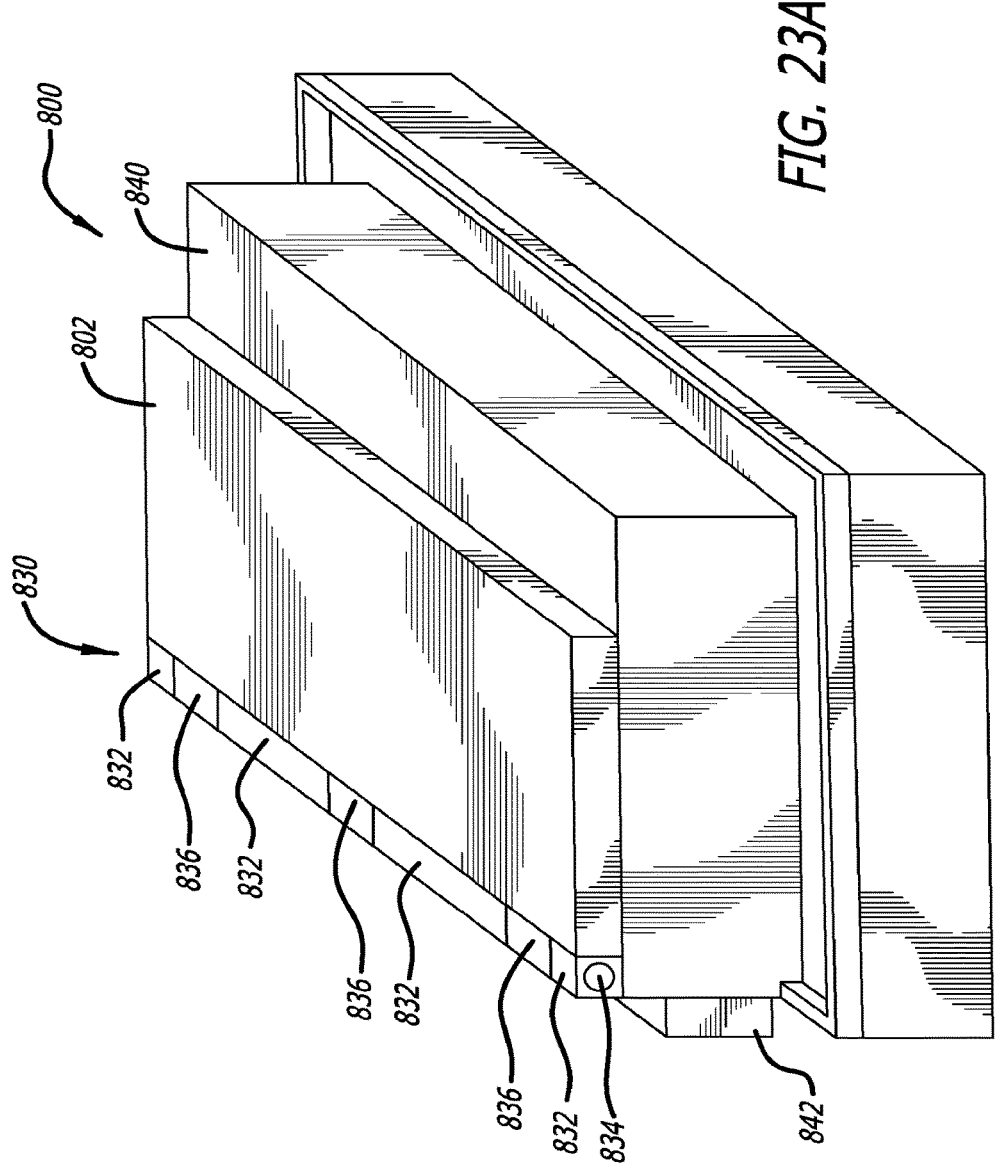
FIGS. 23A-23D are plan views depicting the operation of the hinge assembly and the pivoting movement of the bridge plate.
Figure 23B:
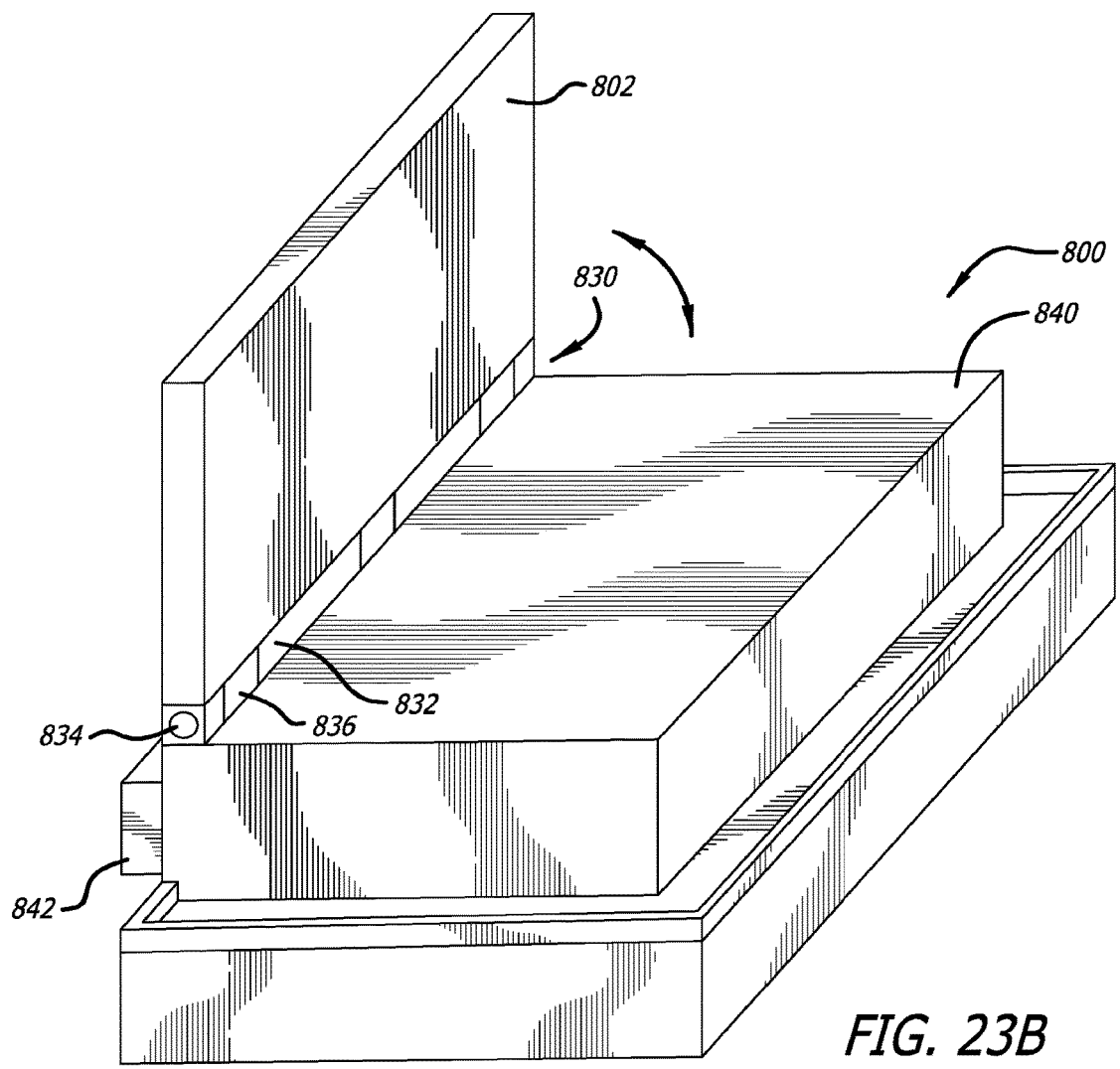
Figure 23C:
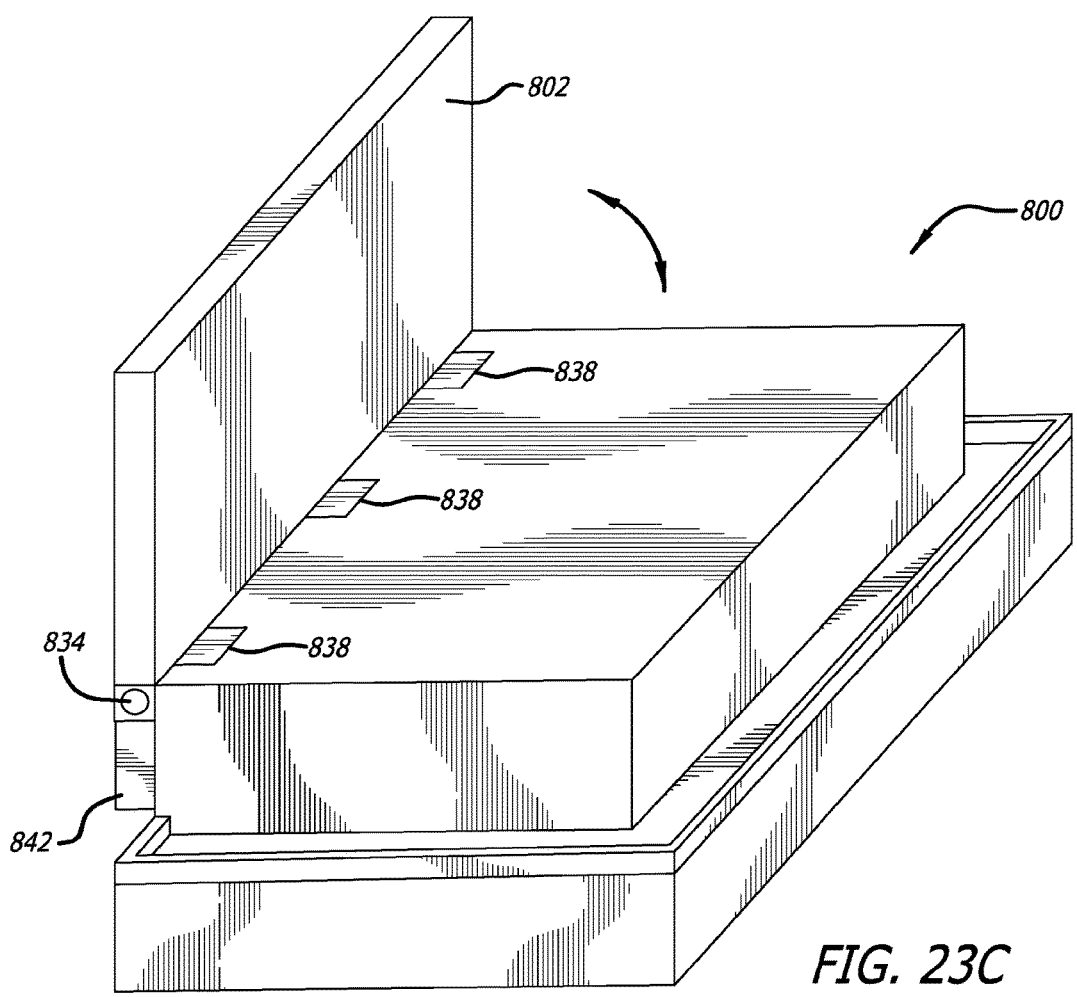
Figure 23D:
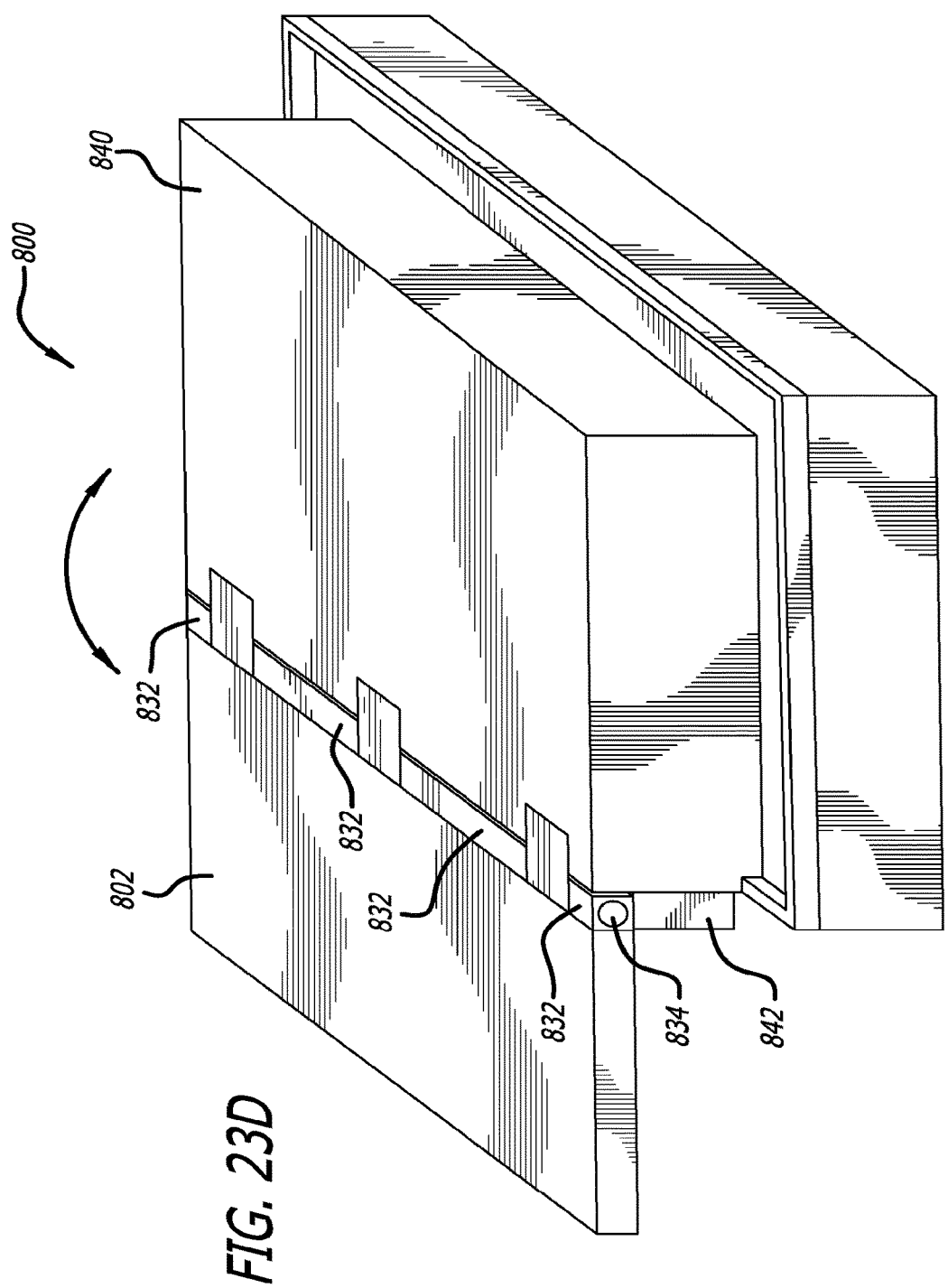

In another embodiment, as shown in FIGS. 23A-23D, the carrier system 800 includes a bridge plate 802 and a carrier container or platform 840, similar to those shown in previous embodiments. In this embodiment, fourth hinge brackets 832 are attached to the rear surface of the bridge plate using metal screws, as previously described for the first hinge brackets 808. A third hinge pin 834 extends through the fourth hinge brackets. A fifth hinge bracket 836 has a flat section 838 that lies flat on the carrier platform 840 and is attached thereto (using metal screws). As shown in FIG. 23B, the bridge plate 802 is rotated 90° to a vertical position, and with reference to FIG. 23C, the bridge plate is shifted so that the fourth hinge brackets 832 rest on top of support plate 842. The bridge plate 802 moves rearwardly and down (see directional arrows) and the fourth hinge brackets pivot on the third hinge pin so that the fourth hinge brackets come into contact and rest upon the support plate 842. The fourth hinge brackets pivot or rotate on the third hinge pin by operation of the fifth hinge bracket 836 rotating rearwardly. Thereafter, as shown in FIG. 23D, the bridge plate 802 rotates or pivots 90° more so that the bridge plate rests on the cargo floor of the vehicle and the fourth hinge brackets 832 rest on top of the support plate 842. Thus, the bridge plate 802 is supported at two points, namely the cargo floor of the vehicle and the support plate 842.

Figure 24:
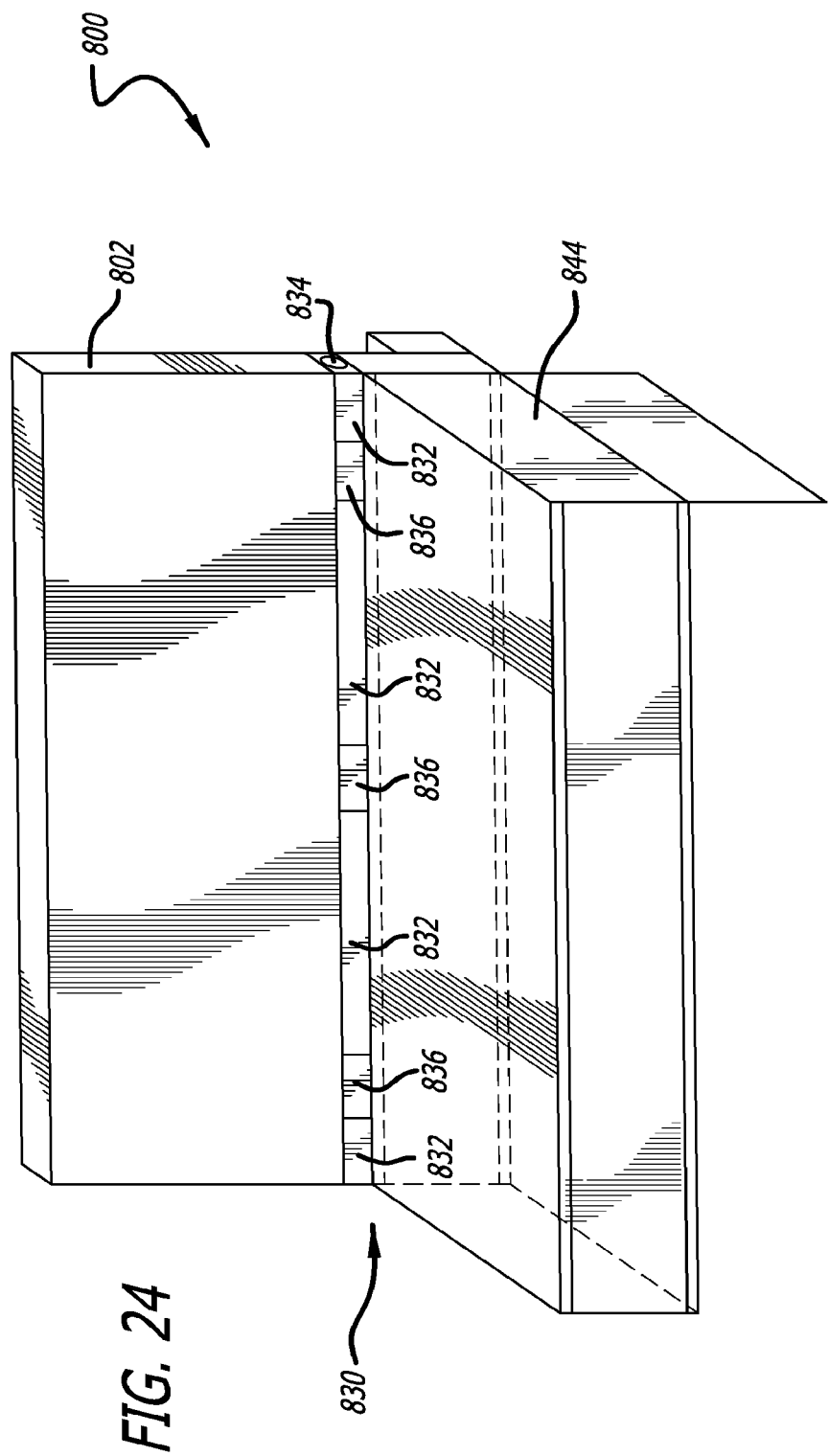
FIG. 24 is a plan view depicting the operation of the hinge assembly and the pivoting movement of the bridge plate and side door.
Figure 25A:
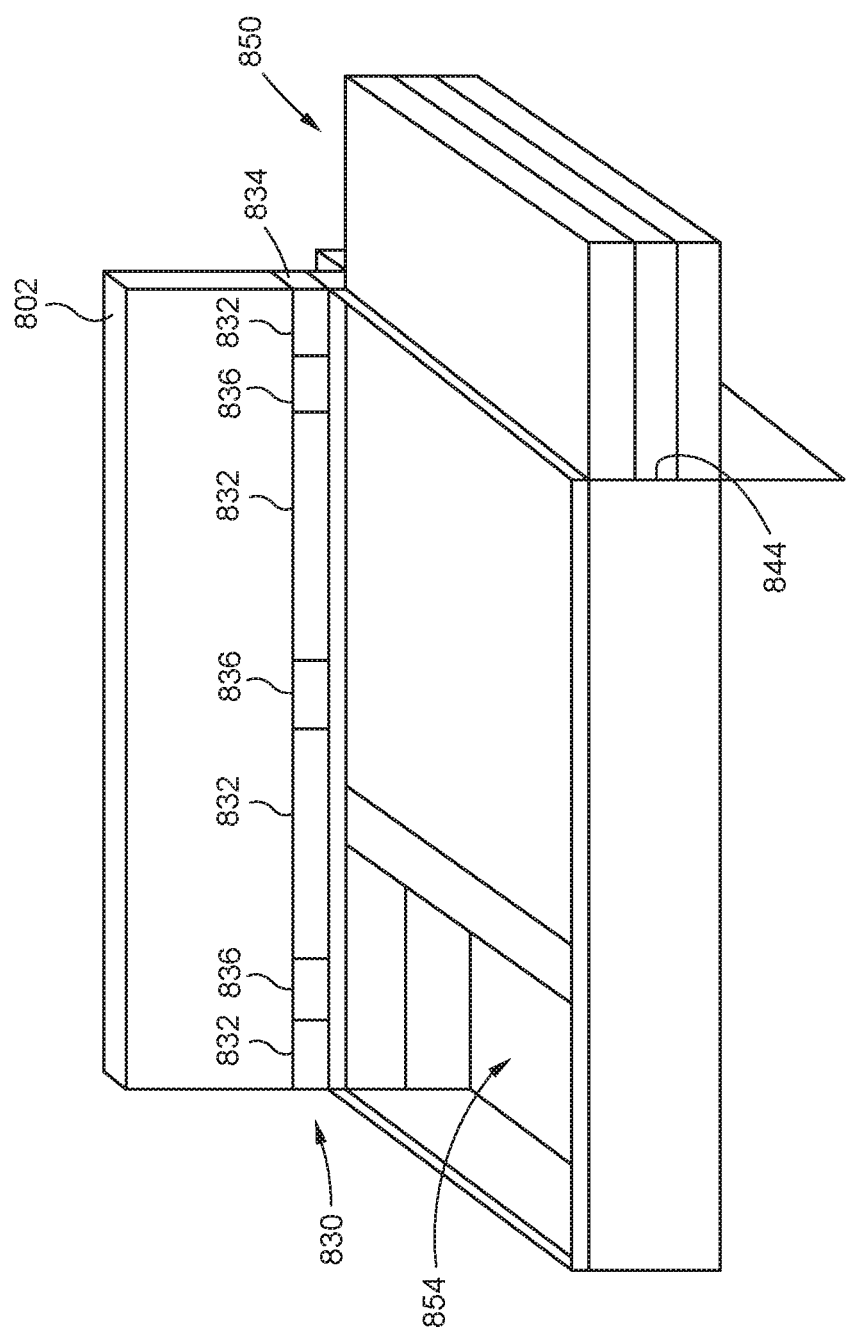
FIGS. 25A-25C are plan views depicting deployment of the telescoping ramp from the side opening of the carrier storage area.
Figure 25B:
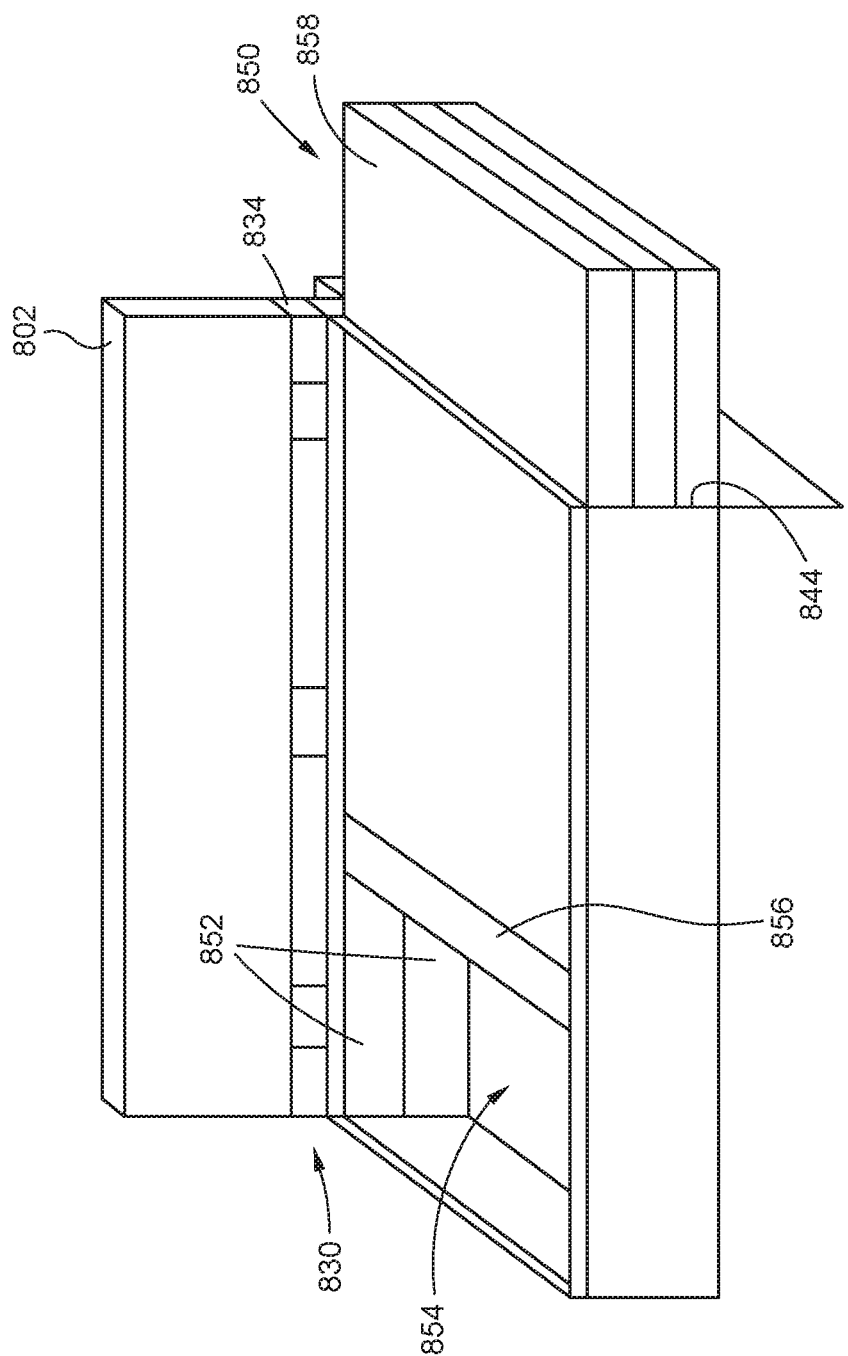
Figure 25C:
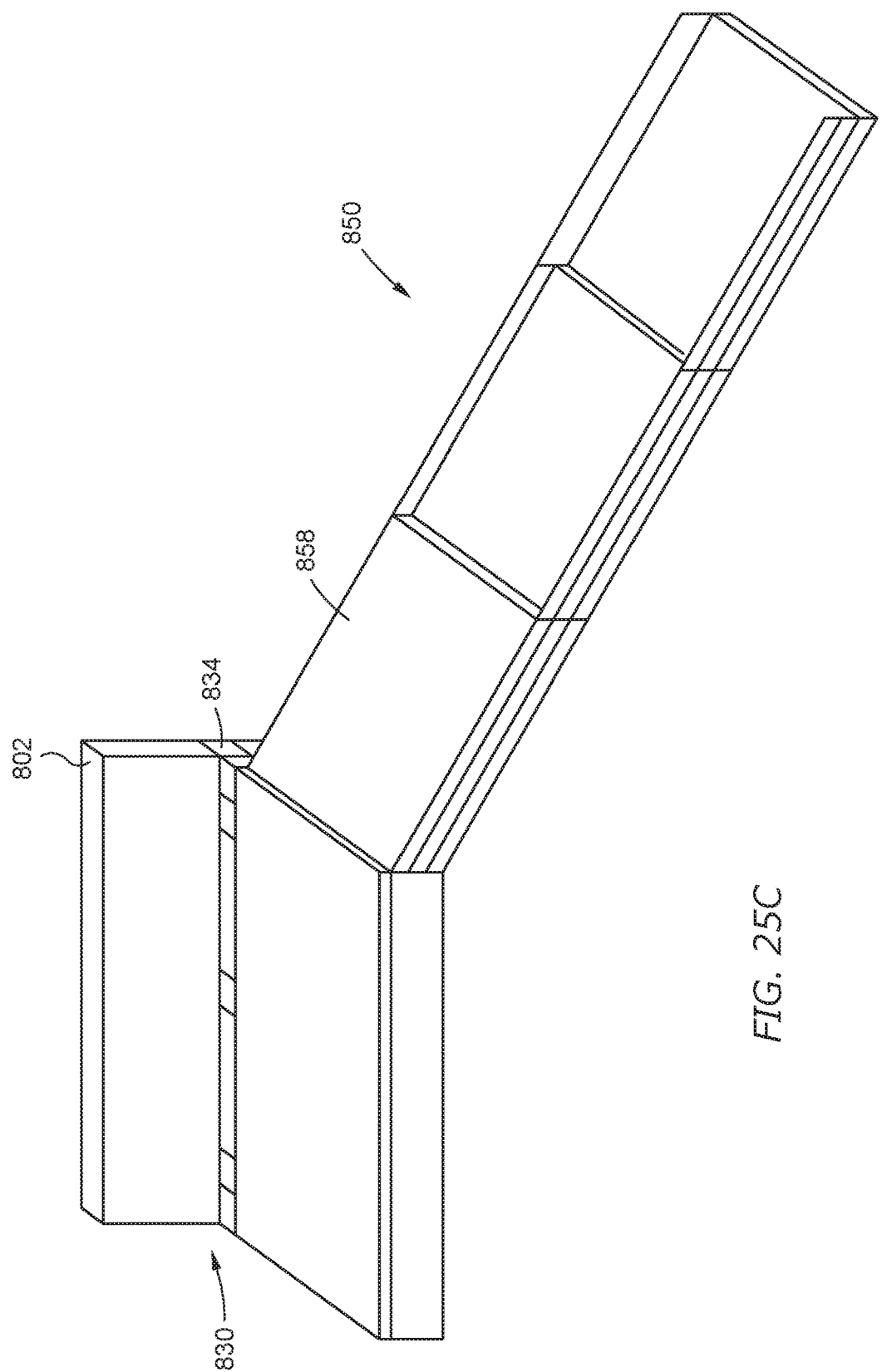

In another embodiment, as shown in FIG. 24, which is similar to the embodiment shown in FIGS. 23A-23D, with the exception that the carrier container has a side opening 844 within which a ramp is stored. As further shown in FIGS. 25A-25C, a telescoping ramp 850 slides on rails 852 through the side opening 844 of the carrier storage area 854 to access the ramp from the stored position within the carrier storage area. A mechanical mechanism 856 spans the full length of the carrier storage area such that opposite sides of the mechanical mechanism connect to rails 852 running horizontally across the width of opposite sides of the carrier storage area. The mechanical mechanism 856 connects separately from its side rails connection to the top portion 858 of the telescoping ramp in a way that is extremely secure and robust so that the connection between the mechanical mechanism 856 and the telescoping ramp 850 can support significant weight. The part of the mechanical mechanism that is robustly attached to the top portion of the telescoping ramp has a rotational capability which allows the telescoping ramp to pivot from a horizontal position while stored in and pulled from the carrier cargo area to an angled position when the telescoping ramp is deployed and put in contact with the ground surface. The mechanical mechanism, which is connected to the telescoping ramp, is what actually allows for the horizontal range of motion or sliding of the ramp when accessing the ramp from the carrier storage area as well as allows for the vertical range of motion when pivoting the deployed telescoping ramp at a downward angel to rest on the ground surface.

Other embodiments, which are not depicted, include the carrier system shown in FIGS. 23A-23D only having no storage carrier at the bottom, but the hinge assembly operates the same.

Vehicle operators can simply walk on top of the carrier system when moving cargo into and out of the vehicle where appropriate and may avoid back injury due to the ability to stand straight up when picking up or putting down heavy objects on the top of the carrier container.

The carrier system of the embodiments shown and described may apply to other vehicles with a rear hitch, including pickup trucks, work trucks, delivery trucks, minivans, SUVs, ATVs, trailers, or other motorized and non-motorized vehicles. The carrier system can be used with a ramp to assist movement of cargo inside or outside of a vehicle, to increase the vehicle's carrying space for cargo, and to provide a tailgate extension for placing items such as those used in tailgate parties.

Also, by storing the ramp outside the vehicle, any dirt, mud, water, leaves, or other environmental substances will not be brought into the vehicle. The ramp is stored outside the vehicle thereby avoiding any contamination of the internal part of the vehicle.

Although shown and described in the context of loading and unloading the vehicle with the ground, the ramp is also usable to interconnect the lid of the carrier container with other surfaces that may be located higher than the ground. For example, the distal end of the ramp may be positioned on the porch of a house that is at the same level as the carrier's container or even higher. The distal end of the ramp may be positioned in a different vehicle for transferring a dog from one vehicle to another. Other uses of the ramp are also possible.

The various drawings included with this application are not necessarily drawn to scale. Instead they have been prepared for the purpose of showing every feature of the invention specified in the claims and to convey a clear understanding of the subject matter sought to be patented.

Various modifications are possible while remaining within the scope of the invention. For example, in the first embodiment shown in FIG. 1, the open side of the carrier container 56 may be any side of the carrier container, not just the top side 72, and the carrier container lid 102 will cover that open side. In the case where the open side is other than the top side 72, the bridge plate 94 will still be pivotally mounted in relation to the forward side 64 as shown, but will rest on the top side 72 of the carrier container in its non-deployed configurations, as opposed to the carrier container lid, which will be on a different side of the container.

The word "comprise" and its variations thereof, such as, "comprises" and "comprising," are to be construed herein in their traditional sense in patent law; i.e., in an open, inclusive sense, which is "including, but not limited to." The word "comprise" and its variations are not to be construed in a non-inclusive sense and do not mean "consisting of."

The term "ground surface" is meant to be construed broadly and includes the ground, grass on the ground, a sidewalk, and any other type of surface to which or from which a pet or cargo may be picked up or delivered.

The adjective "flush" is meant to include the thickness of the bridge plate on the cargo bed's surface. In accordance with the normal dictionary definition, flush as used herein is meant to include "having surfaces in the same plane; even." Flush as used herein is also meant to include "Arranged with adjacent sides, surfaces, or edges close together." The inventor believes that "flush" expresses the configuration of the bridge plate on the cargo bed's surface as shown in FIGS. 2, 3, and 8, inter alia.

"Contiguous" for the purposes of this application is given the ordinary meaning. Two surfaces are contiguous if they are touching each other. Thus the bridge plate will be contiguous with the cargo bed when it touches it.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. A ramp system for use with a vehicle to assist with handling cargo of the vehicle, the vehicle having a cargo bed at a rear of the vehicle and an opening through which the cargo may be removed from and loaded into the vehicle, the ramp system comprising:
   a ramp carrier including a front side facing the rear of the vehicle, a rear side, a left side, a right side, and a top side;
   a ramp carrier support structure having a first end configured to connect to the vehicle and a second end connected to the ramp carrier;
   a bridge device disposed adjacent the top side of the ramp carrier, the bridge device having a deployed configuration in which the bridge device forms a bridge over a gap between the cargo bed of the vehicle and the top side of the ramp carrier; and
   a ramp having a first end configured to engage the ramp carrier and a second end configured to provide a sloped surface from the ramp carrier.

2. The ramp system of claim 1 wherein the ramp carrier support structure includes a height adjustment mechanism positioned between the first and second ends of the ramp carrier support structure, the height adjustment mechanism is operable to move the ramp carrier relative to the first end and selectively position the top side of the ramp carrier relative to the cargo bed of the vehicle.

3. The ramp system of claim 2 wherein the height adjustment mechanism being operable to move the ramp carrier relative to the first end and selectively the top side of the ramp carrier flush with the cargo bed of the vehicle.

4. The ramp system of claim 2 wherein the height adjustment mechanism is sized and configured to adjust a length of the ramp carrier support structure between the first and second ends.

5. The ramp system of claim 1 wherein the ramp carrier further includes an interior storage space surround by the front side, the rear side, the left side, the right side, the top side, and a bottom side, at least one of the rear, the left, the right and the top sides is an open side and allowing access to the interior storage space.

6. A method for handling cargo of a vehicle, the vehicle having a cargo bed at a rear of the vehicle and an opening through which cargo may be removed from and loaded into the cargo bed, the method comprising:

connecting a first end of a ramp support structure to the vehicle such that the ramp support structure holds a ramp carrier in a selected position relative to the cargo bed of the vehicle, the ramp carrier including a front side facing the rear of the vehicle, a rear side, a left side, a right side, and a top side;

positioning the ramp carrier adjacent the opening, the ramp carrier being supported by a ramp carrier support structure having a first end configured to connect to the vehicle and a second end connected to the ramp carrier;

deploying a bridge device disposed adjacent the ramp carrier, the bridge device having a deployed configuration in which the bridge device forms a bridge over a gap between the cargo bed of the vehicle and the top side of the ramp carrier; and deploying a ramp having a first end engaged with the ramp carrier to secure the ramp thereto to provide a sloped surface.

7. The method of claim 6 wherein the method further includes adjusting a height of the top side of the ramp carrier in relation to the cargo bed of the vehicle.

8. The method of claim 7 wherein adjusting the height of the top side of the ramp carrier moving the ramp carrier relative to the first end and selectively the top side of the ramp carrier flush with the cargo bed of the vehicle.

9. The method of claim 7 wherein adjusting the height of the top side of the ramp carrier in relation to the cargo bed of the vehicle includes aligning the top side of the ramp carrier with the cargo bed of the vehicle.

10. The method of claim 7 wherein the ramp support structure includes a height adjustment mechanism positioned between the first and second ends of the ramp carrier support structure, the height adjustment mechanism is operable to move the ramp carrier relative to the first end and selectively position the top side of the ramp carrier relative to the cargo bed of the vehicle.

11. The method of claim 7 wherein the in the height adjustment mechanism is sized and configured to adjust a length of the ramp carrier between the first and second ends.

12. The method of claim 6 wherein the ramp carrier further includes an interior storage space surround by the front side, the rear side, the left side, the right side, the top side, and a bottom side, at least one of the rear, the left, the right and the top sides is an open side and allowing access to the interior storage space.

* * * * *